(12) United States Patent
Scipioni

(10) Patent No.: US 6,336,097 B1
(45) Date of Patent: Jan. 1, 2002

(54) APPARATUS, SYSTEMS AND METHODS FOR CONSTRUCTING LARGE NUMBERS OF TRAVEL FARES

(75) Inventor: Brian Scipioni, Atlanta, GA (US)

(73) Assignee: Manugistic Atlanta, Inc., Atlanta, GA (US)

( * ) Notice: Subject to any disclaimer, the term of this patent is extended or adjusted under 35 U.S.C. 154(b) by 0 days.

(21) Appl. No.: 09/346,203

(22) Filed: Jul. 1, 1999

(51) Int. Cl.⁷ .............................................. G06F 17/60

(52) U.S. Cl. ............................. 705/6; 705/5; 705/400

(58) Field of Search ............................. 705/1, 5, 6, 400

(56) References Cited

U.S. PATENT DOCUMENTS

| | | | | |
|---|---|---|---|---|
| 4,862,357 A | * | 8/1989 | Ahlstrom et al. ............... | 705/6 |
| 5,021,953 A | * | 6/1991 | Webber et al. .................. | 705/6 |
| 5,191,523 A | * | 3/1993 | Whitesage ....................... | 705/6 |
| 5,331,546 A | * | 7/1994 | Webber et al. .................. | 705/6 |
| 5,404,291 A | | 4/1995 | Kerr et al. .................... | 364/407 |
| 5,546,564 A | | 8/1996 | Horie .......................... | 395/500 |
| 5,652,867 A | | 7/1997 | Barlow et al. ................ | 395/500 |
| 5,754,543 A | * | 5/1998 | Seid ............................ | 370/351 |
| 5,822,736 A | | 10/1998 | Hartman et al. ................ | 705/1 |
| 5,832,453 A | * | 11/1998 | O'Brien ........................ | 705/6 |
| 5,918,209 A | | 6/1999 | Campbell et al. ............... | 705/5 |
| 5,933,813 A | | 8/1999 | Teicher et al. ................. | 705/26 |

(List continued on next page.)

FOREIGN PATENT DOCUMENTS

| DE | 19623285 | * | 12/1997 |
| JP | 11-120246 | * | 4/1999 |
| WO | WO 99/01822 | * | 1/1999 |

OTHER PUBLICATIONS

Luk et al: "Interaction Between Land–Use/Distribution and Assignment"; Institute of Engineers, Australia, 11 Nation Circuit, Bartonm A.C.T. 2600, Australia; Apr. 1980, (Abstarct Only).*

Carroll, et al., "Evolutionary Change in Product Management Experiences in the Car Rental Industry", *Interfaces* 25:5 Sep.–Oct. 1995, pp. 84–104.

(List continued on next page.)

*Primary Examiner*—Edward R. Cosimano
(74) *Attorney, Agent, or Firm*—Hogan & Hartson L.L.P.

(57) ABSTRACT

According to the present invention, apparatus, systems and methods are provided in which a computer (the "fare construction computer system") is programmed to construct travel fares in conformance with recognized industry rules by building matrices of fare components for travel between one or more cities in such a way that the matrices can be combined in such a way that the travel fares between the two cities are constructed. Each user specifies one or more market areas of responsibility. Each market area consists of one or more cities. According to the user's market area request, the fare construction computer system accesses a database of market points to create a market list of all possible origin-gateway-destination combinations. The fare construction computer system also accesses a database containing fare components. According to one aspect of the invention, the fare construction computer system populates fare component matrices with the appropriate fare components and then combines the fare component matrices using high-speed computer computations. According to an alternative aspect of the invention, the fare construction computer system directly associates fare components by linking combinable fare components using sophisticated data structures. According to the direct association aspect of the invention, fares are constructed by creating all possible combinations of the directly associated fare components.

107 Claims, 25 Drawing Sheets

U.S. PATENT DOCUMENTS

| | | | |
|---|---|---|---|
| 5,946,661 A | 8/1999 | Rothschild et al. | 705/7 |
| 5,966,694 A | 10/1999 | Rothschild et al. | 705/7 |
| 5,974,399 A | 10/1999 | Giuliani et al. | 705/14 |
| 5,987,425 A | 11/1999 | Hartman et al. | 705/20 |
| 6,076,071 A | 6/2000 | Freeny, Jr. | 705/26 |
| 6,078,893 A | 6/2000 | Ouimet et al. | 705/10 |
| 6,085,164 A | 7/2000 | Smith et al. | 705/5 |
| 6,094,641 A | 7/2000 | Ouimet et al. | 705/10 |

OTHER PUBLICATIONS

Williamson, "Airline Network Seat Inventory Control: Methodologies and Revenue Impacts", Flight Transportation Laboratory Report R 92–3, Jun. 1992.

"Net Risks Pay Off for Hyatt Hotels, State of Iowa", *Network World*, vol. 11:47.

Bitran et al., "An Application of Yield Management to the Hotel Industry Considering Multiple Day Stays", *Operations Research*, vol. 43, No. 33, May–Jun. 1995.

Phillips, "A Marginal–Value Approach to Airline Origin and Destination Revenue Management", *Proceedings of the 16th IFIP Conference on System Modeling and Optimization*, 1994.

Phillips, "A Note on Leg Marginal Values and Bid Prices", Decision Focus Incorporated, Apr. 1994.

Curry, "Optimal Airline Seat Allocation with Fare Classes Nested by Origins and Destinations", *Transportation Science*, vol. 24, No. 3, Aug. 1990.

Curry, "Optimum Airline Seat Allocation with Fare Classes Nested by Origins and Destinations", Aeronomics Incorporated, 1988.

Swan, "Revenue Management—Myths and Methods", United Airlines, Jul. 1988.

Wollmer, "An Airline Seat Management Model for a Single Leg Route when Lower Fare Classes Book First", *Operations Research*, vol. 40, No. 1, Jan.–Feb. 1992.

Gallego et al., "A Multi–Product Dynamic Pricing Problem and Its Applications to Network Yield Management", National Science Foundation, Jan. 18, 1994.

Belobaba, "Application of a Probabilistic Decision Model to Airline Seat Inventory Control", *Operations Research*, vol. 37, No. 2, Mar.–Apr. 1989.

Belobaba, "Origin–Destination Seat Inventory Control", Flight Transportation Laboratory, Massachusetts Institute of Technology, Oct. 27, 1987.

Gupta, et al., "A Practical Approach to Network–Based Seat Inventory Management", Integrated Decisions and Systems, Inc., 1993.

* cited by examiner

VALIDATING DIRECTIONALITY (GENERAL CASE)

VALIDATING DIRECTIONALITY (TO/FROM US INSTANCE)

EFFECTS OF ADJUSTING EFFECTIVITY PERIOD

ADJUSTING EFFECTIVITY PERIODS (THAT RESULTS IN CLIPPED FARE)

ADJUSTING EFFECTIVITY PERIODS (THAT RESULTS IN SPLIT FARE)

CONNECTIVITY (ALL FARES CLASSES)

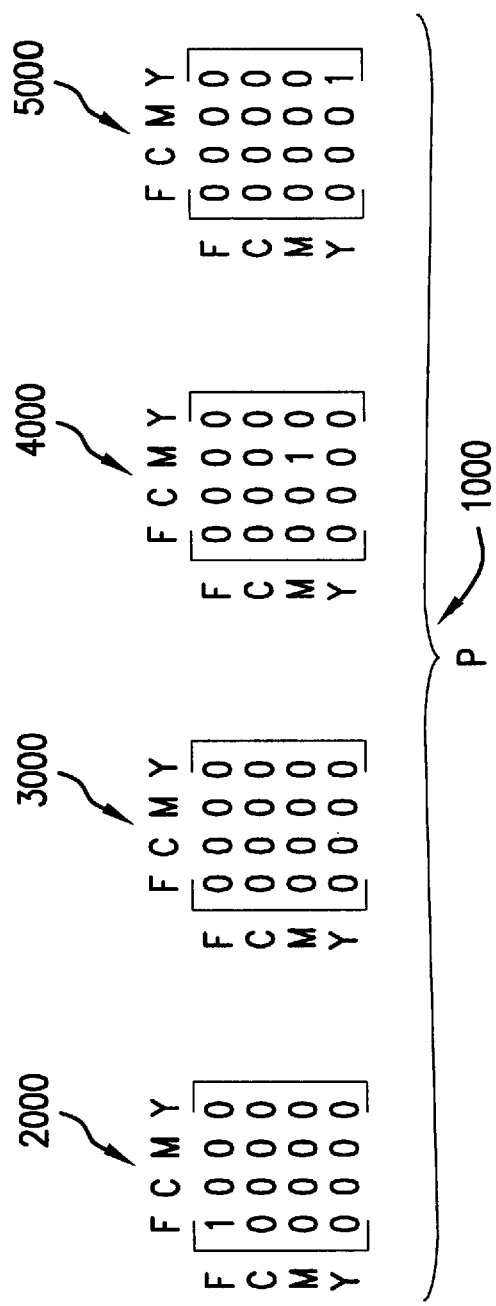
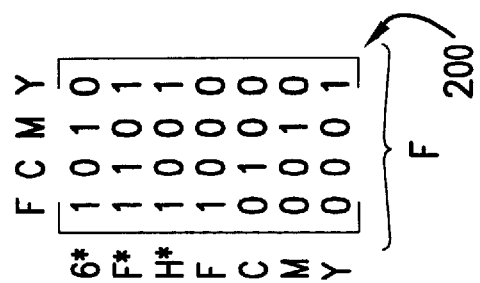
FIG.9

APPARATUS, SYSTEMS AND METHODS FOR CONSTRUCTING LARGE NUMBERS OF TRAVEL FARES

BACKGROUND

The present invention relates generally to fare management systems, and more particularly, to constructing large numbers of travel fares.

Published fares describe the price of travel, such as for airline travel, between two specified cities. In the airline industry, published fares are filed by each airline carrier for publication by ATPCO (Airline Tariff Publishing Company). The origin and destination cities for a published fare are referred to herein as "gateway cities." The origin city for a published fare is known as an "origin gateway city" and the destination city for a published fare is known as a "destination gateway city."

However, travel carriers are not required to file for publication a fare that describes every conceivable travel characteristic for travel between all cities that a particular carrier serves. Rather, industry rules provide for the construction of fares without requiring publication of the fares for each possible combination of cities for which each carrier provides fares.

Accordingly, each travel carrier typically files for publication those fares for travel between that carrier's major hubs and between certain major airports. Each travel carrier further files arbitrary fares that describe fare enhancements for travel between certain cities. An arbitrary fare component is not meant as a standalone fare. Arbitrary fare components are filed by each carrier to provide a premium or discount as the case may be for a particular category of service for a particular set of travel fare connection points.

Therefore, in order to obtain information about all possible travel fares for travel with a certain carrier between two cities, fares must be constructed using that carrier's published fares and arbitrary fares. The rules for construction are known in the travel industry. ATPCO sets the rules as to how fares can be constructed for the airline industry.

Constructing fares is a complex process that involves sophisticated combinatorial, and subsequent validation and elimination, requirements. Fares are constructed by assembling all of the possible different valid combinations of specified published fare components and arbitrary fare components that apply to travel between two cities. Hereinafter, references to published fares in the context of combining published fares with arbitrary fares and references to published fare components should be understood to mean specified published fare components.

To construct a fare, one or more arbitrary fare components are combined, in accordance with industry standard rules for combination, with a published fare component to describe the price for the specified carrier between two cities. Because arbitrary fare components enhance a published fare, arbitrary fare components can be positive, negative or zero.

In addition to being a highly complex process, the number of possible combinations of fare components has historically been viewed as a resource-consuming problem. As of Oct. 1, 1998, nearly 1.5 million arbitrary fares had been filed and over 7 million specified fares had been published.

The way in which systems have typically analyzed and processed the information described herein have been to rely on brute-force techniques such as "sorting" to build all of the possible combinations and perform all of the possible comparisons. Typically, such systems have used sorting to accomplish the elimination and consolidation steps. Because of the large number of fare components, brute-force systems, such as those that rely on sorting, require extensive computing power and time to provide up-to-date, usable constructed and published fares. Consequently, in brute-force systems, updates to fare information are not necessarily reflected in constructed fare information in a timely manner. A more efficient approach is needed which uses less resources and which provides up-to-date constructed fare information within a reasonable response time.

As the traffic or business patterns change, the list of markets for which fares are constructed also change. In addition, it is desirable to provide the capability to construct fares for a complex network of market-to-market requirements such as is required by a pricing analyst for an airline. Typically, a pricing analyst is responsible for all markets connecting two geographical regions, such as two countries. The services mentioned above would require extended computing time to construct all valid fares for travel between, e.g., the United States and Germany on an ad hoc basis.

SUMMARY OF THE INVENTION

According to the present invention, apparatus, systems and methods are provided in which a computer (the fare construction computer system") is programmed to construct travel fares in conformance with recognized industry rules by building matrices of fare components for travel between two market areas, one market area being an origin market area, and the second market area being a destination market area. The matrices are built in such a way that the matrices can be combined in such a way that the travel fares between the two market areas are constructed.

The terms "program" and "programmed" as used here include the use of application software instructions to direct the way in which a computer processes information and further includes all other ways in which a computer is instructed to process information, including among other ways: hardware configuration, and installing firmware in the computer's microprocessor One or more users have access to personal computers, workstations, or the like, which are equipped with a display monitor and a user input device such as a keyboard, mouse, track-ball, voice command, touch screen, touch pad, and all other user input devices. Through the interactive online display, and using the user input device, the user accesses the fare construction computer system which is programmed to construct fares according to the invention as described herein.

The user specifies an origin and a destination market area, each market area consisting of one or more cities. The fare construction computer system is programmed to accept the user's market area request and from that request to access a database of market points. From the database of market points, the fare construction computer system creates a list of all origin cities and all destination cities in the user-specified market area request. The fare construction computer system further creates a market list of all possible origin-destination combinations.

The fare construction computer system accesses one or more databases containing fare components. The fare construction computer system analyzes the fare component database(s) to determine all of the travel fare components that describe travel between the origin cities and the destination cities in the market list.

According to one aspect of the invention, the Matrix Method of Fare Categorization and Fare Construction, the fare construction computer system populates fare component data structures, such as matrices, with information about the appropriate travel fare components. The fare construction computer system then constructs permissible fares by combining the travel fare component matrices using high-speed computer computations.

According to an alternative aspect of the invention, the Direct Association Method of Fare Categorization and Fare Construction, the fare construction computer system directly associates travel fare components by linking combinable fare components using sophisticated data structures. Using the Direct Association Method, the fare construction computer system then constructs permissible fares by creating all possible combinations of the linked components.

DESCRIPTION OF THE DRAWINGS

These and other features, aspects, and advantages of the present invention will become better understood with regard to the following description, appended claims, and accompanying drawings where:

FIG. 9 is a diagram depicting the Combinability Matrix F and the Published Fares Matrix P for the Tulsa/Hamburg example provided herein.

DETAILED DESCRIPTION

I. Overview of the Invention

Figure 1A:
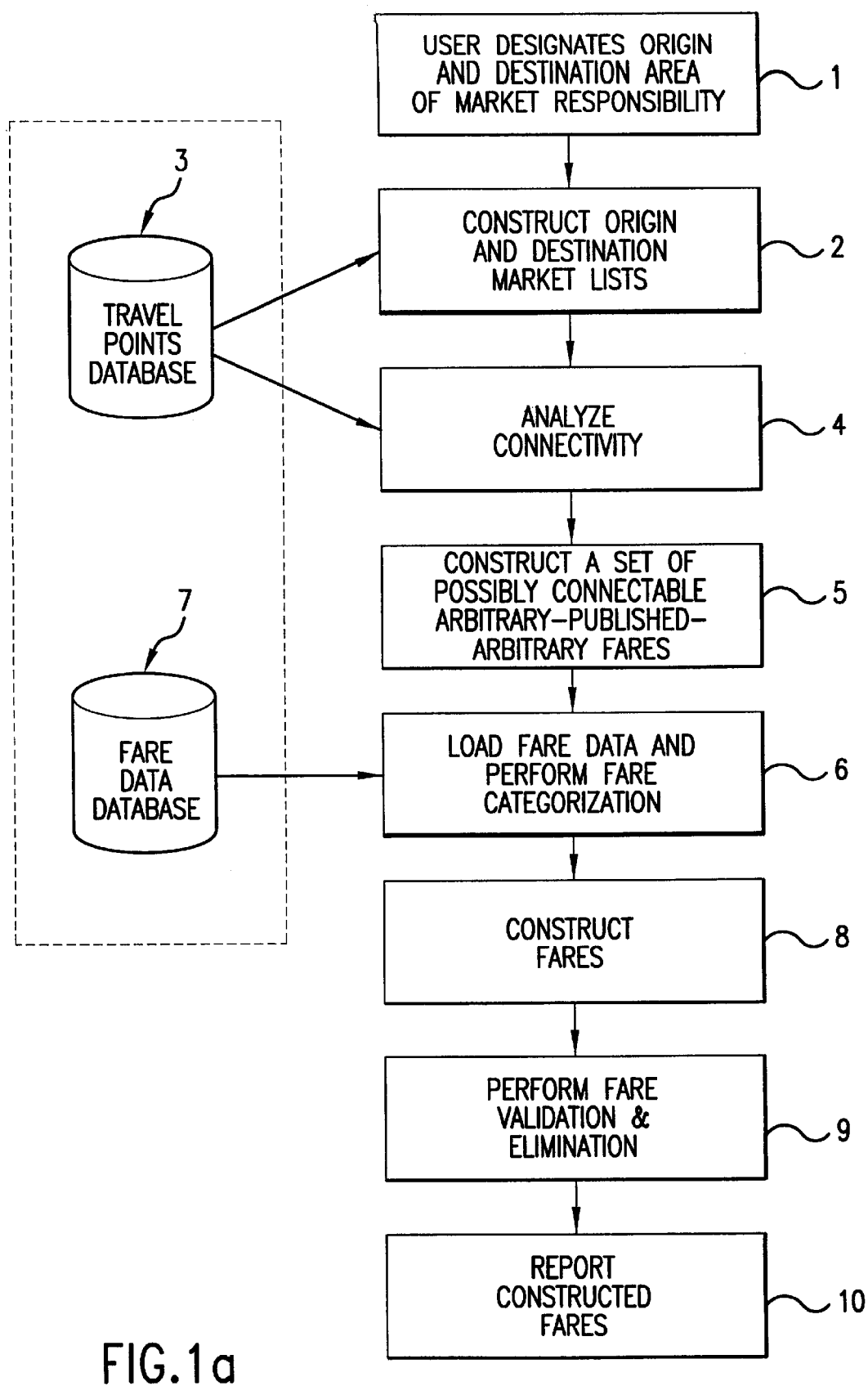
FIG. 1a is a data flow diagram representing an overview of the functions and data involved in constructing fares according to one embodiment of the present invention.

FIG. 1a is a data flow diagram representing a high-level overview of the functions and data involved in constructing fares according to one embodiment of the present invention.

As depicted in FIG. 1a, a fare construction computer system (also referred to herein simply as "the computer") is programmed to receive one or more user-specified designations of origin and destination market areas (1). User input is accomplished through an interactive, online interface, such as a personal computer having a display monitor and one or more user input devices.

The fare construction system accesses a Travel Points Database (3) containing information about potential travel points and generates a "market list." A market list comprises a list of all possible combinations of all cities in the origin area (origin cities) and of all cities in the destination area (destination cities) (2). For each user's request, for the generated market list, the fare construction system conducts connectivity analysis (4) which is described further below. Based on the connectivity analysis, the system builds a set of all possible travel fare components that can be used to construct fares for travel between the origin and destination market areas ("Qualifying Fare fare components") (5).

The fare construction system processes in parallel different user market area requests. The pre-filtering effect of the combination of market list generation and connectivity analysis, with a parallel processing embodiment of the invention allows construction of fares for different markets to proceed in a scalable manner by scaling down the magnitude of the combinatorial problem.

The fare construction system accesses a Fare Data Database (7) which contains fare data for the Qualifying Fare fare components and loads the components into memory (6). In one embodiment, fare data for the Qualifying Fare fare components is loaded into memory (6) in the form of hash tables and arrays.

It should be understood that the order of functions described herein are illustrative and/or exemplary and are not a limitation of the invention. Various and numerous other orders of the functions described herein may be devised by one skilled in the art without departing from the spirit and scope of this invention. For example, in one embodiment, fare data is preloaded into memory instead of loading the data just before performing Fare Categorization (6). In a preloading embodiment, fare data would be loaded into memory before the first step shown as the user designating origin and destination areas of market responsibility (1). In a preloading embodiment, all fare data is loaded into memory as opposed to loading only fare data for Qualifying Fare fare components. In such a preloading embodiment, the computer is programmed to build an array of all published fares and another array of all arbitrary fares. The index to each of the preloaded Published Fare Array and the preloaded Arbitrary Fare Array is a unique integer that signifies the relative position of a particular fare within the relevant preloaded array. For instance, if there are seven million published fares, then the computer preloads all seven million published fares into memory; the index to fare number 1,191,203 in the preloaded Published Fare Array is 1,191,203. Contained in an array record (also referred to as an array element) for a particular published fare in the Published Fare Array is all of the data necessary to construct fares for the particular published fare. In a preloading embodiment, once qualifying published fares have been identified, the computer is programmed to then build the Qualifying Published Fare Array.

The contents of an array record/element for a particular qualifying published fare is the relative integer index for that particular qualifying published fare in the preloaded Published Fare Array. In a preloading embodiment, the computer is similarly programmed to preload all arbitrary fares into memory, and to build a Qualifying Arbitrary Fare Array.

The contents of a record in the Qualifying Arbitrary Fare Array for a particular qualifying arbitrary fare is the relative integer index for that particular qualifying arbitrary fare in the preloaded Arbitrary Fare Array.

It should be noted that, in a preloading embodiment, the Linked List of elements referred to in the description below concerning the Direct Association Method of Fare Construction, contains the relative integer index for that particular qualifying arbitrary fare in the Qualifying Arbitrary Fare Array which in turn contains the relative integer index for that particular qualifying arbitrary fare in the preloaded Arbitrary Fare Array.

In one preloading embodiment, two arrays for qualifying arbitrary fares are built: one array is built for Qualifying Origin Arbitrary Fares; a second is built for Qualifying Destination Arbitrary Fares.

It should be understood that the Travel Points Database (3) referred to herein can be a separate database or can be logically and/or physically contained in the Fare Data database (7) also referred to herein.

Once Qualifying Fare fare components have been loaded into hash tables, in order to access a particular fare component element, the fare construction system computer is programmed to perform "hash functions." There is a specific hash function that is used in connection with each unique hash table. The hash function uses information about the particular Qualifying Fare fare component needed in order to calculate the address of the location of that particular Qualifying Fare fare component. Hash functions provide direct access to the requested Qualifying Fare fare component. The capability to directly access the hash tables for the appropriate fare component increases efficiencies in that it minimizes the need to conduct resource intensive searches for matches of fare components. Using hash functions reduces the need to perform a large volume of input/output-bound operations and/or search operations.

The fare construction computer system categorizes the fare information by constructing matrices and/or other types of data structures that act as Fare Categorization (6) "bins." In one embodiment of the invention, constructed fares are examined and stored in the appropriate pre-defined bin according to certain category matches. Subsequently, combinability rules can be applied to the fares stored in a particular bin. Fare Categorization is described in detail below. Fare Categorization reduces the need for time-consuming and resource intensive sorting and comparisons of each fare with other fares.

According to one aspect of the invention, the Matrix Method of Fare Categorization and Fare Construction, the fare construction computer system is programmed to accomplish Fare Categorization (6) by populating multiple matrices so that the matrices are built and populated with fare components in such a way that fares can be constructed using high-speed matrix multiplication. The fare component matrices are referred to herein as Combinability and Published Fare Matrices. Subsequently, according to the Matrix Method of Fare Categorization and Fare Construction aspect of the invention, fares are constructed (8) by the computer system using high-speed integer matrix multiplication to multiply the Combinability and Published Fare Matrices. The details of the Matrix Method of Fare Categorization and Fare Construction aspect of the invention are provided below.

According to another aspect of the invention, the Direct Association Method of Fare Categorization and Fare Construction, the fare construction computer system is programmed to accomplish Fare Categorization (6) by constructing data structures, referred to herein as Combo Structures, that directly associate multiple fare components together. According to the Direct Association aspect of the invention, fares are constructed (8) by building all possible combinations of the components of fares stored in each special Combo Structure data structure. Storage requirements are drastically reduced using this aspect of the invention in that there is no need to multiply multiple matrices which further results in a reduction in resources utilized to construct fares. Once fares have been constructed, rules for fare validation and elimination, are applied to prepare the list of valid constructed fares (9).

Once valid fares have been constructed, constructed fares can be reported online to the user (10) in a formatted manner. Alternatively, selections of the valid constructed fares can be reported online to the user in response to specific user inquiries in a manner defined by the user.

For purposes of describing the invention, three-piece fare construction is described for both the Matrix Multiplication Method of Fare Combinability Method and for the Direct Association Method. That is, the general cases described and most of the examples provided explain a situation wherein there is an origin arbitrary fare, a published fare, and a destination arbitrary fare. It should be understood that alternative embodiments provide two-piece construction(that is for published fare-destination arbitrary fare, and for origin arbitrary fare-published fare combinations) which is performed according to the method described in a manner that is similar to the three-piece construction technique. It should be further understood that in one embodiment, the fare construction computer system is programmed to perform two-piece and three-piece construction (multi-component) in parallel. As an alternative to parallel processing, the fare construction computer system can be programmed to perform subsequent multi-component type constructions in a serial, head-to-tail fashion.

It should be further understood that the embodiments of the fare construction methods described herein provide for carrier-specific fare construction techniques. It should be understood that the methods described herein extend to multi-carrier fare constructions and that one embodiment for multi-carrier fare constructions uses parallel processing. That is, the fares are constructed for each carrier in a multi-carrier request according to the methods described herein, each fare construction being carrier specific, and the fare construction for each carrier being conducted in parallel and simultaneously with the construction of fares for the other carriers specified in the fare construction request. As an alternative to parallel processing, the fare construction computer system can be programmed to perform subsequent carrier-specific constructions in a serial, head-to-tail fashion.

II. Defining Market Lists and Performing Connectivity Analysis

A. Defining Market Lists

One or more users have access to personal computers, workstations, or the like, which are equipped with a display monitor and a user input device such as a keyboard, mouse, track-ball, voice command, touch screen, touch pad, and all other user input devices. The computer user interface(the "User Interface") provides interactive online display and acceptance capabilities. Through the interactive online display of the User Interface, and using the user input device, the user accesses the fare construction computer system which is programmed to construct fares according to the invention as described herein.

In one embodiment, the computer system that constructs the fares is a centralized system, such as, for instance, one that is available through a global computer network such as the Internet. The central fare construction system is accessible by users at unlimited physical locations. Each user accesses the Internet through the use of a computer device, such as a personal computer.

In one embodiment, the user is provided with online displays of maps of the world. Using one of a variety of possible input devices, the user selects or otherwise specifies the Origin and Destination markets. In one embodiment, the user touches the screen of the user's display monitor using a touch-screen device to indicate the user's selection. In one such map-driven interface embodiment, pull down menus, which are known in the art, are provided to allow the user to indicate whether the area of the map touched is an Origin Market or a Destination Market.

In one embodiment, the user specifies one or more market areas of responsibility. Each market area consists of one or more origin cities or regions and one or more destination cities or regions. In one embodiment, the computer is programmed to simultaneously process multiple market requests in parallel.

Figure 1B:
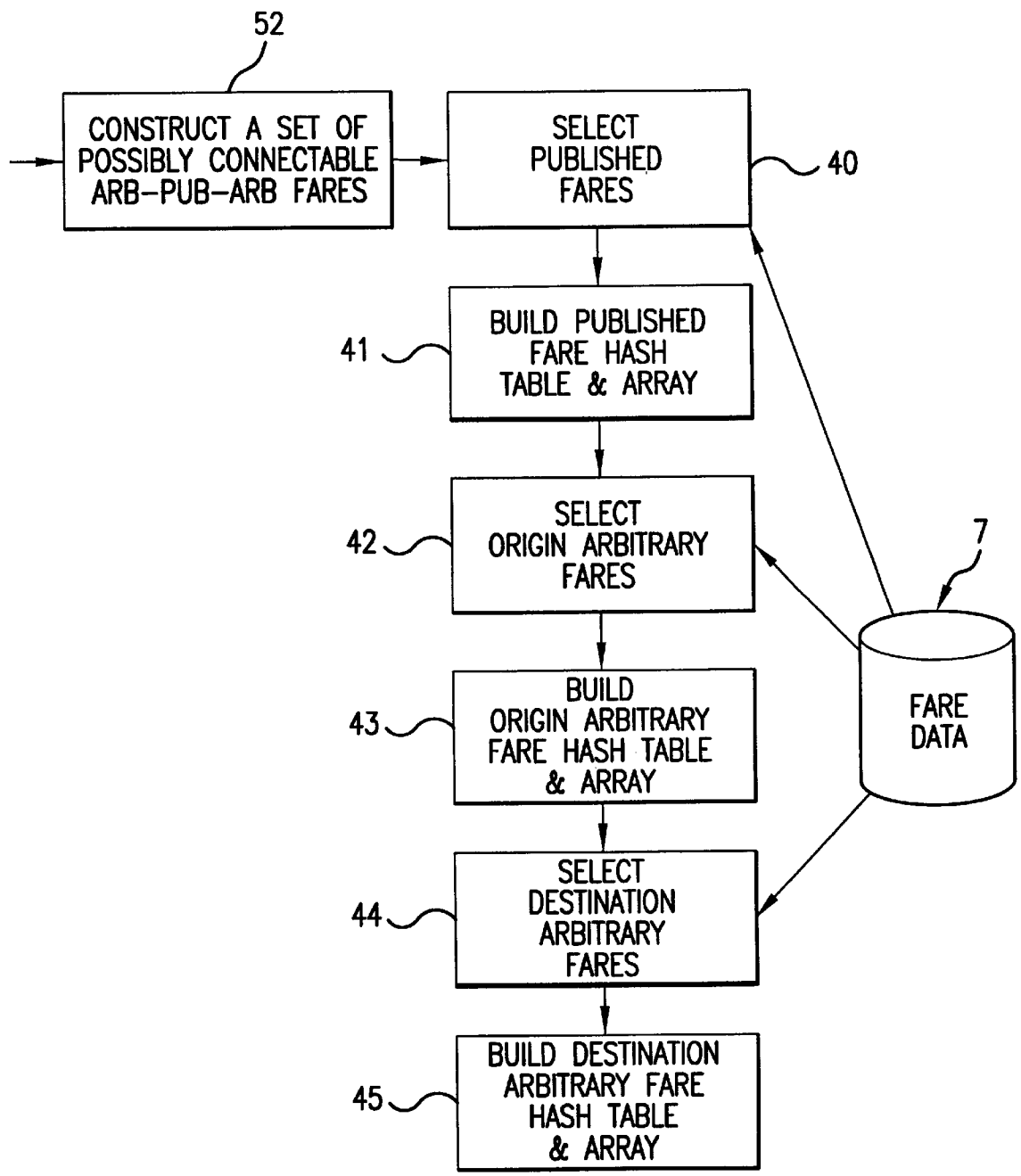
FIG. 1b is a flow diagram representing an overview of the functions and data involved in building the fare data hash tables and arrays used to perform Fare Categorization according to one embodiment of the present invention.
Figure 1C:
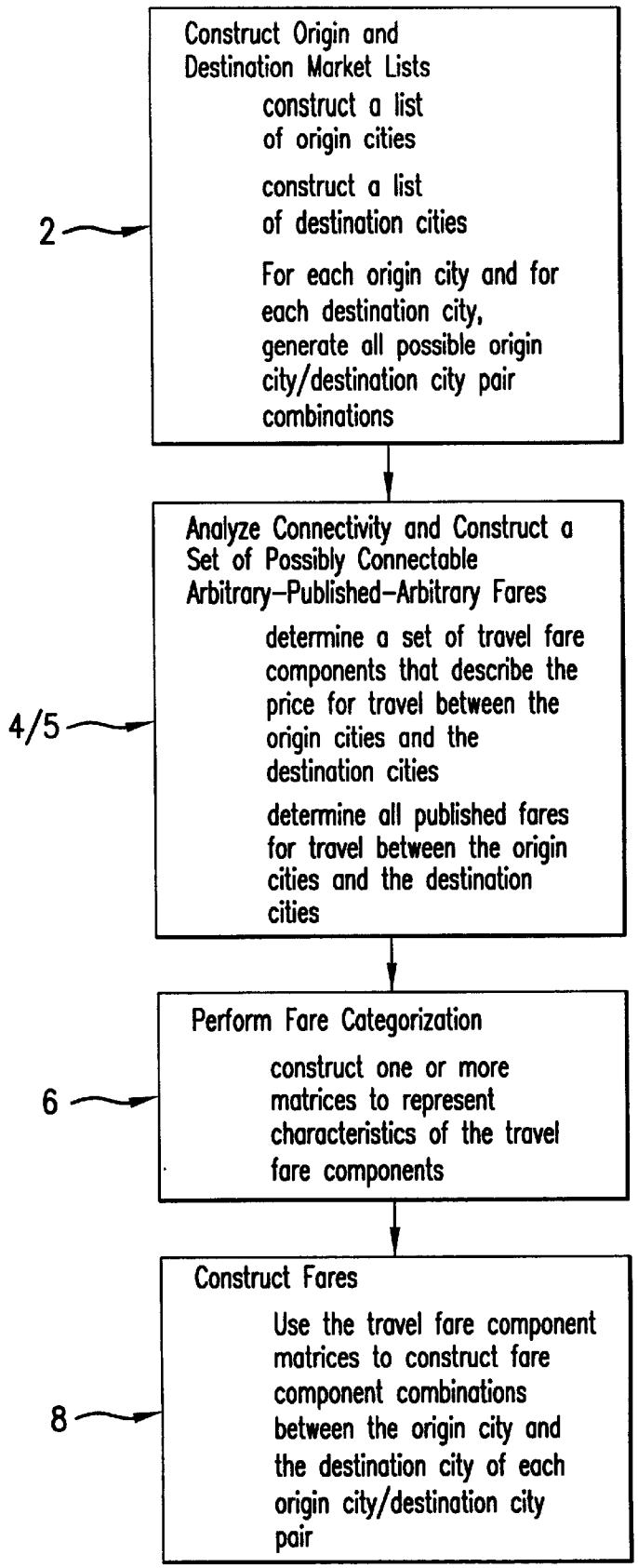
FIG. 1c is a flow diagram depicting one embodiment of the high level functions involved in Fare Categorization and Construction for the Matrix Method of Fare Categorization and Fare Construction.

FIG. 1c is a flow diagram depicting one embodiment of the high level functions involved in Fare Categorization and Construction for the Matrix Method of Fare Categorization and Fare Construction. According to the user's market area request, the computer is programmed to access a database of travel points. The computer is further programmed to retrieve and generate from the travel point database, a list of all origin and destination construction points (also referred to herein as origin cities and destination cities) contained within the user's market area request (2). For each origin city and for each destination city, the computer generates all possible origin city/destination city pair combinations (2). The origin cities and destination cities in the market list are stored in hash tables to allow high-speed reference, retrieval and storage.

Consider as an example of market list construction a situation where the user designates an origin market area as the Northeastern U.S. and a destination market area as the British Isles, then the computer is programmed to access the travel points database and create a list all of the cities in the region defined as the Northeastern U.S. which are served by the specified carrier; the computer is further programmed to access the travel points database and create a list all of the cities in the region defined as the British Isles which are served by the specified carrier.

Also depicted in FIG. 1c is a more detailed view of one embodiment of the functions of analyzing connectivity (4) and constructing a set of possibly connectable arbitrary-published-arbitrary fares (5). Depicted in FIG. 1c as part of the connectivity analysis and early construction functions are two additional functions: 1) the function of determining a set of travel fare components that describe the price of travel between the origin cities and the destination cities; and 2) the function of determining all published fares for travel between the origin cities and the destination cities. FIG. 1c further depicts the function of performing Fare Categorization as constructing one or more matrices to represent characteristics of the travel fare components (6). FIG. 1c also depicts the function of constructing fares as using the travel fare component matrices to construct fare component combinations between the origin city and the destination city of each origin city/destination city pair (8).

B. Performing Connectivity Analysis and Storing the Information in Memory

Connectivity Analysis is the analysis of the connectivity of travel construction points between two cities. That is, the computer is programmed to identify all fare components that apply to all travel fare connection points between two cities, including published fares and arbitrary fares.

One result of Connectivity Analysis is the identification of Gateway Cities that serve each Origin/Destination for which a fare is to be constructed. Identification of Gateway Cities is one factor in structuring the Matrices for Arbitrary Fare Components and Published Fare Components and the data structures used in the Direct Association Method that are used to construct usable fares for travel between a specific Origin and Destination.

In the case of three-piece fare construction, the computer is programmed to identify all sets of travel fare connection points from a user-specified origin city to an origin gateway city, from the origin gateway city to a destination gateway city, and then from the destination gateway city to a user-specified destination city.

In one embodiment, the way in which Connectivity Analysis is performed (for three-piece construction) is to make filtering passes first through a database containing all arbitrary fares, and subsequently through lists of selected arbitrary and published fares as follows.

In a first pass through a database containing all arbitrary fares, the computer is programmed to select as Candidate Origin Arbitrary Fares all arbitrary fares for which the specified carrier provides an arbitrary fare from one of the origin cities contained in the market list. The computer is programmed to select as a Candidate Origin Gateway City any city, other than one of the Origin Cities in the market list, through which a Candidate Origin Arbitrary Fare exists for the specified carrier.

Also during the first pass, the computer is programmed to select as a Candidate Destination Arbitrary Fare all arbitrary fares for which the specified carrier provides an arbitrary fare to one of the destination cities contained in the market list. The computer is programmed to select as a Candidate Destination Gateway City any city, other than one of the Destination Cities in the market list, through which a Candidate Destination Arbitrary Fare exists for the specified carrier.

The computer is programmed to pass through a database containing all published fares (which can be logically and/or physically the same database containing the arbitrary fares) Collectively, references herein to the Fare Data Database refer to one or more physical and/or logical database(s) containing arbitrary and published fare data. FIG. 1b is a flow diagram representing an overview of the functions and data involved in building fare data hash tables. The computer is programmed to select as Qualifying Published Fares all published fares for travel by the specified carrier between any of the Candidate Origin Gateway Cities and any of the Candidate Destination Gateway Cities (40). The origin city for each selected Qualifying Published Fare is selected as a Qualifying Origin Gateway City. The destination city for each selected Qualifying Published Fare is selected as a Qualifying Destination Gateway City.

The computer is programmed to pass through the list of Candidate Origin Arbitrary Fares and select as Qualifying Origin Arbitrary Fares those arbitrary fares for which the carrier provides travel from one of the Origin Cities in the market list to one of the Qualifying Origin Gateway Cities (42). The computer is further programmed to select as Qualifying Destination Arbitrary Fares those arbitrary fares for which the carrier provides travel from one of the Qualifying Destination Gateway Cities to one of the Destination Cities in the market list (44) In an alternative embodiment, the computer is programmed to directly access fare data in one or more databases as opposed to loading fare data into memory in the form of hash tables and arrays.

The computer is programmed to load the appropriate fare data for each Qualifying Published Fare, each Qualifying Origin Arbitrary Fares and each Qualifying Destination Arbitrary Fare in hash tables. Fare data hash tables are used to perform both the Matrix Method and the Direct Association Method of Fare Categorization and Combinability that are described further below.

The computer is programmed to store the information about the selected Qualifying Published Fares in hash tables of Published Fare characteristics (41). The computer is programmed to assign a unique integer to each Qualifying Published Fare. The unique integer assigned to each Qualifying Published Fare is the relative number of that Qualifying Published Fare in the database of all Published Fares. The computer is programmed to build an array of the identifying integers of all of the Qualifying Published Fares. The computer is programmed to store certain information about each Qualifying Published Fare in the hash table as part of the particular Qualifying Published Fare's hash table attributes. The computer is further programmed to build a non-duplicating list of unique fare class codes representing all of the Qualifying Published Fares.

Similarly, the computer is programmed to store information about the selected Qualifying Origin Arbitrary Fares in an array and hash tables of Origin Arbitrary Fares (43). The computer is programmed to assign a unique integer to each Qualifying Origin Arbitrary Fare. The unique integer assigned to each Qualifying Origin Arbitrary Fare is the relative number of that Qualifying Origin Arbitrary Fare in the list of all Arbitrary Fares. The computer is programmed to build an array of the identifying integers of all of the Qualifying Origin Arbitrary Fares. The computer is further programmed to store certain information about each particular Qualifying Origin Arbitrary Fare in the hash table as part of that particular Qualifying Origin Arbitrary Fare's hash table attributes.

The computer is further programmed to store the selected Qualifying Destination Arbitrary Fares in an array and hash tables of Destination Arbitrary Fares (45). The computer is programmed to assign a unique integer to each Destination Arbitrary Fare. The unique integer assigned to each Qualifying Destination Arbitrary Fare is the relative number of that Qualifying Destination Arbitrary Fare in the list of all Arbitrary Fares. The computer is programmed to build an array of the identifying integers of all of the Qualifying Destination Arbitrary Fares. The computer is further programmed to store all of the information about each particular Qualifying Destination Arbitrary Fare in the hash table as part of that particular Qualifying Destination Arbitrary Fare's hash table attributes.

The computer is further programmed to build a unique list, or hash table, of Qualifying Origin Gateway Cities, and another of Qualifying Destination Gateway Cities.

The computer is further programmed to maintain certain statistics as it builds the hash tables described above, including but not limited to the following factors: 1.) number of non-duplicated fare class codes represented by Qualifying Published Fares and their values; 2.) number of Origin Cities and their identities; 3.) number of Destination Cities and their identities; 4.) number of types of fare continuity (maximum 2: round-trip, one-way)and their values; 5.) number of types of directionality (maximum 2: to, from) and their values; and 6.) number of tariffs that apply to Published Fares for travel between the Origin and Destination Cities and their values.

As mentioned above, it should be understood that the order of functions described herein are illustrative and/or exemplary and are not a limitation of the invention. Various and numerous other orders of the functions described herein may be devised by one skilled in the art without departing from the spirit and scope of this invention. For example, in one embodiment, connectivity analysis is performed independently of performing any combinality analysis.

Figure 1D:
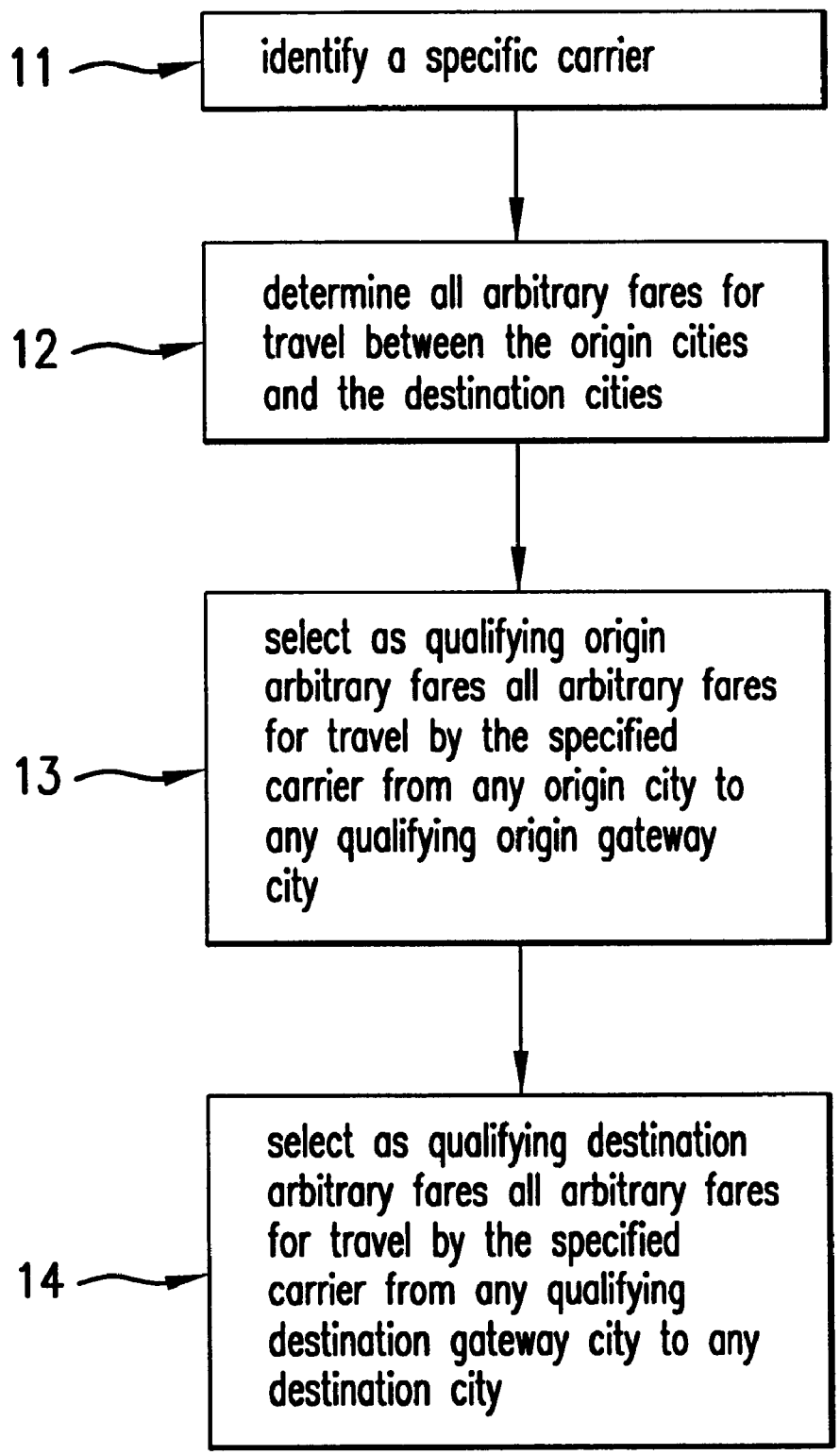
FIG. 1d is a flow diagram depicting one embodiment of the functions involved in determining a set of travel fare components that describe the price of travel between the origin cities and the destination cities.
Figure 1E:
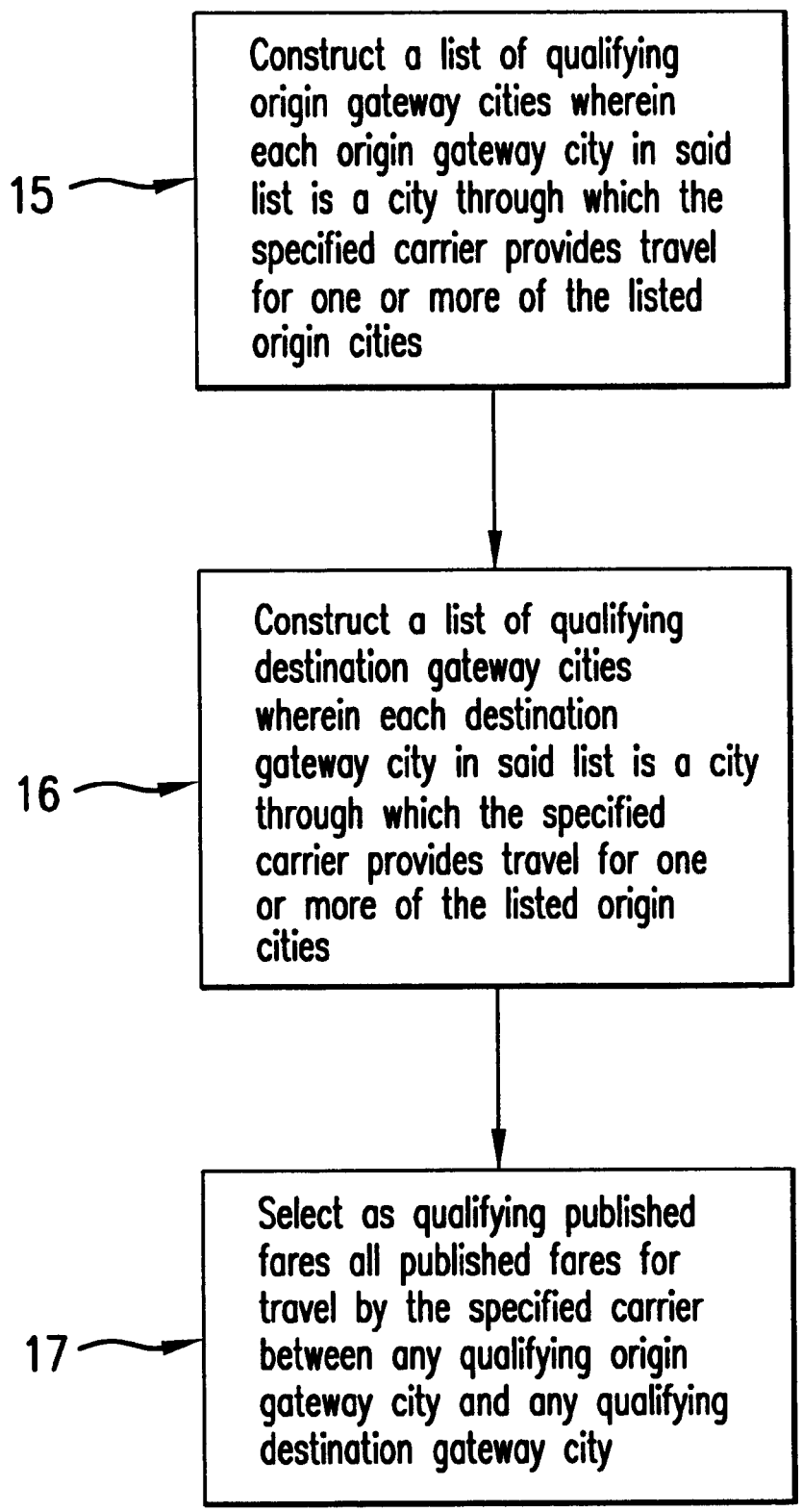
FIG. 1e is a flow diagram depicting one embodiment of the functions involved in determining all published fares for travel between the origin cities and the destination cities.

FIGS. 1d and 1e are flow diagrams depicting one embodiment of the detail of the functions of connectivity analysis (4) and constructing a set of possibly connectable arbitrary-published-arbitrary fares (5).

FIG. 1d is a flow diagram depicting one embodiment of the functions involved in determining a set of travel fare components that describe the price of travel between the origin cities and the destination cities. As depicted in FIG. 1d, the computer is programmed to identify a specific carrier (11). The computer determines all arbitrary fares for travel between the origin cities and the destination cities (12). The computer also selects as qualifying origin arbitrary fares all arbitrary fares for travel by the specified carrier from any origin city to any qualifying origin gateway city (13). The computer also selects as qualifying destination arbitrary fares all arbitrary fares for travel by the specified carrier from any qualifying destination gateway city to any destination city (14).

FIG. 1e is a flow diagram depicting one embodiment of the functions involved in determining all published fares for travel between the origin cities and the destination cities. As depicted in FIG. 1e, the computer constructs a list of qualifying origin gateway cities wherein each origin gateway city in said list is a city through which the specified carrier provides travel for one or more of the listed origin cities (15). The computer further constructs a list of qualifying destination gateway cities wherein each destination gateway city in said list is a city through which the specified carrier provides travel for one or more of the listed origin cities (16). The computer also selects as qualifying published fares all published fares for travel by the specified carrier between any qualifying origin gateway city and any qualifying destination gateway city (17).

In alternative embodiments, elements of combinality analysis are selected to be performed as part of connectivity analysis. For example, in one embodiment, the computer is programmed to conduct connectivity analysis that performs both city connectivity (as described above) and fare class code combinability (the rules of which are described below in a section titled "Fare Class Combinability Rules"). As another example, the computer is programmed to perform city connectivity, fare class combinability and zone applicability all as part of connectivity analysis.

C. A Connectivity Analysis Example

Consider for illustrative purposes of Connectivity Analysis, an Origin/Destination pair of Tulsa Oklahoma ("TUL") and Hamburg Germany ("HAM"). It should be noted that the Tulsa/Hamburg example provided herein uses exemplary data that has been created for illustrative purposes; the example data is not intended to represent actual fares or fare information. Alternatively, for illustrative purposes, the origin, destination, origin-gateway and destination-gateway cities in the examples provided herein could have been generically named city 1, city 2, city 3 and city 4. In the Tulsa/Hamburg example, published fares exist for direct travel between Tulsa and Hamburg. Therefore, for the Published Fares, Tulsa and Hamburg are each considered Gateway Cities and the Published Fares for travel between those two cities are usable fares. In addition, in the case of travel between Tulsa and Hamburg, there are several non-direct sets of travel fare connection points between Tulsa and Hamburg through several Gateway Cities serving Tulsa and Hamburg. Therefore, in order to properly analyze travel between Tulsa and Hamburg, the costs of travel between non-direct sets of travel fare connection points must be examined. To do that, usable fares must be constructed.

In many cases, there is no published fare between the Origin/Destination pair listed. In other cases, as in the Tulsa/Hamburg example, in addition to published fare information for direct travel between the Origin/Destination pair, additional fares can be constructed using other Gateway Cities. Accordingly, all of the Gateway Cities serving the Origin and Destination cities must be identified.

Figure 8:
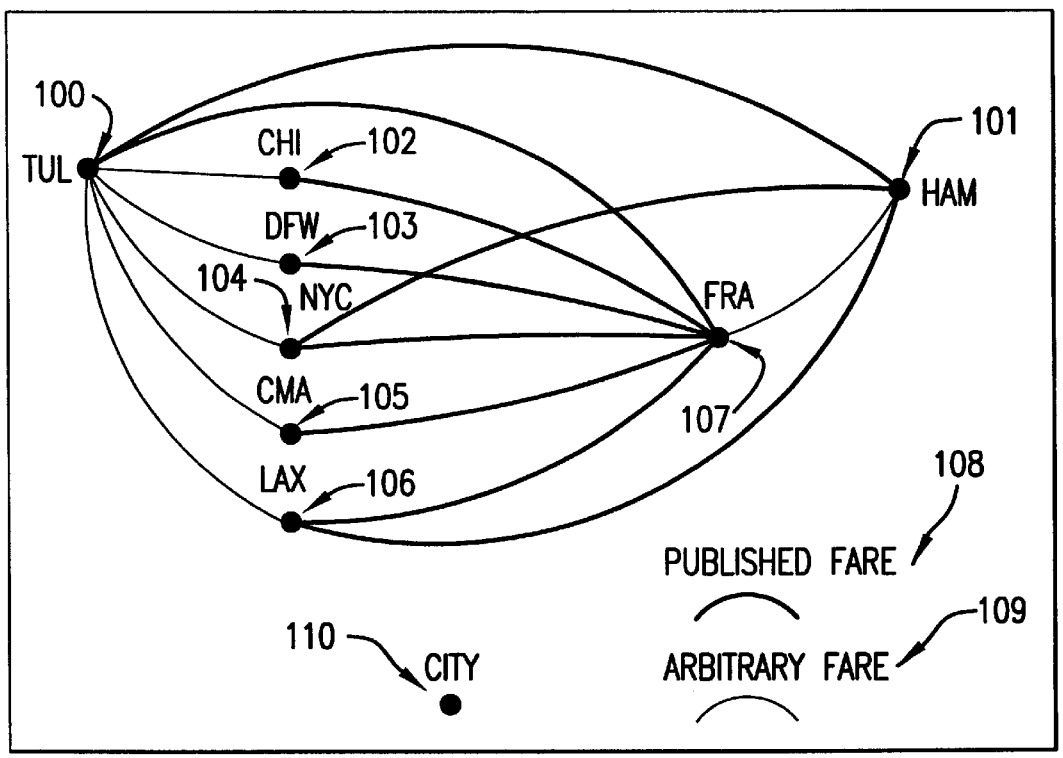
FIG. 8 is a diagram depicting example Gateway Cities that serve Tulsa and Hamburg in the Tulsa/Hamburg example provided herein.

Returning to the Tulsa/Hamburg example, even though a published fare exists between Tulsa and Hamburg, there exist additional Gateway Cities that serve both Tulsa and Hamburg. FIG. 8 is a diagram depicting Tulsa (100) as the Origin City, Hamburg (101) as the Destination City, and the Gateway Cities that serve Tulsa and Hamburg. As can be seen in FIG. 8, Tulsa is served by the additional Gateway Cities of Chicago (102), Dallas/Fort Worth (103), New York City (104), Omaha (105), and Los Angeles International (106). Hamburg Germany is served by the additional Gateway Cities of Frankfurt Germany (107).

Another result of Connectivity Analysis is the identification of the types of fare components involved in constructing fares between the Origin and Destination Cities. Published Fare Components are depicted in FIG. 8 using bold lines (108); Arbitrary Fare Components are depicted in FIG. 8 using narrow lines (109); cities are depicted in FIG. 8 using a bold dot (110).

According to the Tulsa/Hamburg example depicted in FIG. 8, Published Fare Components for travel between Tulsa and Hamburg exist as follows: between Tulsa (100) and Hamburg (101); between Tulsa (100) and Frankfurt (107); between Los Angeles (106) and Hamburg (101); between New York City (104) and Hamburg (101); between Chicago (102) and Frankfurt (107); between Dallas/Fort Worth (103) and Frankfurt (107); between New York City (104) and Frankfurt (107); between Omaha (105) and Frankfurt (107) and between Los Angeles International (106) and Frankfurt (107).

Arbitrary Fare Components for travel between Tulsa and Hamburg exist as follows: between Tulsa (100) and Chicago (102); between Tulsa (100) and Dallas/Fort Worth (103); between Tulsa (100) and New York City (104); between Tulsa (100) and Omaha (105); between Tulsa (100) and Los Angeles International (106); and between Frankfurt (107) and Hamburg (101).

In the Tulsa-Hamburg example, several types of fares for travel between Tulsa and Hamburg are depicted in FIG. 8 (bold lines (108) depict a published fare; thin lines (109) depict an arbitrary fare; bold dots (110) depict a city): 1) ("Pub")Published Fares for direct travel between Tulsa and Hamburg (as depicted between TUL (100) and Ham (101); 2) ("Arb-Pub") Constructed Fares with a single Arbitrary Fare Component and a single Published Fare Component (e.g., TUL (100)—NYC (104)(arb) with NYC (104)—HAM (101)(pub); TUL (100)—LAX (106) (arb) with LAX (106)—HAM (101) (pub); and TUL (100)—FRA (107) (pub) with FRA (107)—HAM (101) (arb)); and 3) ("Arb-Pub-Arb") Constructed Fares with two Arbitrary Fare Components and a single Published Fare Component (e.g., TUL (100)—CHI (102) (arb) with CHI (102)—FRA (107) (pub) with FRA (107)—HAM (101) (arb)).

III. The Rules for Constructing Fares

It should be understood that the fare construction computer system is programmed to perform fare construction in accordance with fare construction rules. The embodiments described here perform fare construction in accordance with the fare construction rules described herein. The fare construction computer system can be programmed to perform fare construction according to an alternative rule set without departing from the spirit and scope of the present invention.

Reference is made to the following documents, the disclosures of which are incorporated by reference here as if fully stated here for all purposes: 1) *International Fares System: Introduction to Constructed Fares*, ATPCO (1998); 2) *Fare Construction Process*, ATPCO (1992); 3) *International Passenger Fares Data Subscription Service*, ATPCO (August, 1994); 4) *International Passenger Arbitrary Data Subscription Service*, ATPCO (June, 1993); and (5) *International Passenger Construction Data Tables Subscription Service*, ATPCO (November 1994).

A glossary of travel industry terms regarding fare construction is provided in Appendix A hereto.

A. Constructing Validated Candidate Constructed Fares

Fares are constructed according to certain consistency rules that ensure that the subject Qualifying Arbitrary and Qualifying Published Fare Components can properly be combined. Fare Matching Criteria and Zone Applicability Criteria are among the rules used to create valid constructed fare. Fare Matching Criteria and Zone Applicability Criteria are enforced by the present invention using specific selection rules and data structure construction rules. Fares that will not meet these basic rules are not permanently constructed or saved in any way. Candidate Constructed Fares are referred to herein in the context of the present invention as meaning a proposed three-piece constructed fare that would be comprised of a Qualifying Origin Arbitrary Fare, a Qualifying Published Fare, and a Qualifying Destination Arbitrary Fare. The rules as described below are applied to the characteristics of the Qualifying Origin Arbitrary Fare, a Qualifying Published Fare, and a Qualifying Destination Arbitrary Fare contributing to a proposed Candidate Constructed Fare. If the proposed Candidate Constructed Fare meets all of the rules, then the fare is constructed and is referred to herein as a Validated Candidate Constructed Fare.

1. Fare Matching Criteria

Fare Matching Criteria are analyzed to determine whether or not particular Qualifying Arbitrary Fare Components and Qualifying Published Fare Components can be combined at a particular Combination Point. Fare Matching Criteria include: Primary Match Criteria, Fare Class Combinability Rules, OW/RT (Outward/Return) Flags, and Directionality Rules.

a. Primary Match Criteria

At each combination point, Published and Arbitrary Fare Components must match according to both Tariff (by cross-reference) and Carrier.

b. Fare Class Combinability Rules

The fare class of each component is checked to see if the combination is allowed. Fare classes can combine in one of three ways:

Exact match: The fare class code of the Arbitrary Fare Component must match the fare class code of the Published Fare Component exactly.

Bucket match: One or more Bucket Fare Codes (or simply, "Bucket Fare") can be associated with an Arbitrary Fare Component. Bucket Fares are both Tariff and Carrier specific. Accordingly, Bucket Fares can be different for different Tariff/Carrier combinations. A Bucket Fare is designated by a letter followed by 5 asterisks. An example of a Bucket Fare is "T***". A list of Fare class codes is associated with each Bucket Fare. For instance, for a particular Arbitrary Fare Component, the Bucket Fare "T***" may have listed with it the Fare class codes "F" and "Y". If any of the Fare class codes listed under the Bucket Fare associated with the Arbitrary Fare Component match the Fare class code of the Published Fare, then the Arbitrary Fare and the Published Fare can be combined.

Generic match: A Generic Fare Code (or simply, "Generic Fare") can be associated with an Arbitrary Fare Component. Generic Fares are both Tariff and Carrier specific. Accordingly, Generic Fares can be different for different Tariff/Carrier combinations. A Generic Fare is designated by 6 asterisks (also as "6*"). A list of Fare class codes is associated with any Generic Fare associated with a particular Arbitrary Fare Component. For instance, for a particular Arbitrary Fare Component, the Generic Fare "6*" may have listed with it the Fare class codes "M" and "Y". The Arbitrary Fare Component with the Generic Fare is associated can combine with any Published Fare except for those Fare class codes listed in the Generic Fare class code list. That is, if the Published Fare has a Fare class code that is one of those Fare class codes listed under the Generic Fare associated with the Arbitrary Fare Component, then the Arbitrary Fare and the Published Fare can not be combined; otherwise, the two fare components can be combined.

A proposed Candidate Constructed Fare that would not satisfy one of the match rules listed above is not constructed.

c. OW/RT Flags

The Candidate Constructed Fare's components are checked to ensure that the OW/RT (One-way/Round-trip) flags are compatible across all components. Compatibility is defined as an exact match. That is, if there is not an exact match between the OW/RT flag of a Qualifying Arbitrary Fare Component and the OW/RT flag of a Qualifying Published Fare Component of a proposed Candidate Constructed Fare, then the Candidate Constructed Fare is not constructed.

d. Directionality Rules

A Candidate Constructed Fare is analyzed according to the directionality rules described below. Directionality rules use data related to an Arbitrary Fare Component referred to as the Arbitrary's "Footnote." An Arbitrary's Footnote can have the value of blank, "T" (To), or "F" (From). An Arbitrary's Footnote is used to describe the directionality of that particular Arbitrary Fare Component for a particular Origin/Destination city pair. Consider for instance the O/D city pair of Tulsa, Okla. and Omaha, Nebr. The Tulsa-Omaha O/D example is used herein for illustrative purposes and is in no way any limitation of the invention. The O/D for these two cities can be expressed as "OMA TUL". For the purpose of this example, it is assumed that there is one Arbitrary Fare Component for travel from Omaha to Tulsa on a particular carrier and a second Arbitrary Fare Component for travel from Tulsa to Omaha on the same carrier. The O/D for both the first and second Arbitrary Fare Components can be expressed as "OMA TUL." The Arbitrary's Footnote for the first Arbitrary Fare Component can be set to "F" to designate that the directionality of the component applies on travel from Omaha to Tulsa. Conversely, the Arbitrary's Footnote for the second Arbitrary Fare Component can be set to "T" to designate that the directionality of the component applies on travel from Tulsa to Omaha.

Some of the Directionality rules require that the Arbitrary's Footnote be compared to data associated with a Qualifying Published Fare Component known as the Published Fare Component's "Directionality Indicator." A Qualifying Published Fare Component's Directionality Indicator may have the value of "T" or "F."

Directionality analysis also examines whether or not a Published Fare Component's Origin is the Combination Point for the particular Qualifying Arbitrary Fare Component and the Qualifying Published Fare Component being analyzed. That is, building on the above OMA TUL example, the ultimate travel objective is to start travel in Tulsa, Okla., travel to Frankfurt, German through Omaha Nebr., and return to Tulsa from Frankfurt via Omaha. Both the Tulsa-Omaha-Frankfurt and the Frankfurt-Omaha-Tulsa legs of the journey can be expressed using only two O/E) pairs: "OMA TUL" and "OMA FRA". The Tulsa-Omaha-Frankfurt leg can be expressed with the "OMA TUL" and "OMA FRA" O/D pair where the Published Fare for OMA FRA has a Directionality Indicator equal to "F", the Arbitrary Fare for OMA TUL has a Footnote value equal to "T" or blank, and where OMA is the "Combination Point" for both the Arbitrary Fare and the Published Fare being analyzed.

The Directionality Rules are as follows:

If the Qualifying Arbitrary's Footnote is blank, then the Qualifying Arbitrary Fare Component can be combined with any Qualifying Published Fare Component, regardless of the value of the Qualifying Published Fare Component's Directional Indicator.

If the Qualifying Arbitrary's Footnote is equal to "T", and if the Qualifying Published Fare Component's Origin is the Combination Point for that Qualifying Arbitrary, then the Qualifying Published Component's Indicator must be equal to "F".

If the Qualifying Arbitrary's Footnote is equal to "T", and if the Qualifying Published Fare Component's Origin is not the Combination Point for that Qualifying Arbitrary, then the Qualifying Published Component's Indicator must be equal to "T".

If the Qualifying Arbitrary's Footnote is equal to "F", and if the Qualifying Published Fare Component's Origin is the Combination Point for that Qualifying Arbitrary, then the Qualifying Published Component's Indicator must be equal to "T".

If the Qualifying Arbitrary's Footnote is equal to "F", and if the Qualifying Published Fare Component's Origin is not the Combination Point for that Qualifying Arbitrary, then the Qualifying Published Component's Indicator must be equal to "F".

Figure 2:
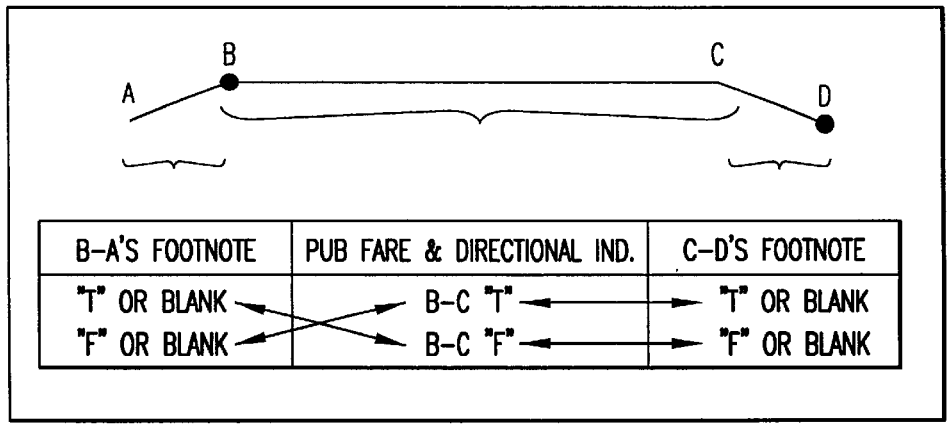
FIG. 2 is a diagram depicting general directionality rules.
Figure 3:
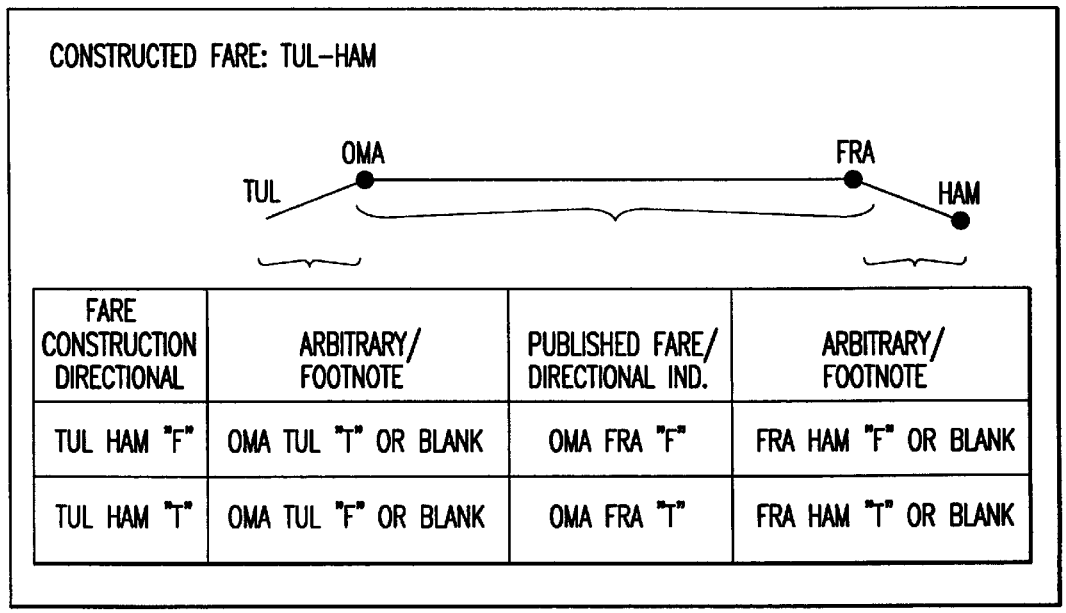
FIG. 3 is a diagram depicting the directionality rules as applied to a specific example for a trip from Tulsa Okla. to Hamburg Germany.

FIG. 2 is a diagram depicting the general directionality rules described above. FIG. 3 is a diagram depicting the directionality rules as applied to a specific example for a trip from Tulsa Okla. to Hamburg Germany. The Tulsa-Hamburg O/D example is used herein for illustrative purposes and is in no way any limitation of the invention.

If the proposed Candidate Constructed Fare does not meet one of the above-described directionality rules, then it is not constructed.

2. Zone Applicability Criteria

A proposed Candidate Constructed Fare's Qualifying Arbitrary Fare Components are tested for zone applicability according to the relevant Construction Points. If a Qualifying Arbitrary Fare Component is not zone applicable, then the proposed Candidate Constructed Fare is not constructed. Zone applicability is defined as follows:

A number is used to designate a particular zone. Each Qualifying Arbitrary Fare Component is assigned a particular zone. Each city is assigned a list of zones to which it belongs. The zone designated for a particular Qualifying Arbitrary Fare Component must match one of the zones listed for the ultimate destination city.

Figure 4:
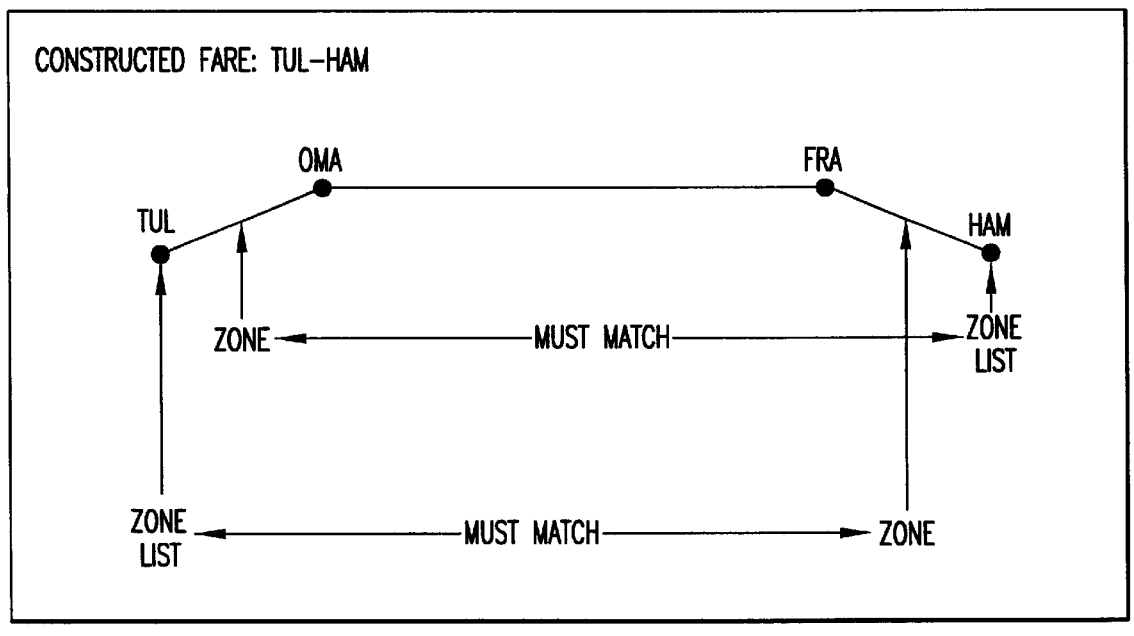
FIG. 4 is a diagram depicting the relationship of Zones and Zone Lists for an example provided herein describing a fictional journey from Tulsa Okla. to Hamburg Germany.

FIG. 4 is a diagram depicting the relationship of Zones and Zone Lists for an example journey from Tulsa Okla. to Hamburg Germany. As is depicted in FIG. 4, the Zone for the Qualifying Arbitrary Fare Component for OMA TUL is tested for a match with a Zone in the Zone List for the ultimate destination city, in this case Hamburg Germany. Similarly, as is also depicted in FIG. 4, the Zone for the Qualifying Arbitrary Fare Component for FRA HAM is tested for a match with a Zone in the Zone List for the ultimate destination city, in this case Tulsa Okla. A round-trip fare is constructed in the example depicted in FIG. 4. Accordingly, if both matches tested above are not found, the particular proposed Candidate Constructed Fare is not constructed.

B. Processing Validated Candidate Constructed Fares

By applying the rules described above during the fare construction process, only meaningful fares ("Validated Candidate Constructed Fare") are constructed. Validated Candidate Constructed Fares then undergo certain adjustments so that the resulting fare is usable. Adjustments include converting currency and adjusting effectivity periods for each Candidate Constructed Fare based upon the Effectivity Periods of the constituent fare components.

1. Converting Currencies

If the fare components of a Validated Candidate Constructed Fare are in the same currency, then the fare amounts can be summed without further conversion. Otherwise, if any of the fare components have been filed in different currencies, all of the fare components are converted to Neutral Units of Currency, added together, then converted back to the currency of the published component.

2. Adjusting Effective Dates

Effectivity period for Validated Candidate Constructed Fares must be adjusted if appropriate. Certain rules apply for adjusting the effectivity period for any Validated Candidate Constructed Fare:

If the last travel date of any fare component is earlier than its discontinue date, then the discontinue date is adjusted to match the last travel date.

The discontinue date of a Validated Candidate Constructed Fare is equal to the earliest discontinue date of any included fare component.

The effective date of a Validated Candidate Constructed Fare is equal to the latest effective date of any included fare component.

Figure 5:
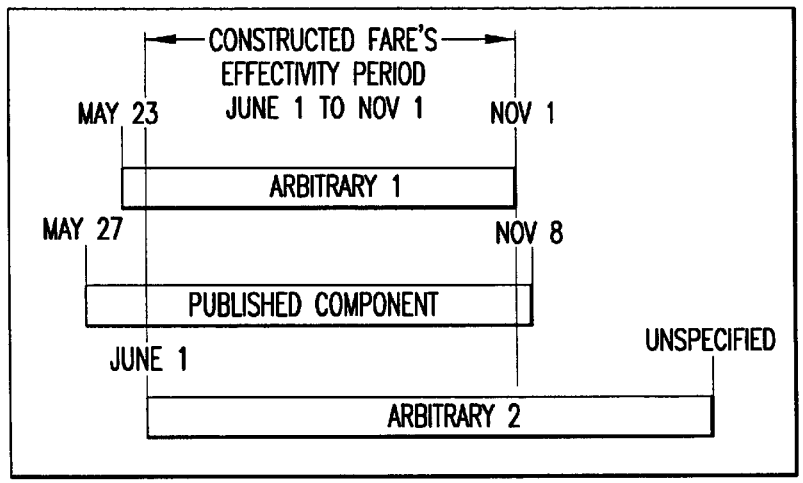
FIG. 5 is a diagram that depicts the effects of adjusting the effectivity period of an example Candidate Constructed Fare that includes two Arbitrary Fare Components and a Published Fare Component.

FIG. 5 is a diagram that depicts the effects of adjusting the effectivity period of an example three-piece construction Validated Candidate Constructed Fare that includes two Arbitrary Fare Components (1 and 2) a Published Fare Component.

3. Assigning Fare Attributes

The Validated Candidate Constructed Fare is assigned several attributes of the published component (the "Assigned Attributes"), including, but not limited to: carrier, fare amount, currency, fare class code, routing, directional indicator, OW/RT flags, footnotes and effectivity dates. The appropriate tariff is obtained by a tariff cross-reference table or hash table.

C. Consolidating Processed Validated Candidate Constructed Fares

The collection of Processed Validated Candidate Constructed Fares for each origin/destination pair are consolidated into a minimum number of fares that most accurately define the cost of travel for all defined periods of sale. Consolidation eliminates duplicate and equivalent Processed Validated Candidate Constructed Fares, and adjusts Effectivity Periods to account for overlapping Processed Validated Candidate Constructed Fares. The goal of this type of consolidation is to ensure that no more than one constructed fare is defined for each O/D, tariff, fare class, one-way/round-trip, directionality and tariff on any one sale date.

1. Eliminating Fares

As depicted in FIG. 1a, the collection of Processed Validated Candidate Constructed Fares is reduced to eliminate redundancy and to apply certain preference rules to equivalent fares (9). For this purpose, two Processed Validated Candidate Constructed Fares are considered to be equivalent if both fares have the same tariff, carrier, fare class, market, directionality, OW/RT flag, routing and effectivity dates. All components of two Processed Validated Candidate Constructed Fares must match routings for the routing to be considered matched.

Accordingly, elimination requires that duplicate Processed Validated Candidate Constructed Fares be removed. Two Validated Candidate Constructed Fares are considered duplicates if all constructed fare fields are equal, and if they are constructed from the same classes of Arbitrary Fares (specific, bucket or generic).

If two Processed Validated Candidate Constructed Fares are equivalent, the costlier fare is eliminated. Processed Validated Candidate Constructed Fares remaining may therefore be equivalent except for differences in the classes of Qualifying Arbitrary Fare Components.

Processed Validated Candidate Constructed Fares constructed from specific fare class code Qualifying Arbitrary Fare Components take precedence over otherwise equivalent fares constructed from Bucket Fare or Generic Fare Qualifying Arbitrary Fare Components. Accordingly, where there are Processed Validated Candidate Constructed Fares constructed from specific fare class code Qualifying Arbitrary Fare Components equivalent to one or more Processed Validated Candidate Constructed Fares constructed from Bucket Fare or Generic Fare Qualifying Arbitrary Fare Components, the equivalent Processed Validated Candidate Constructed Fares constructed from Bucket Fare or Generic Fare Qualifying Arbitrary Fare Components are eliminated.

Processed Validated Candidate Constructed Fares constructed from Bucket Fare Qualifying Arbitrary Fare Components take precedence over otherwise equivalent fares constructed from Generic Fare Qualifying Arbitrary Fare Components. Accordingly, where there are Processed Validated Candidate Constructed Fares constructed from Bucket Fare Qualifying Arbitrary Fare Components equivalent to one or more Processed Validated Candidate Constructed Fares constructed from Generic Fare Qualifying Arbitrary Fare Components, the equivalent Processed Validated Candidate Constructed Fares constructed from Generic Fare Qualifying Arbitrary Fare Components are eliminated.

Processed Validated Candidate Constructed Fares constructed from only two components take precedence over equivalent Processed Validated Candidate Constructed Fares constructed from three components. Accordingly, where there is a Processed Validated Candidate Constructed Fare constructed from only two components equivalent to one or more Processed Validated Candidate Constructed Fares constructed from three components, the Processed Validated Candidate Constructed Fares constructed from three components are eliminated.

2. Adjusting Effectivity Periods

Figure 6:
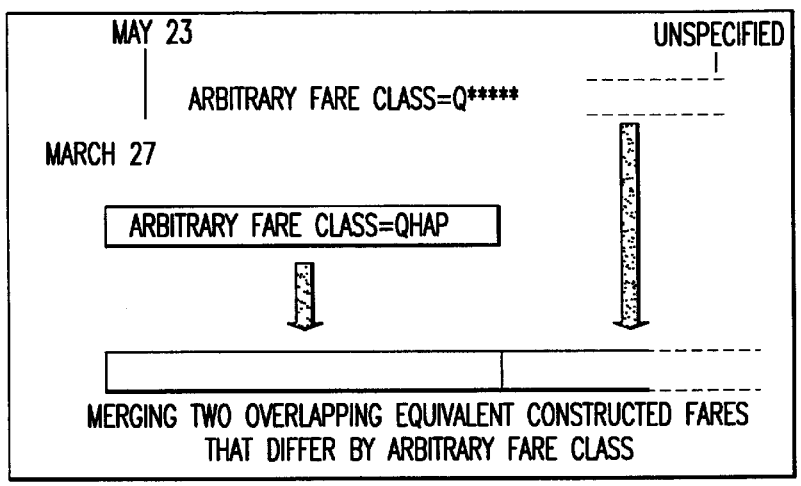
FIG. 6 is a diagram depicting the merging of equivalent Validated Candidate Constructed Fares to construct Validated Candidate Constructed Fares with non-overlapping effectivity periods resulting in what is known as a "clipped fare."
Figure 7:
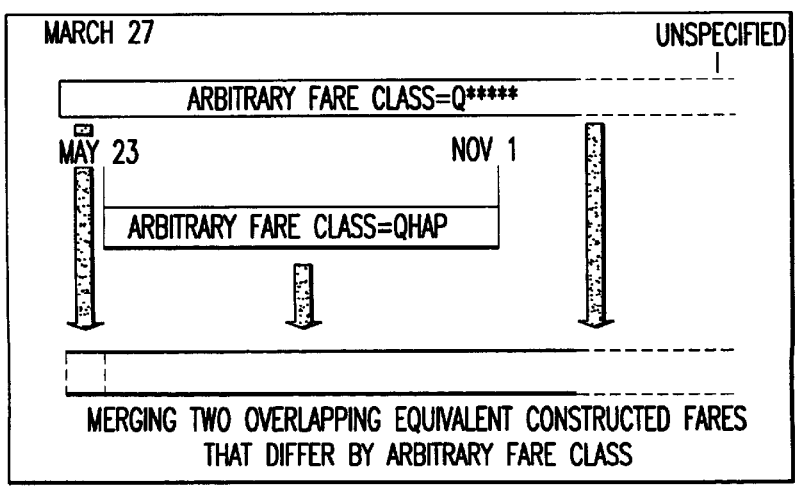
FIG. 7 is a diagram depicting the merging of equivalent Validated Candidate Constructed Fares to construct Validated Candidate Constructed Fares with non-overlapping effectivity periods resulting in what is known as a "split fare."

After applying the elimination rules described above, equivalent Processed Validated Candidate Constructed Fares remain which differ in effectivity dates. Processed Validated Candidate Constructed Fares with overlapping effective dates with equivalent Processed Validated Candidate Constructed Fares are merged and then broken into Processed Validated Candidate Constructed Fares with non-overlapping effectivity periods. FIGS. 6 and 7 are diagrams depicting the merging of equivalent Processed Validated Candidate Constructed Fares to construct Processed Validated Candidate Constructed Fares with non-overlapping effectivity periods. FIG. 6 depicts such a merge that results in what is known as a "clipped fare." FIG. 7 depicts such a merge that results in what is known as a "split fare."

D. Consolidating Constructed Fares and Published Fares

Consolidation eliminates Processed Validated Candidate Constructed Fares which are equivalent to Qualifying Published Fares. A Processed Validated Candidate Constructed Fare is considered equivalent to a Qualifying Published Fare if both fares have the same tariff, carrier, fare class, market, directionality, OW/RT flag and routing for the exact effectivity date range; all components of a Processed Validated Candidate Constructed Fare must match the routing of the Qualifying Published Fare in order for the routings to be considered "matched."

If the effective date period for a Processed Validated Candidate Constructed Fare exactly overlaps the effectivity period for a Qualifying Published Fare, then the Processed Validated Candidate Constructed Fare is eliminated. However, if the Processed Validated Candidate Constructed Fares is effective for any period of time for which the Qualifying Published Fare is not effective, then the effectivity period for the Processed Validated Candidate Constructed Fare is adjusted to be effective only for those periods of time when the Qualifying Published Fare is not effective. Where necessary, the Processed Validated Candidate Constructed Fare is broken into multiple new Processed Validated Constructed Fares which do not overlap the effectivity periods of an, equivalent Qualifying Published Fare.

The fare amount of a Processed Validated Constructed Fare is the sum of the amounts of its Fare Components.

IV. Fare Categorization and the Matrix Method of Fare Combinability—Applying Fare Combinability Rules Using Integer Matrix Multiplication A. Fare Categorization—Building the Fare Combinability Matrices The fare construction computer system is programmed to read fare data into memory. The computer is programmed to convert fare data, if necessary, such as from EBCIDIC to ASCII. The computer is further programmed to store the fare data into a memory-resident database and/or into memory-resident arrays and hash tables. The fare data read and stored in this manner includes published fares, arbitrary fares, rules files, footnote files, and construction table data, including but not limited to Fare class information, zone information, and currency conversion information. In one embodiment, the computer is programmed to concurrently read and convert this data as necessary in parallel threads.

In one embodiment of the Matrix Method of Fare Combinability, fare class codes for the arbitrary fare components and the published fare components are used to construct the initial screening dimension matrices, referred to herein as Fare Class Combinability Matrices. In one embodiment of the Matrix Method of Fare Combinability, once the Gateway Cities for a specified Origin/Destination have been identified, matrices for the appropriate Arbitrary blare Components and Published Fare Components for each selected Gateway City pair can be built. The fare construction computer system is programmed to build the matrices of Arbitrary Fare Components and Published Fare Components in such a way that the structure and contents of the matrices adhere to the rules of fare combinability and construction.

It should be noted that in alternative embodiments of the Matrix Method of Fare Combinability, a fare element other than fare class code is selected to be used to construct the initial screening dimension Fare Class Combinability Matrices. For instance, directionality or zone applicability for the Arbitrary Fare Components and Published Fare Components can be used to construct the initial screening dimension Fare Class Combinability Matrices.

Figure 1F:
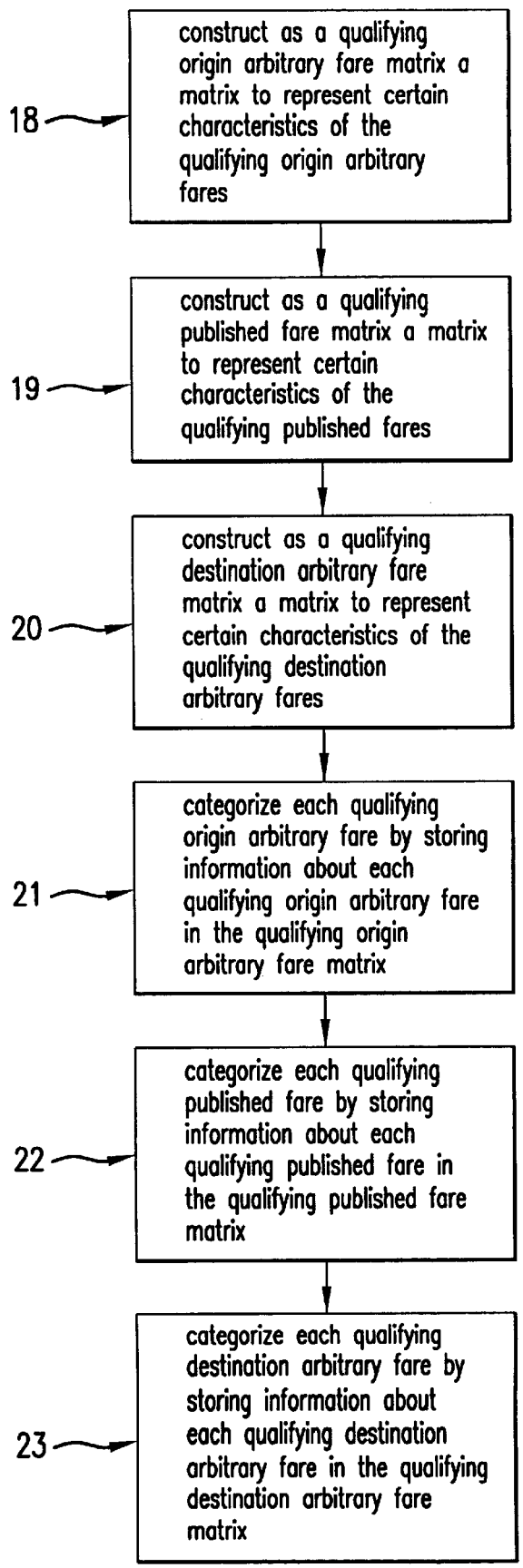
FIG. 1f is a flow diagram depicting one embodiment of the functions involved in Fare Categorization.

One embodiment of Fare Categorization (6) for the Matrix Method of Tare Categorization and Fare Construction is depicted in overview in FIGS. 1a and 1c. One embodiment of Fare Categorization is depicted in more detail in FIG. 1f. As depicted in FIG. 1f, the computer constructs as a qualifying origin arbitrary fare matrix a matrix to represent certain characteristics of the qualifying origin arbitrary fares (18). The computer also constructs as a qualifying published fare matrix a matrix to represent certain characteristics of the qualifying published fares (19). The computer further constructs as a qualifying destination arbitrary fare matrix a matrix to represent certain characteristics of the qualifying destination arbitrary fares (20). The computer categorizes each qualifying origin arbitrary fare by storing information about each qualifying origin arbitrary fare in the qualifying origin arbitrary fare matrix (21). The computer also categorizes each qualifying published fare by storing information about each qualifying published fare in the qualifying published fare matrix (22). As depicted in FIG. 1f, the computer also categorizes each qualifying destination arbitrary fare by storing information about each qualifying destination arbitrary fare in the qualifying destination arbitrary fare matrix (23).

Figure 1G:
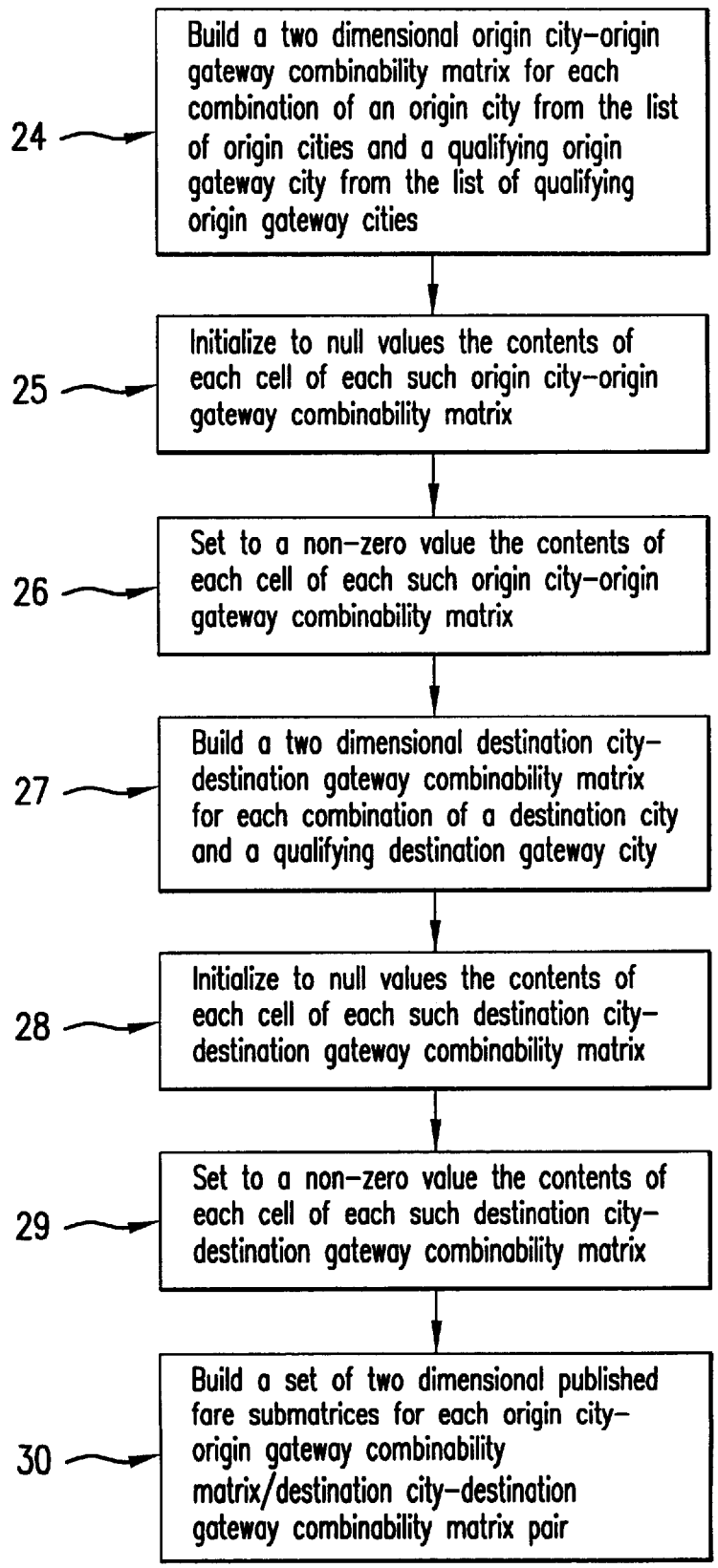
FIG. 1g is flow diagram depicting a second embodiment of the functions involved in Fare Categorization.

FIG. 1g is flow diagram depicting a second embodiment of Fare Categorization in more detail. As depicted in FIG. 1g, the computer builds a two dimensional origin city-origin gateway combinability matrix for each combination of an origin city from the list of origin cities and a qualifying origin gateway city from the list of qualifying origin gateway cities (24). The origin city-origin gateway combinability matrix comprises a row for each arbitrary fare class for travel between the particular origin city and the particular qualifying origin gateway city. The origin city-origin gateway combinability matrix further comprises a column for each specific fare class for each qualifying published fare from a list of qualifying published fares that applies to travel.

As is further depicted in FIG. 1g, the computer initializes to null values the contents of each cell of each such origin city-origin gateway combinability matrix (25). The computer sets to a non-zero value the contents of each cell of each such origin city-origin gateway combinability matrix (26). The index for the row of the cell is an arbitrary fare class for travel between the particular origin city that is combinable with the specific fare class for qualifying published fares that is the index for the column of that cell.

As is farther depicted in FIG. 1g, the computer builds a two dimensional destination city-destination gateway combinability matrix for each combination of a destination city and a qualifying destination gateway city (27). The destination city-destination gateway combinability matrix comprises a row for each arbitrary fare class for travel between the particular destination city and the particular qualifying destination gateway city and further comprises a column for each specific fare class for qualifying published fares.

As depicted in FIG. 1g, the computer initializes to null values the contents of each cell of each such destination city-destination gateway combinability matrix (28). The computer also sets to a nor-zero value the contents of each cell of each such destination city-destination gateway combinability matrix (29). The index for the row of the cell is an arbitrary fare class for travel between the particular destination city that is combinable with the specific fare class for qualifying published fares that is the index for the column of that cell.

As is further depicted in FIG. 1g, the computer builds a set of two dimensional published fare submatrices for each origin city-origin gateway combinability matrix/destination city-destination gateway combinability matrix pair (30). Each set of submatrices comprises a two dimensional submatrix for each fare class for which a qualifying published fare exists for travel between the qualifying origin gateway and the qualifying destination gateway. The indices for the rows of each two dimensional submatrix are the qualifying published fare fare class codes that exist for travel between the qualifying origin gateway and the qualifying destination gateway. The indices for the columns of each two dimensional submatrix are the qualifying published fare fare class codes that exist for travel between the qualifying origin gateway and the qualifying destination gateway. The contents of each cell of each two dimensional submatrix is initialized to null values except that the contents of the nth row and nth column of the nth submatrix is set to a non-zero value if a qualifying published fare exists for travel for the fare class code that is the index of both the nth row and the nth column of the nth submatrix Embodiments of the Matrix Method of Fare Combinability described here use an Origin City/Destination City pair as an implicit dimension of the Fare Class Combinability Matrices. In alternative embodiments, other fare class data elements, e.g., directionality, are used as an implicit dimension of the Fare Class Combinability Matrices.

Building Combinability Matrices for Selected Example Gateway Cities

To illustrate the building of Combinability Matrices, the Tulsa/Hamburg example Origin/Destination is continued. Continuing the Tulsa/Hamburg example, the fares to be constructed for travel between Tulsa (100) and Hamburg (101) through the Gateway Cities of Omaha (105) and Frankfurt (107) will be examined.

The Arbitrary Fare Classes between Tulsa and Omaha, and between Frankfurt and Hamburg are first identified. For purposes of the example, it is assumed that the possible specific fare classes are "F", "C", "M", and "Y". For purposes of the example, the Specific Arbitrary Fare Classes between Tulsa and Omaha are "F", "C", "M", and "Y".

Table 1 below depicts example Generic and Bucket Arbitrary Fare Classes for travel between Tulsa and Omaha. The first row of Table 1 depicts the Generic ("6*") Arbitrary Fare Class and the Bucket ("F*" and "H*") Arbitrary Fare Classes that apply to travel between Tulsa and Omaha in the example. The column below the Generic Fare ("6*") depicts the published fare classes ("C" and "Y") for the example with which the applicable Arbitrary Fare Component can not be combined. The columns below the Bucket Fares, "F*" and "H*", respectively, depict the published fare classes for the example with which the applicable Arbitrary Fare Component can be combined.

TABLE 1

| 6* | F* | H* |
|----|----|----|
| C  | F  | F  |
| Y  | C  | Y  |
|    | Y  |    |

Table 2 below depicts example Generic and Bucket Arbitrary Fare Classes between Frankfurt and Hamburg. Continue to recall that for purposes of the example, it is assumed that the possible specific fare classes are "F", "C", "M", and "Y". For purposes of the example, there are no Specific Arbitrary Fare Classes between Frankfurt and Hamburg. The first row of Table 2 depicts the Generic ("6*") Arbitrary Fare Class and a Bucket ("T*") Arbitrary Fare Class that apply to travel between Frankfurt and Hamburg in the example. The column below the Generic Fare ("6*") depicts the published fare classes ("M" and "Y") that apply to travel between Frankfurt and Hamburg for the example with which the applicable Arbitrary Fare Component can not be combined. The column below the Bucket Fare, "T*" depicts the published fare classes ("F" and "Y") that apply to travel between Frankfurt and Hamburg for the example with which the applicable Arbitrary Fare Component can be combined.

TABLE 2

| 6* | T* |
|----|----|
| M  | F  |
| Y  | Y  |

For purposes of the example, it is assumed that published fares for fare classes "F", "M", and "Y" exist between Omaha and Frankfurt.

The Arbitrary Fare Class and Published Fare Class sample data is used below for the Tulsa-Hamburg example to build the Combinability Matrices to one embodiment of the present invention.

Table 3 below depicts the Combinability Matrix for the Gateway City Omaha for travel between Tulsa and Omaha in the example. This matrix is referred to herein as Combinability Matrix "F". The Combinability Matrix F uses 1's (or any non-zero value) and 0's to designate which Arbitrary Fare Components that apply to travel between Tulsa and Omaha can be combined with Published Fare Components between Omaha and Frankfurt. It should be understood that the Combinability Matrix F is composed of 1's (or any non-zero value) and 0's only, and that the Fare Classes are titles, for explanatory purposes only. The Combinability Matrix F is built by establishing a row for each Arbitrary Fare Class, beginning with the Generic Class, followed by each Bucket Fare Class, and ending with each possible Specific Fare Class. A column is established for each possible Specific Fare Class.

TABLE 3

|    | F | C | M | Y |
|----|---|---|---|---|
| 6* | 1 | 0 | 1 | 0 |
| F* | 1 | 1 | 0 | 1 |
| H* | 1 | 0 | 0 | 1 |
| F  | 1 | 0 | 0 | 0 |
| C  | 0 | 1 | 0 | 0 |
| M  | 0 | 0 | 1 | 0 |
| Y  | 0 | 0 | 0 | 1 |

As depicted in Table 3 above, according to one embodiment of the Matrix Method of Fare Combinability, the computer is programmed to dimension the Combinability Matrix F for the Origin Gateway City so that matrix has a row for each generic and bucket arbitrary fare classes that apply to travel between the origin city and the origin gateway city and a row for each specific fare class. The computer is programmed to allocate a column for each specific fare class. The computer is then programmed to populate the matrix with zeroes except that the contents of any cell of the matrix that corresponds to the intersection between a generic fare class or bucket fare class and a specific fare class for which the generic fare class or bucket fare class can be combined is set to "1" and/or a non-zero value. Further, the contents of any cell of the matrix that corresponds to the intersection between a possible specific fare class and a fare class for which published fares between the origin city and the origin gateway city exist is, also set to "1" and/or a non-zero value.

In one embodiment, instead of using 1's or just any non-zero value to populate the matrices described herein, the actual fare index is used as the matrix element value (referred to herein as the "Fare Index Embodiment"). Using the Fare Index Embodiment approach carries the added benefit of preserving the identity of the actual fare index during the combination steps. The advantage of the benefit of using a Fare Index Embodiment is that when the combinations are made, the actual fare indices are in hand and can be used to construct the fare. This advantage eliminates the need to trace back through the contributing Combinability Matrices to determine the identity of the contributing actual fare indices.

Table 4 below depicts the Combinability Matrix for the Gateway City Frankfurt for travel between Frankfurt and Hamburg in the example. This matrix is referred to herein as Combinability Matrix "B". Once again, the Combinability Matrix B uses 1's (or any non-zero value) and 0's to designate which Arbitrary Fare Components that apply to travel between Frankfurt and Hamburg can be combined with Published Fare Components between Omaha and Frankfurt. It should be understood that the Combinability Matrix B is composed of 1's (or any non-zero value) and 0's only, and that the Fare Classes are titles for explanatory purposes only. The Combinability Matrix B is built by establishing a row for each Arbitrary Fare Class, beginning with the Generic Class, followed by each Bucket Fare Class, and ending with each possible Specific Fare Class. A column is established for each possible Specific Fare Class.

TABLE 4

|    | F | C | M | Y |
|----|---|---|---|---|
| 6* | 1 | 1 | 0 | 0 |
| T* | 1 | 0 | 0 | 1 |
| F  | 0 | 0 | 0 | 0 |
| C  | 0 | 0 | 0 | 0 |
| M  | 0 | 0 | 0 | 0 |
| Y  | 0 | 0 | 0 | 0 |

As can be seen from the above example, according to one embodiment of the Matrix Method of Fare Combinability, the computer is programmed to build the Combinability Matrix B in a manner similar to that described to build the Combinability Matrix F. As depicted in Table 4 above, according to one embodiment of the Matrix Method of Fare Combinability, the computer is programmed to dimension the Combinability Matrix B for the Destination Gateway City so that matrix has a row for each generic and bucket arbitrary fare classes that apply to travel between the destination city and the destination gateway city and a row for each specific fare class. The computer is programmed to allocate a column for each specific fare class. The computer is then programmed to populate the matrix with zeroes except that the contents of any cell of the matrix that corresponds to the intersection between a generic fare class or bucket fare class and a specific fare class for which the generic fare class or bucket fare class can be combined is set to "1" and/or a non-zero value. Further, the contents of any cell of the matrix that corresponds to the intersection between a possible specific tare class and a fare class for which published fares between the destination city and the destination gateway city exist is also set to "1" and/or a non-zero value.

Next, the computer is programmed to build a third rank matrix that represents the published fares that apply to travel between the two gateway cities. The computer is programmed to dimension the third rank matrix as n X n X n, where "n" is the number of published fares that apply to travel between the two particular gateway cities.

In the example case, a third rank matrix that represents the published fares that apply to travel between Omaha and Frankfurt is built. This third rank matrix will be referred to herein as the Published Fare Matrix "P". Recall that for purposes of this example, it has been assumed that the possible specific fare classes are "F", "C", "M", and "Y" and that published fares for fare classes "F", "M", and "Y" exist between Omaha and Frankfurt. Therefore, in the case of the Omaha/Frankfurt example, this third rank P matrix has dimensions of 4×4×4. Table 5 below represents the first of the Published Fare submatrices for the "F" fare. As depicted in Table 5 below, a Published Fare exists for the "F" fare class for travel between Omaha and Frankfurt.

TABLE 5

|   | F | C | M | Y |
|---|---|---|---|---|
| F | 1 | 0 | 0 | 0 |
| C | 0 | 0 | 0 | 0 |
| M | 0 | 0 | 0 | 0 |
| Y | 0 | 0 | 0 | 0 |

Table 6 below represents the second of these Published Fare submatrices for the "C" fare. As depicted in Table 6 below, no Published Fare exists for the "C" fare class for travel between Omaha and Frankfurt.

TABLE 6

|   | F | C | M | Y |
|---|---|---|---|---|
| F | 0 | 0 | 0 | 0 |
| C | 0 | 0 | 0 | 0 |
| M | 0 | 0 | 0 | 0 |
| Y | 0 | 0 | 0 | 0 |

Table 7, below represents the third of these Published Fare submatrices for the "M" fare. As depicted in Table 7 below, a Published Fare exists for the "M" fare class for travel between Omaha and Frankfurt.

TABLE 7

|   | F | C | M | Y |
|---|---|---|---|---|
| F | 0 | 0 | 0 | 0 |
| C | 0 | 0 | 0 | 0 |
| M | 0 | 0 | 1 | 0 |
| Y | 0 | 0 | 0 | 0 |

Table 8 below represents the fourth of these Published Fare submatrices for the "Y" fare. As depicted in Table 8 below, a Published Fare exists for the "Y" fare class for travel between Omaha and Frankfurt.

TABLE 8

|   | F | C | M | Y |
|---|---|---|---|---|
| F | 0 | 0 | 0 | 0 |
| C | 0 | 0 | 0 | 0 |
| M | 0 | 0 | 0 | 0 |
| Y | 0 | 0 | 0 | 1 |

B. Constructing the Fares

According to one embodiment of the Matrix Method of Fare Combinability, the fare construction computer system is programmed to manipulate and multiply the two Combinability Matrices with the Published Fare Matrix in such a way as to construct allowable fares. Specifically, the computer is programmed to create the Allowable Fare Matrix K by multiplying the Combinability Matrix F times the Published Fares Matrix P times the transpose of the Combinability Matrix B. The computer is programmed to designate the allowable constructed fares by 1's (or any non-zero value) in the Allowable Fare Matrix K.

Matrix algebra involves well known mathematical principles. The principles are described, for example, in Chapter 8 of *Precalculus; Mathematics for Calculus*, James Stewart, Lothar Redlin, Salaem Watson (Brooks/Cole Publishing Company, 3d Edition, 1998), the disclosure of which is incorporated in full herein for all purposes. See also, e.g., *Mathematical Handbook for Scientists and Engineers*, Granino A. Korn, Ph.D., Theresa M. Kern, M. S., (McGraw-Hill, 2d Edition, 1968), Chapters 13 and 14, which are incorporated in full herein for all purposes. FIGS. 9 through 16 are diagrams depicting the mathematical principles involved in treating the Allowable Fare Matrix K for the Tulsa-Hamburg example by multiplying the Combinability Matrix F times the Published Fares Matrix P times the transpose of the Combinability Matrix B.

Figure 1H:
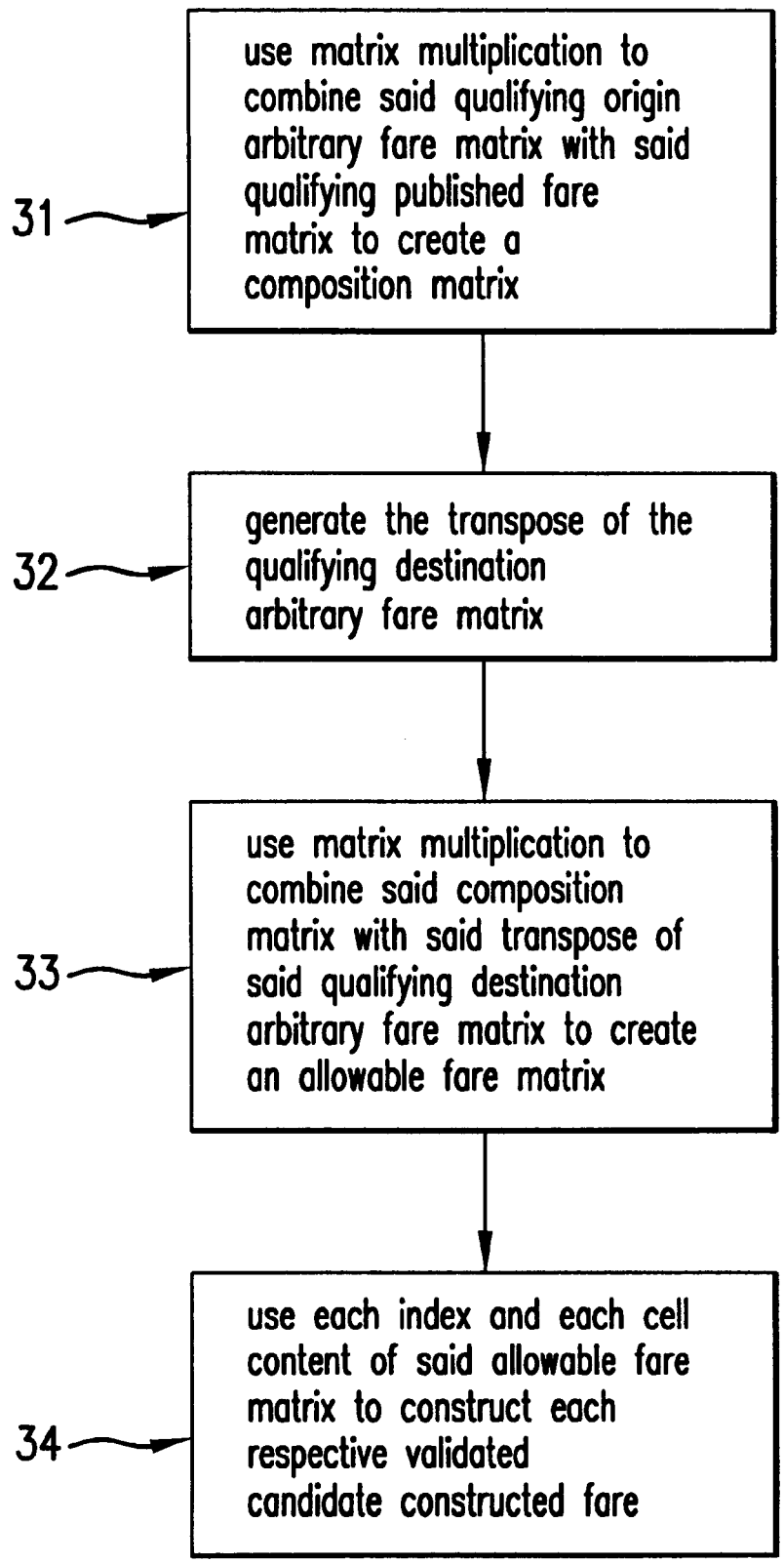
FIGS. 1h is a flow diagram depicting one embodiment of the functions involved in Fare Construction.
Figure 1I:
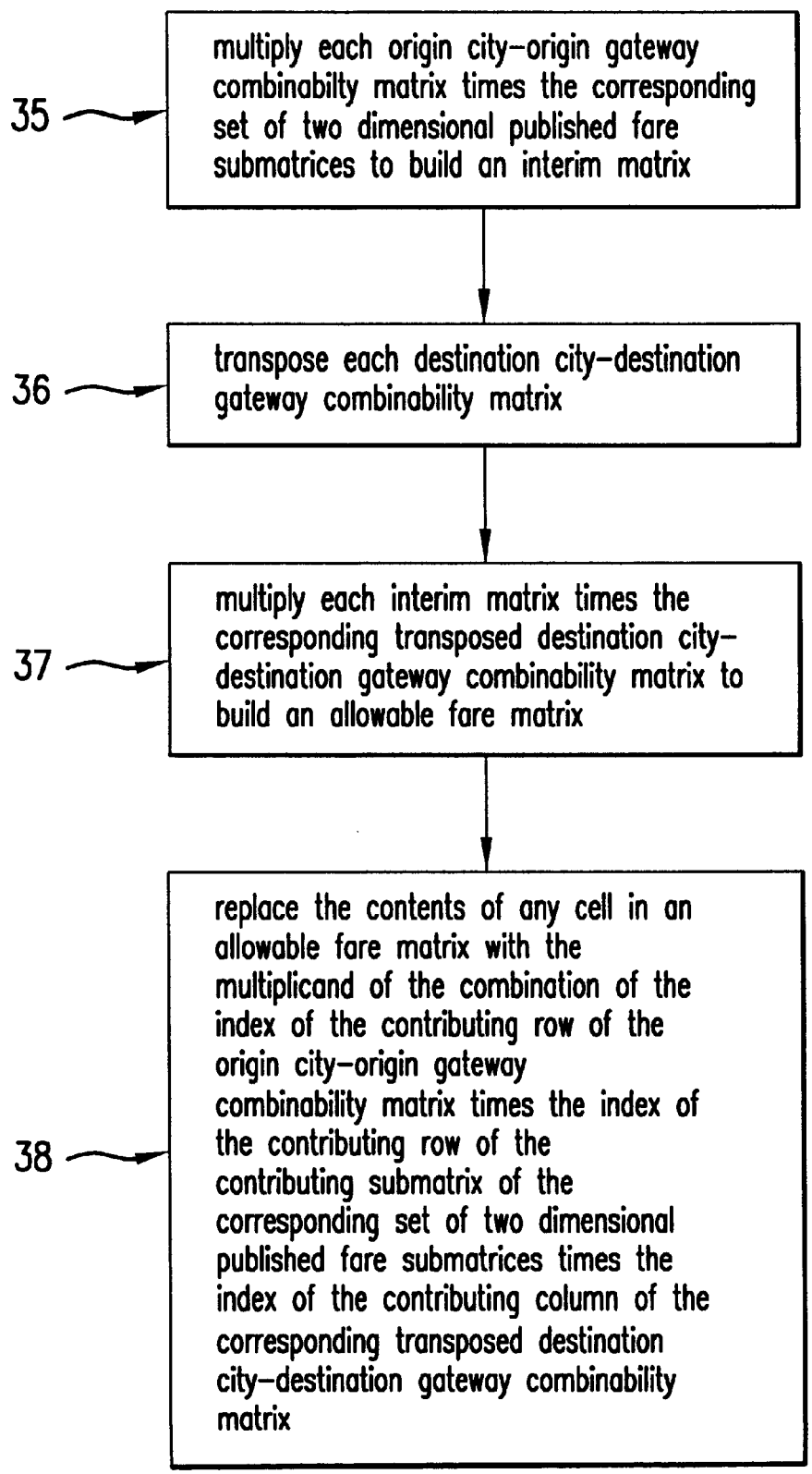
FIGS. 1i is a flow diagram depicting a second embodiment of the functions involved in Fare Construction.

FIGS. 1h and 1i are flow diagrams depicting the functions involved in different embodiments of the Fare Construction function (8) which was in turn depicted in FIGS. 1a and 1c for the Matrix Method of Fare Categorization and Fare Construction.

As depicted in FIG. 1h, to construct fares, the computer uses matrix multiplication to combine said qualifying origin arbitrary fare matrix with said qualifying published fare matrix to create a composition matrix (31). The computer generates the transpose of the qualifying destination arbitrary fare matrix (32). The computer also uses matrix multiplication to combine said composition matrix with said transpose of said qualifying destination arbitrary fare matrix to create an allowable fare matrix (33). The computer further uses each index and each cell content of said allowable fare matrix to construct each respective validated candidate constructed fare (34).

As depicted in FIG. 1i, to construct fares, the computer multiplies each origin city-origin gateway combinability matrix times the corresponding set of two dimensional published fare submatrices to build an interim matrix (35). The computer transposes each destination city-destination gateway combinability matrix (36). The computer also multiplies each interim matrix times the corresponding transposed destination city-destination gateway combinability matrix to build an allowable Fare matrix (37). The computer replaces the contents of any cell in an allowable fare matrix with the multiplicand of the combination of the index of the contributing row of the origin city-origin gateway combinability matrix times the index of the contributing row of the contributing submatrix of the corresponding set of two dimensional published fare submatrices times the index of the contributing column of the corresponding transposed destination city-destination gateway combinability matrix (38).

1. Constructing Usable Fares for the Example a. Building the F·P matrix

The computer is programmed to perform the next step in the construction phase which is to multiply the Combinability Matrix F by the Published Fares Matrix P to create the "F·P" Matrix.

In the Tulsa-Hamburg example then, to build the Allowable Fare Matrix K, the Combinability Matrix F, which in our example has 7 rows and 4 columns, is multiplied by the Published Fares Matrix P, which is a 4×4×4 matrix. The result of that multiplication in the example is a 7×4×4 matrix (that is 7 4×4 matrices), referred to herein as "F·P".

FIGS. 9 through 12 depict the mathematical principles involved in building the F·P matrix. FIG. 9 shows the Combinability Matrix F (200) and the Published Fares Matrix P (1000).

Figure 10:
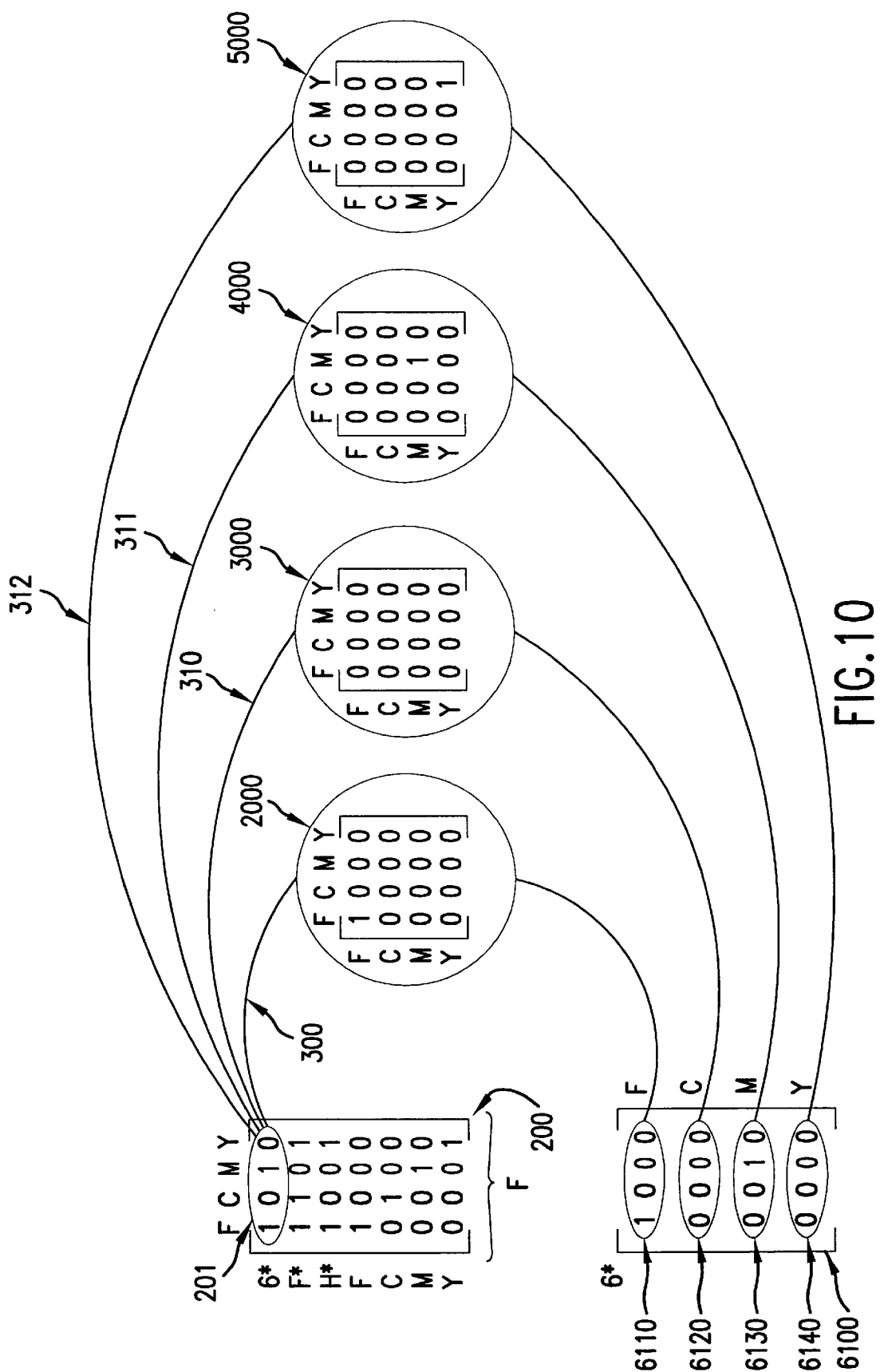
FIG. 10 is a diagram depicting an overview of the multiplication of each row of the Combinability Matrix F times each submatrix of the Published Fares Matrix P to create the rows of the first of seven submatrices of the F·P matrix for the Tulsa/Hamburg example provided herein.
Figure 12:
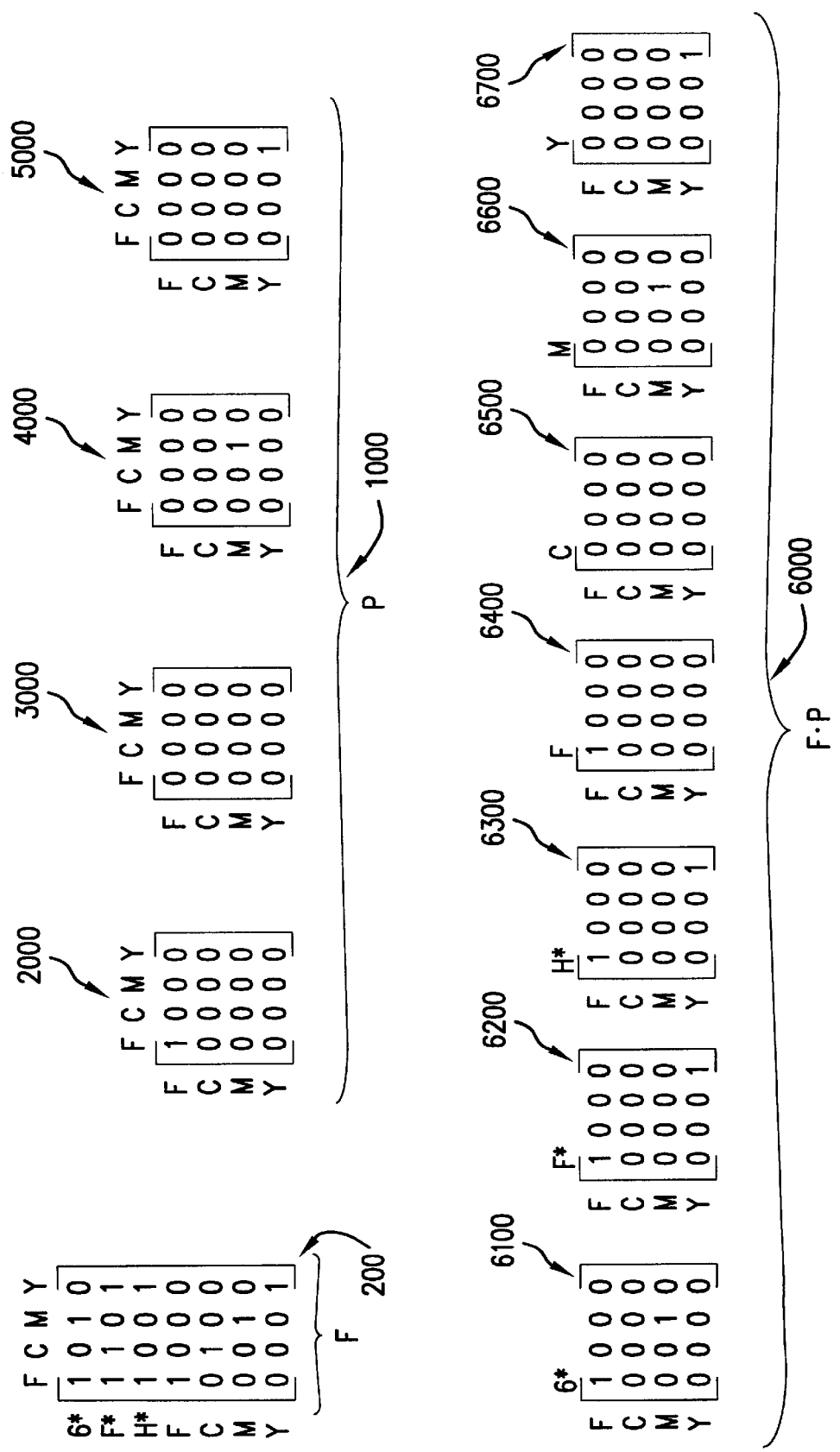
FIG. 12 is a diagram depicting the F·P matrix for the Tulsa/Hamburg example provided herein.

The first submatrix of the resulting seven 4×4 matrices is built by multiplying the first row of the Combinability Matrix F times each of the 4 4×4 Published Fares Matrix P Matrices. The first row of the first submatrix of the resulting seven 4×4 matrices is built by multiplying the first row of the Combinability Matrix F times the first of the 4 4×4 Published Fares Matrix P Matrices. FIG. 10 depicts in an overview the multiplication of each row of the Combinability Matrix F (200) times (300, 310, 311, and 312) each submatrix (2000, 3000, 4000, and 5000) of the Published Fares Matrix P (1000) to create the rows of the first (6100) of seven submatrices (6100, 6200, 6300, 6400, 6500, 6600, and 6700) of the 19 P matrix (6000). The reference numbers (6110, 6120, 6130, 6140) are representative of the respectively listed rows of the first sub-matrix (6100) of the F·P matrix (6000). FIG. 12 depicts the resulting F·P matrix (6000) for the Tulsa/Hamburg example.

Figure 11:
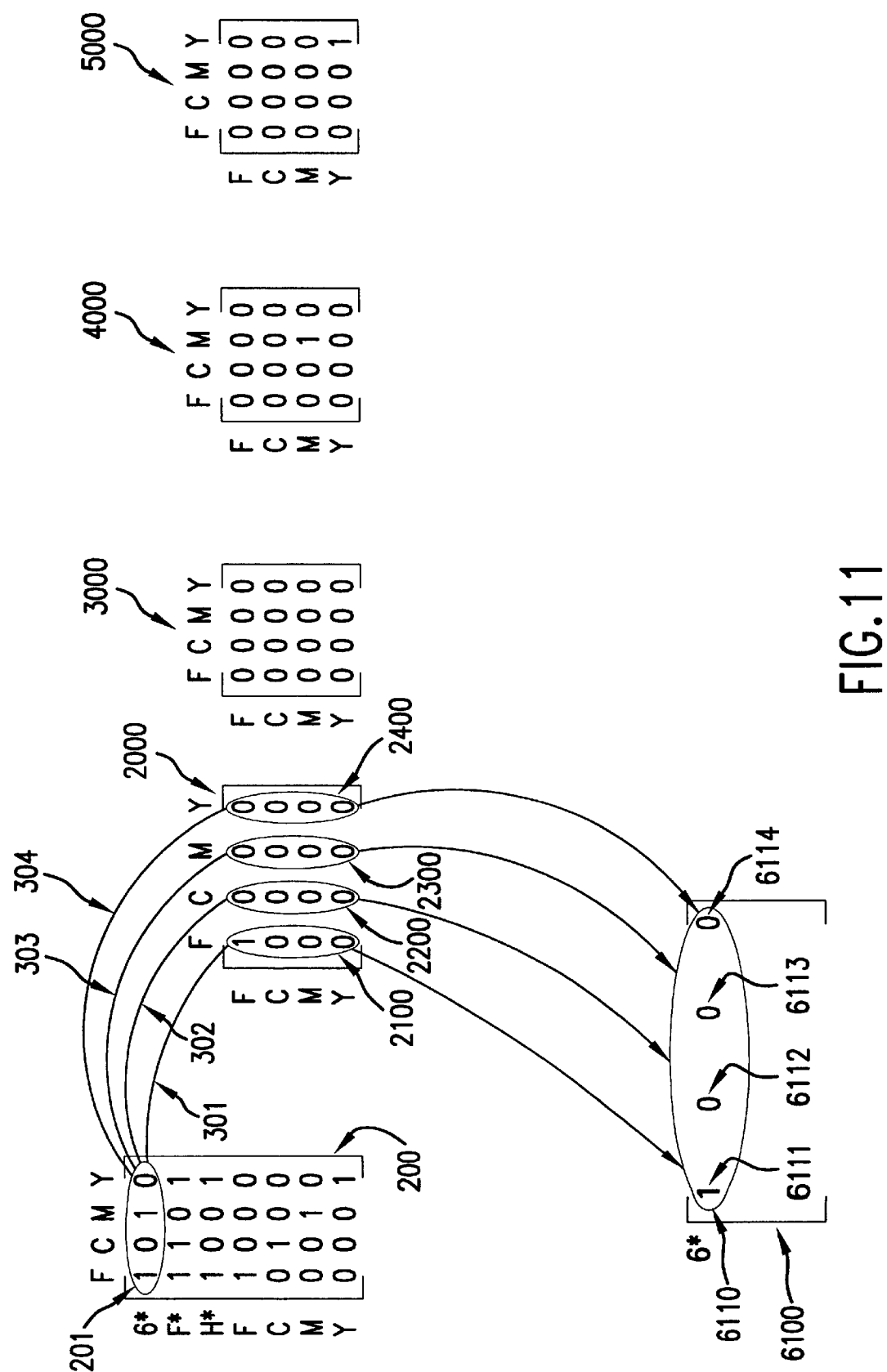
FIG. 11 is a diagram depicting the principles involved in multiplying the first row of the Combinability Matrix F times the first column of the first submatrix of the Published Fares Matrix P resulting in the calculations necessary to create the first element of the first row of the first submatrix of the F·P matrix for the Tulsa/Hamburg example provided herein.

FIG. 11 depicts the principles involved in multiplying the first row (201) of the Combinability Matrix F (200) times (301) the first column (2100) of the first submatrix (2000) of the Published Fares Matrix P (1000) to create the first element (6111) of the first row (6110) of the first submatrix (6100) of the F·P matrix (6000).

Similarly, as depicted in FIG. 11, the first row (201) of the Combinability Matrix F (200) is multiplied (302) by the second column (2200) of the first submatrix (2000) of the Published Fares Matrix P (1000) to create the second element (6112) of the first row (6110) of the first submatrix (6100) of the F·P matrix (6000).

And, similarly, as depicted in FIG. 11, the first row (201) of the Combinability Matrix F (200) is multiplied (303) by the third column (2300) of the first submatrix (2000) of the Published Fares Matrix P (1000) to create the third element (6113) of the first row (6110) of the first submatrix (6100) of the F·P matrix (6000).

Further, as depicted in FIG. 11, the first row (201) of the Combinability Matrix F (200) is multiplied (304) by the fourth column (2400) of the first submatrix (2000) of the Published Fares Matrix P (1000) to create the fourth element (6114) of the first row (6110) of the first submatrix (6100) of the F·P matrix (6000).

b. Building the transpose of the B matrix

Figure 13:
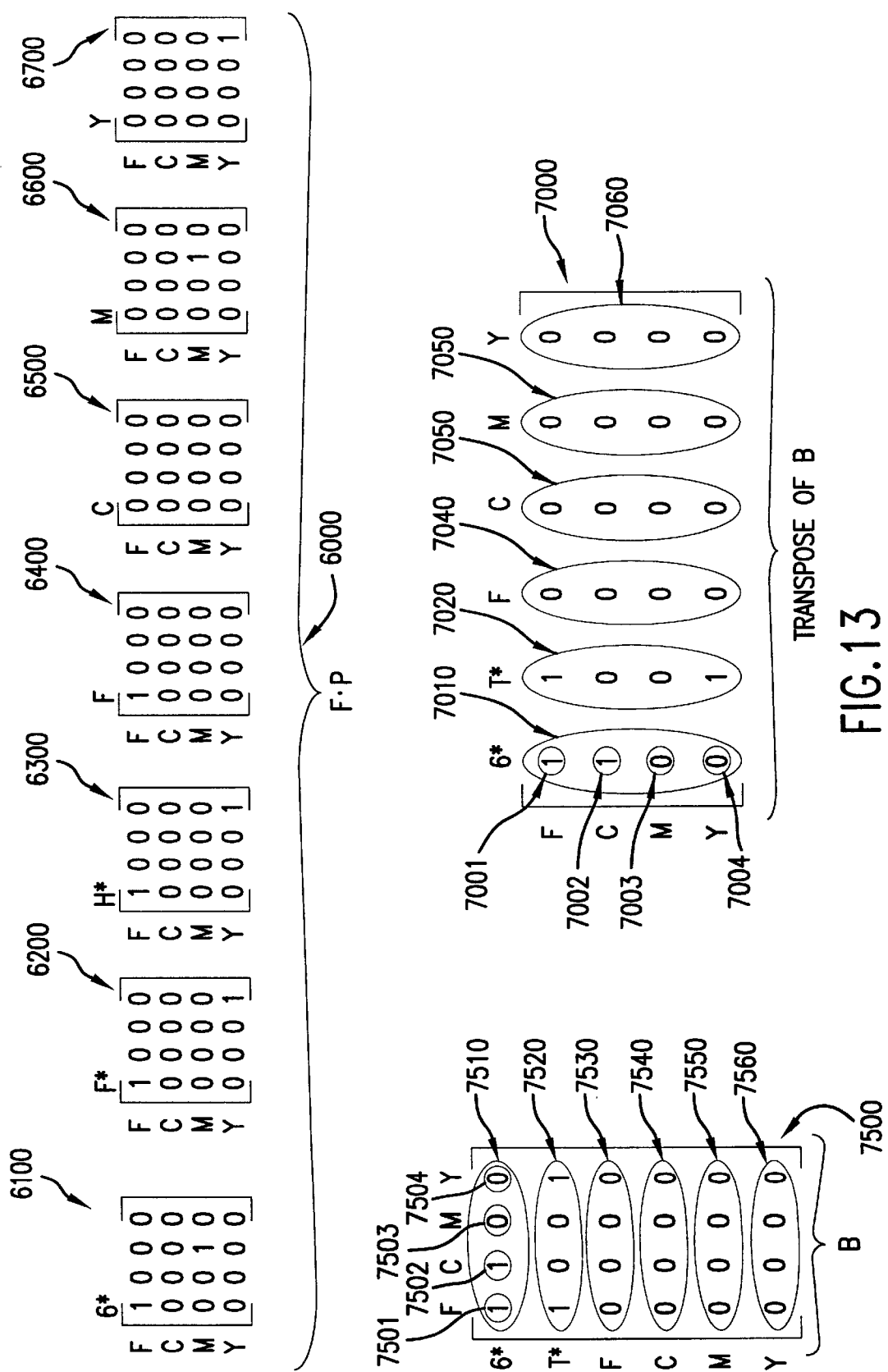
FIG. 13 is a diagram depicting the F·P matrix, the Combinability Matrix B, and the transpose of the Combinability Matrix B for the Tulsa/Hamburg example provided herein.

The computer is programmed to perform the next step in building the Allowable Fare Matrix K which is to build the transpose of the Combinability Matrix B. In the Tulsa/Hamburg example the transpose of the Combinability Matrix B has 4 rows and 6 columns. FIG. 13 is a diagram which depicts the seven submatrices (6100, 6200, 6300, 6400, 6500, 6600, and 6700) of the F·P matrix (6000), the Combinability Matrix B (7500) and the transpose of the Combinability Matrix B (7000).

The way in which the transpose of the Combinability Matrix B (7000) is created is according to well-known mathematical principles. The transpose of the Combinability Matrix B (7000) is created by rearranging the rows and columns of Combinability Matrix B (7500) is a particular way. Namely, the first row (7510) of Combinability Matrix B (7500) becomes the first column (7010) of the transpose of the Combinability Matrix B (7000). The first row (7510) is transposed to the first column (7010)in the following way: the first element (7501) of the first row (7510) of Matrix B (7500) becomes the first element (7001) of the first column (7010) of the transpose of Matrix B (7000); the second element (7502) of the first row (7510) of Matrix B (7500) becomes the second element (7002) of the first column (7010) of the transpose of Matrix B (7000); the third element (7503) of the first row (7510) of Matrix B (7500) becomes the third element (7003) of the first column (7010) of the transpose of Matrix B (7000); and the fourth element (7504) of the first row (7510) of Matrix B (7500) becomes the fourth element (7004) of the first column (7010) of the transpose of Matrix B (7000). In a similar manner, the second row (7520) of Combinability Matrix B (7500) becomes the second column (7020) of the transpose of the Combinability Matrix B (7000); the third row (7530) of Combinability Matrix B (7500) becomes the third column (7030) of the transpose of the Combinability Matrix B (7000); the fourth row (7540) of Combinability Matrix B (7500) becomes the fourth column (7040) of the transpose of the Combinability Matrix B (7000); the fifth row (7550) of Combinability Matrix B (7500) becomes the fifth column (7050) of the transpose of the Combinability Matrix B (7000); and the sixth row (7560) of Combinability Matrix B (7500) becomes the sixth column (7060) of the transpose of the Combinability Matrix B (7000).

c. Building the Allowable Fare Matrix K

The computer is programmed to perform the next step in building the Allowable Fare Matrix K which is to multiply the F·P matrix times the transpose of the Combinability Matrix B.

Figure 14:
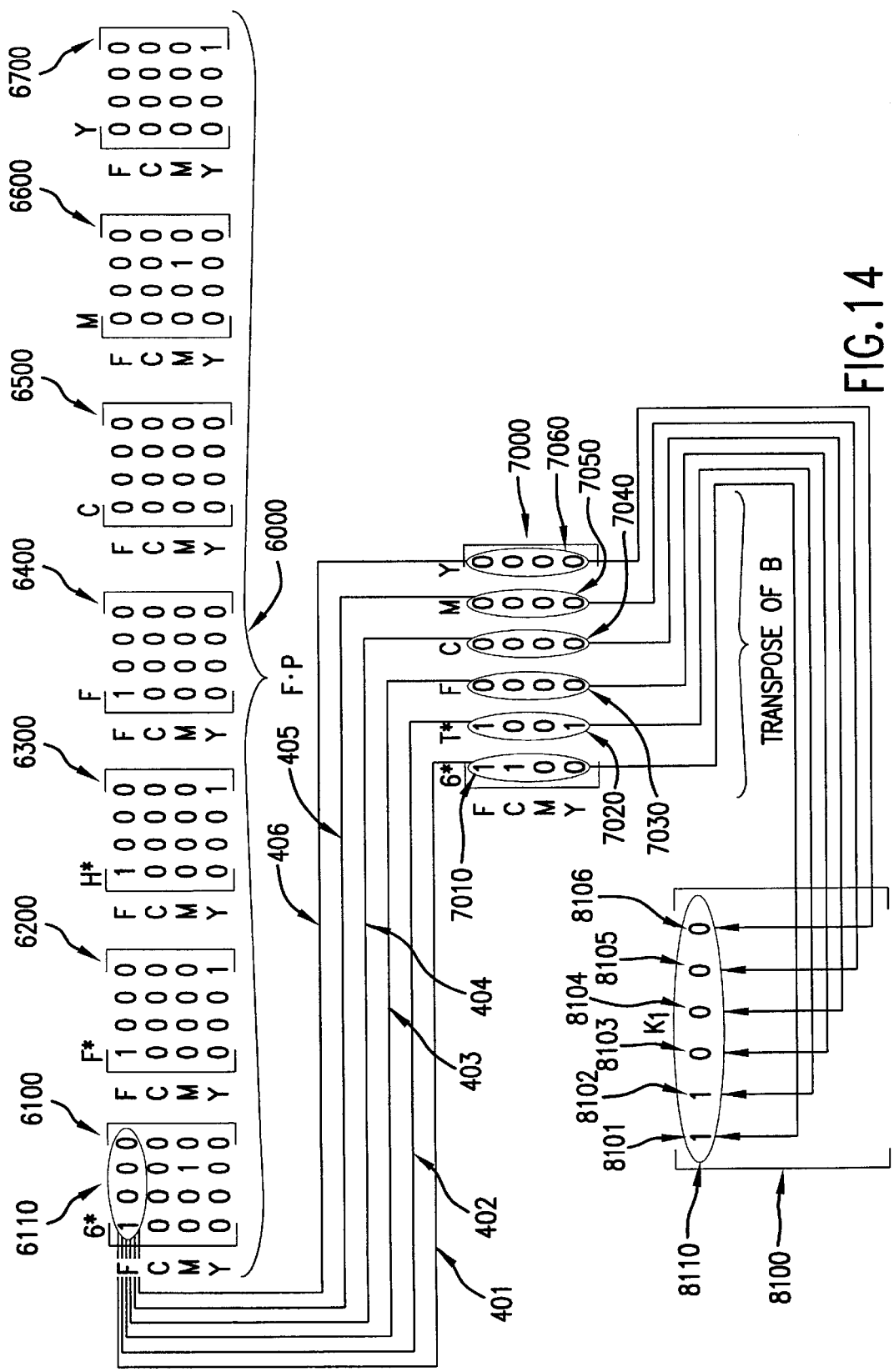
FIG. 14 is a diagram depicting the multiplication of the first row of the first submatrix of the F·P matrix times each column of the transpose of the Combinability Matrix B to create the elements of the first row of the first submatrix of the Allowable Fare Matrix K for the Tulsa/Hamburg example provided herein.
Figure 15:
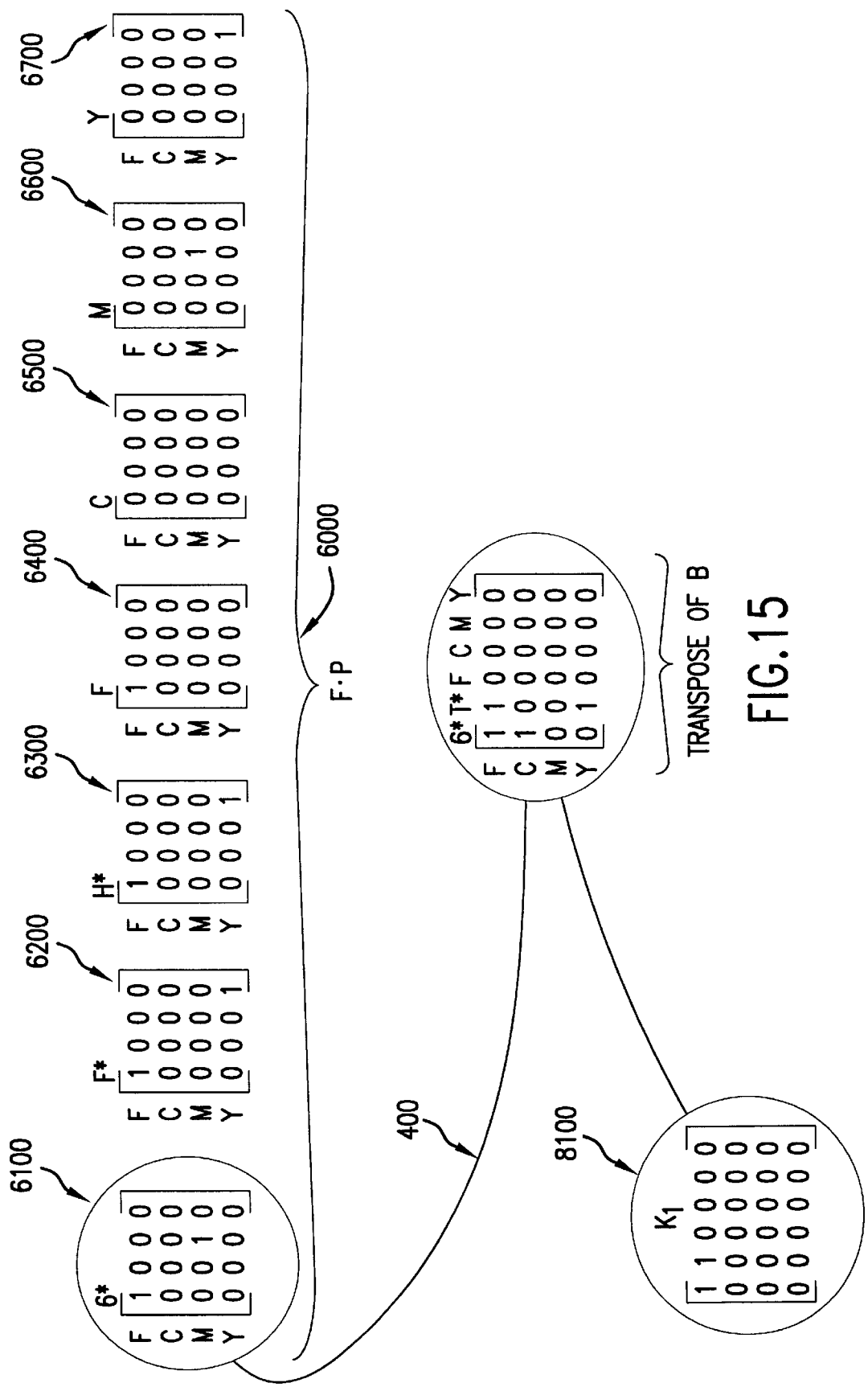
FIG. 15 is a diagram depicting the multiplication of the first submatrix of the F·P matrix times the transpose of the Combinability Matrix B to create the first submatrix of the Allowable Fare Matrix K for the Tulsa/Hamburg example provided herein.
Figure 16:
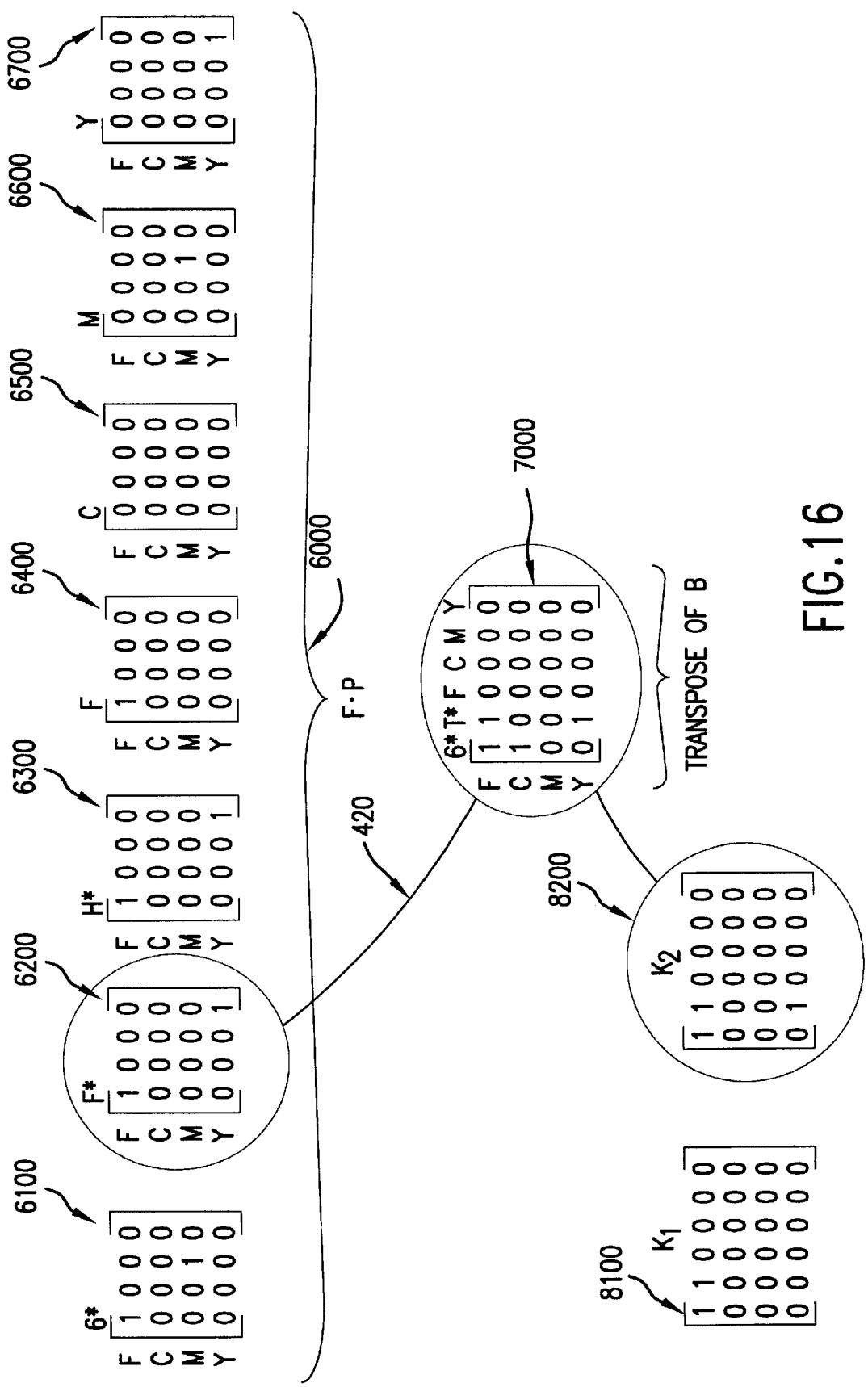
FIG. 16 is a diagram depicting the method of multiplying the second submatrix of the F·P matrix times the transpose of the Combinability Matrix B to create the second submatrix of the Allowable Fare Matrix K for the Tulsa/Hamburg example provided herein.

In the Tulsa/Hamburg example, the transpose of the Combinability Matrix B has 4 rows and 6 columns. The result of that multiplication is a 7×4×6 matrix (that is 7 4×6 matrices), referred to herein as "K", the Allowable Fare Matrix, which gives the fares for the example. FIGS. 14, 15 and 16 are diagrams which depict the principles of multiplying the seven submatrices of the F·P matrix times the transpose of the Combinability Matrix B to build the Allowable Fare Matrix K.

FIG. 14 is a diagram depicting the multiplication of the first row (6110) of the first submatrix (6100) of the F·P matrix (6000) times each column (7010, 7020, 7030, 7040, 7050, and 7060) of the transpose of the Combinability Matrix B (7000) to create the elements of the first row (8110) of the first submatrix (8100) of the Allowable Fare Matrix K for the Tulsa/Hamburg example.

Specifically, FIG. 14 depicts the multiplication of the first row (6110) of the first submatrix (6100) of the 19 P matrix (6000) times (401) the first column (7010) of the transpose of the Combinability Matrix B (7000) to create the first element (8101) of the first row (8110) of the first submatrix (8100) of the Allowable Fare Matrix K.

FIG. 14 also depicts the multiplication of the first row (6110) of the first submatrix (6100) of the F·P matrix (6000) times (402) the second column (7020) of the transpose of the Combinability Matrix B (7000) to create the second element (8102) of the first row (8110) of the first submatrix (8100) of the Allowable Fare Matrix K.

FIG. 14 further depicts the multiplication of the first row (6110) of the first submatrix (6100) of the F·P matrix (6000) times (403) the third column (7030) of the transpose of the Combinability Matrix B (7000) to create the third element (8103) of the firs row (8110) of the first submatrix (8100) of the Allowable Fare Matrix K.

FIG. 14 further depicts the multiplication of the first row (6110) of the first submatrix (6100) of the F·P matrix (6000) times (404) the fourth column (7040) of the transpose of the Combinability Matrix B (7000) to create the fourth element (8104) of the first row (8110) of the first submatrix (8100) of the Allowable Fare Matrix K.

FIG. 14 also depicts the multiplication of the first row (6110) of the first submatrix (6100) of the F·P matrix (6000) times (405) the fifth column (7050) of the transpose of the Combinability Matrix B (7000) to create the fifth element (8105) of the first row (8110) of the first submatrix (8100) of the Allowable Fare Matrix K.

FIG. 14 further depicts the multiplication of the first row (6110) of the first submatrix (6100) of the F·P matrix (6000) times (406) the sixth column (7060) of the transpose of the Combinability Matrix B (7000) to create the sixth element (8106) of the first row (8110) of the first submatrix (8100) of the Allowable Fare Matrix K.

FIG. 15 is a diagram depicting the multiplication of the first submatrix (6100) of the F·P matrix (6000) times (400) the transpose of the Combinability Matrix B (7000) to create the first submatrix (8100) of the Allowable Fare Matrix K for the Tulsa/Hamburg example.

FIG. 16 is a diagram depicting the multiplication of the second submatrix (6200) of the F·P matrix (6000) times (420) the transpose of the Combinability Matrix B (7000) to create the second submatrix (8200) of the Allowable Fare Matrix K for the Tulsa/Hamburg example.

Figure 17:
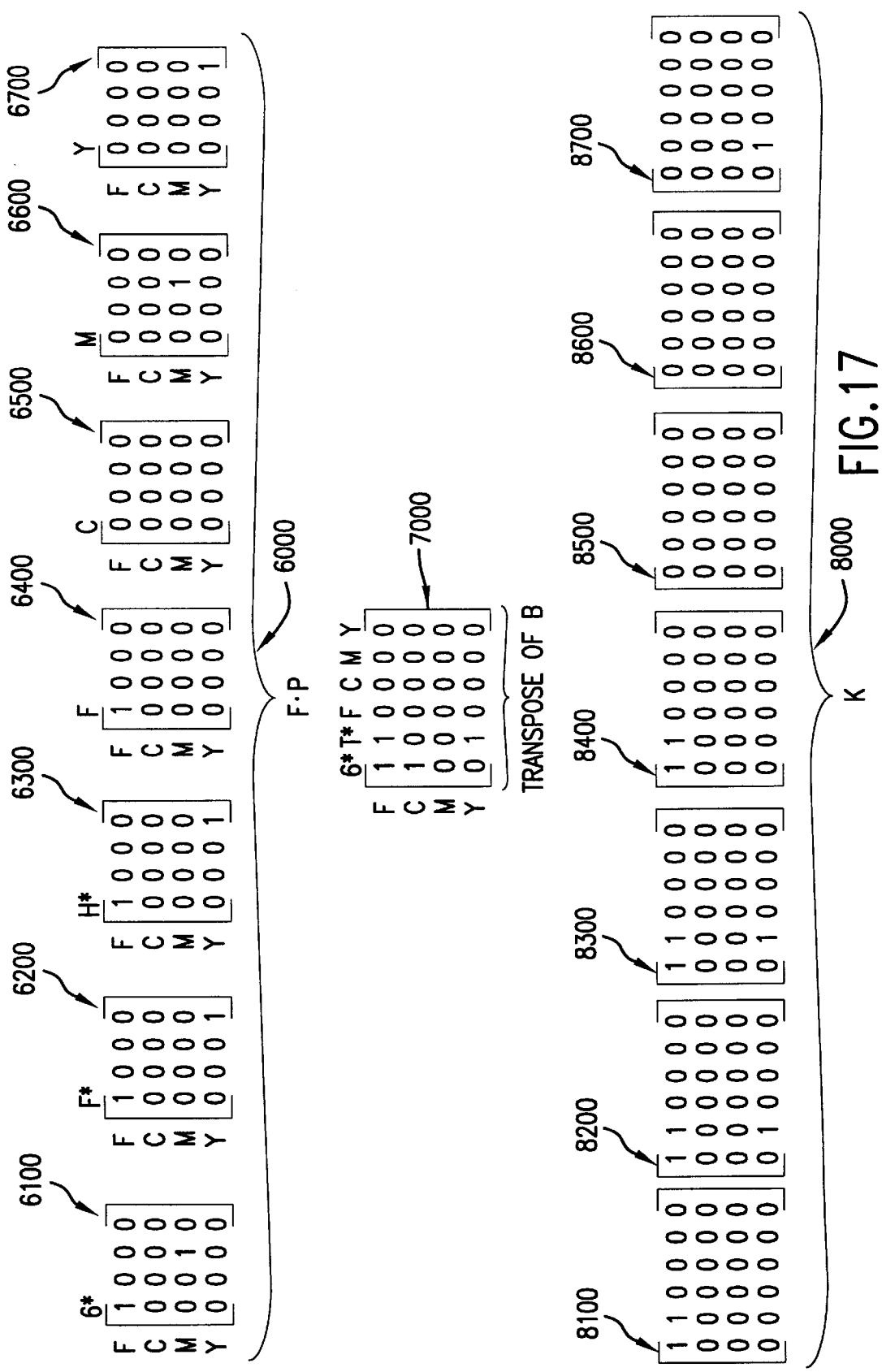
FIG. 17 is a diagram depicting the method of multiplying each of the several submatrices of the F·P matrix times the transpose of the Combinability Matrix B to build the respective submatrices of the final Allowable Fare Matrix K for the Tulsa/Hamburg example provided herein.

Similarly, as depicted in FIG. 17, to build the final Allowable Fare Matrix K, each of the remaining submatrices (6300, 6400, 6500, 6600, and 6700) of the F·P matrix (6000) is multiplied times the transpose of the Combinability Matrix B (7000) to build the respective submatrices (8300, 8400, 8500, 8600, and 8700) of the final Allowable Fare Matrix K (8000). The final resulting Allowable Fare Matrix K for the Tulsa/Hamburg example is shown in Table 9 below:

TABLE 9

$$\left\{ \begin{pmatrix} 1 & 1 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}, \begin{pmatrix} 1 & 1 & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 0 \end{pmatrix}, \begin{pmatrix} 1 & 1 & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 0 \end{pmatrix}, \right.$$

$$\left. \begin{pmatrix} 1 & 1 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}, \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}, \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}, \right.$$

TABLE 9-continued $$\left. \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 0 \end{pmatrix} \right\}$$

To identify the fares designated in the Allowable Fare Matrix K, the indices of the K matrix are used to identify the corresponding elements in Tables 1 and 2 above and in the set of all possible Published Fares (F, C, M and Y).

TABLE 10

$$\left\{ \begin{pmatrix} 6*F6* & 6*FT* & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}, \begin{pmatrix} 6*F6* & 6*FT* & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 0 \end{pmatrix}, \right.$$

$$\begin{pmatrix} H*F6* & H*FT* & 0 & 0 & 0 & 0 \\ 0 & 0 & 0 & 0 & 0 & 0 \\ 0 & 0 & 0 & 0 & 0 & 0 \\ 0 & H*YT* & 0 & 0 & 0 & 0 \end{pmatrix}, \begin{pmatrix} FF6* & FFT* & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix},$$

$$\left. \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}, \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}, \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & YYT* & 0 & 0 & 0 & 0 \end{pmatrix} \right\}$$

The way in which the indices of the K matrix are used to identify the fares designated in the Allowable Fare Matrix K is explained in further detail as follows. The first fare element of the first row of the first submatrix of the Allowable Fare Matrix K is used as an example of the way in which the indices of the K matrix are used to identify the fares designated in the Allowable Fare Matrix K. The first fare element of the first row of the first submatrix of the Allowable Fare Matrix K is equal to "6*F6*". FIGS. 11 and 14 are useful in explaining the manner in which the "6*F6*" fare value is derived. As explained above for Table 5, the first of the four submatrices of the Published Fares Matrix P is the "F" submatrix.

In FIG. 11, the first row (6110) of the first submatrix (6100) of the F·P matrix (6000) is built by multiplying the first row (the 6* row) of the Combinability Matrix F (200) times the first submatrix (2100) (the "F" submatrix) of the Published Fares Matrix P (1000). From this multiplication, the first element (6111) of the first row (6110) of the first submatrix (6100) of of the F·P matrix (6000) represents the fare combination "6*F". In fact, because the Published Fares Matrix P (1000) is a third rank matrix, then the entire first row (6110) of the first submatrix (6100) of of the F·P matrix (6000) represents the fare combination "6*F".

In FIG. 14, the first row (6110) (the "6*F" row) of the first submatrix (6100) of the E·P matrix (6000) is multiplied times (401) the first column (7010) (the "6*" column) of the transpose of the Combinability Matrix B (7000) to create the calculations (410) necessary to build the first element (8101) of the first row (8110) of the first submatrix (8100) of the Allowable Fare Matrix K. According to this multiplication, the first element (8101) of the first row (8110) of the first submatrix (8100) of the Allowable Fare Matrix K therefore represents the "6*F6*" fare.

The advantage of using the earlier mentioned Fare Index Embodiment in which actual fare indices are used instead of 1's as matrix element values, is that the approach eliminates the need to trace back through the contributing Combinability Matrices as described above to determine the identity of the contributing actual fare indices.

2. Constructing Usable Fares for the General Case

According to one embodiment of the Matrix Method of Fare Combinability, the way in which usable fares and the Allowable Fare Matrix K are constructed is expressed below for the general case. According to another embodiment of the Matrix Method of Fare Combinability, the combinability and published fare matrices are compressed in order to reduce the size of the computations and increase the computational speed.

According to one embodiment of the Matrix Method of Fare Combinability, the fare construction computer system is programmed to build the Allowable Fare Matrix K (K=F·P·Transpose (B)) according to the following expression:

$$K_{lkm} \sum_{j=1}^{p} F_{ij} \sum_{l=1}^{p} P_{jkl} B_{ml} = \sum_{j=1}^{p} \sum_{l=1}^{p} F_{ij} P_{jkl} B_{ml}$$

The expression above and the other formulaic expressions herein use standard mathematical notations. Uncapitalized letters, e.g., "i," "j," "k," "l," "m," "n," and "p," and certain Greek alphabetic characters, e.g., "α", and "β", are used herein to indicate a variable integer. Use herein of "nth" is used to describe the nth occurrence, or the nth row, or the nth column or the like, where it should be understood that any integer can be substituted for the "n" in the term "nth."

According to one embodiment of the Matrix Method of Fare Combinability, the fare construction computer system is programmed to build the Published Fares Matrix P as the inner product of a second rank matrix and a third rank identity matrix according to the following expression:

$$P_{jkl} = \sum_{\alpha=1}^{p} P_{j\alpha} \delta_{\alpha k l}$$

According to the above expression for P and according to one embodiment of the Matrix Method of Fare Combinability, the fare construction computer system is programmed to build the Allowable Fare Matrix K according to the following expression:

$$K_{lkm} = \sum_{j=1}^{p} \sum_{l=1}^{p} F_{ij} \sum_{\alpha=1}^{p} P_{j\alpha} \delta_{\alpha k l} B_{ml}$$

The fare construction computer system is programmed to combine the terms to build the Allowable Fare Matrix K according to the following expression:

$$K_{lkm} = \sum_{j=1}^{p} \sum_{l=1}^{p} F_{ij} P_{jk} \delta_{kl} B_{ml}$$

The fare construction computer system is further programmed to further combine terms to build the Allowable Fare Matrix K according to the following expression:

$$K_{lkm} = \sum_{j=1}^{p} F_{ij} P_{jk} B_{mk}$$

The fare construction computer system is further programmed to build the Published Fares Matrix P as the inner product of a vector and a third rank identity matrix according to the following expression:

$$P_{jk} = \sum_{\alpha=1}^{p} P_{\beta} \delta_{\beta jk}$$

The fare construction computer system is further programmed to combine the above terms for the Allowable Fare Matrix K and the Published Fares Matrix P to build the Allowable Fare Matrix K according to the following expression:

$$K_{lkm} = \sum_{j=1}^{p} F_{ij} \sum_{\beta=1}^{p} P_{\beta} \delta_{\beta jk} B_{mk} = F_{1k} P_k B_{mk}$$

According to the expression above for the Published Fares Matrix P as the inner product of a vector and a third rank identity matrix expressions, the fare construction computer system is programmed to build the Published Fares Matrix P for the Tulsa/Hamburg example above as follows:

$$\begin{pmatrix} 1 \\ 0 \\ 1 \\ 1 \end{pmatrix}$$

The fare construction computer system is programmed to then split each of the Combinability Matrices F and B into 2 parts: the bucket/generic part f and b respectively, and the specific parts F' and B', which for now will be referred to as F and B. By Splitting the Combinability Matrices F and B into the bucket/generic and specific parts, the computer is programmed to build the Allowable Fare Matrix K according to the following expression:

$$K_{1km} = F_{1k} P_k B_{mk} = f_{1k} P_k b_{mk}(1<4,m<3) + f_{1k} P_k B_{(m-2)k}(1>4,m>2) + F_{(i-3)k}(1>3,m<3) + F_{i-3)k} P_k B_{(m-2)k}(f1>3,m<2)$$

Splitting the Combinability Matrices F and B for the Tulsa/Hamburg examples into the bucket/generic and specific parts results in the following expressions for f, b, and F and B for the Tulsa/Hamburg example:

$$f = \begin{matrix} & F & C & M & Y \\ 6* & 1 & 0 & 1 & 0 \\ F* & 1 & 1 & 0 & 1 \\ H* & 1 & 0 & 0 & 1 \end{matrix}$$

$$F = \begin{matrix} & & & & \\ F & 1 & 0 & 0 & 0 \\ C & 0 & 1 & 0 & 0 \\ M & 0 & 0 & 1 & 0 \\ Y & 0 & 0 & 0 & 1 \end{matrix}$$

$$b = \begin{matrix} & F & C & M & Y \\ 6* & 1 & 1 & 0 & 0 \\ T* & 1 & 0 & 0 & 1 \end{matrix}$$

$$B = \begin{matrix} & & & & \\ F & 0 & 0 & 0 & 0 \\ C & 0 & 0 & 0 & 0 \\ M & 0 & 0 & 0 & 0 \\ Y & 0 & 0 & 0 & 0 \end{matrix}$$

By Splitting the Combinability Matrices F and B into the bucket/generic parts and specific parts, as can be seen above the resulting F and B matrices are diagonal—that is, 1's (or any non-zero value) appear only in the diagonal; 0's appear elsewhere. Accordingly, the fare construction computer system is programmed to build the resulting F and B matrices as the inner product of a vector and a third rank identity matrix according to the following expressions:

$$F_{1k} \sum_{\alpha=1}^{p} F_{\alpha} \delta_{mk} \text{ and } B_{km} = \sum_{\beta=1}^{p} B_{\beta} \delta_{\beta km}$$

Using the above new expressions for the split F and B matrices, the fare construction computer system is programmed to build the Allowable Fare Matrix K according to the following expression:

$$K_{ikm} = f_{ik} P_k b_{km} (i < 4, m < 3) +$$

$$\sum_{\beta=1}^{p} f_{ik} P_k B_{\beta} \delta_{\beta k(m-2)} (i < 4, m > 2) +$$

$$\sum_{\alpha=1}^{p} F_{\alpha} \delta_{\alpha(i-3)k} P_k b_{km} (i < 3, m > 3)$$

$$\sum_{\alpha=1}^{p} \sum_{\beta=1}^{p} F_{\alpha} \delta_{\alpha(i-3)k} P_k B_{\beta} \delta_{\beta k(m-2)} (i > 3, m > 2)$$

$$= f_{ik} P_k b_{km} (i < 4, m < 3) + f_{ik} P_k B_k (i < 4, k = m - 2) +$$

$$F_k P_k b_{km} (m < 3, k : F_k P_k B_k (i - 3 = k = m - 2)$$

Applying these expressions for f, b, F, B, and P in the Tulsa/Hamburg example, the f, b, F, B and P matrices are as follows:

$f$ // MatrixForm $$\begin{pmatrix} 1 & 0 & 1 & 0 \\ 1 & 1 & 0 & 1 \\ 1 & 0 & 0 & 1 \end{pmatrix}$$

$b$ // MatrixForm $$\begin{pmatrix} 1 & 1 & 0 & 0 \\ 1 & 0 & 0 & 1 \end{pmatrix}$$

$(F = \{1, 1, 1, 1\})$ // MatrixForm $$\begin{pmatrix} 1 \\ 1 \\ 1 \\ 1 \end{pmatrix}$$

$(B = \{0, 0, 0, 0\})$ // MatrixForm $$\begin{pmatrix} 0 \\ 0 \\ 0 \\ 0 \end{pmatrix}$$

$(P = \{1, 0, 1, 1\})$ // MatrixForm $$\begin{pmatrix} 1 \\ 0 \\ 1 \\ 1 \end{pmatrix}$$

Applying the new forms of f, b, F, B, and the compressed P as expressed above, the Allowable Fare Matrix K for the Tulsa/Hamburg example is calculated as follows, and is equal to the Allowable Fare Matrix K as was previously calculated above.

$$\left\{ \begin{pmatrix} 1 & 1 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix} \begin{pmatrix} 1 & 1 & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 0 \end{pmatrix}, \right.$$

$$\begin{pmatrix} 1 & 1 & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 0 \end{pmatrix} \begin{pmatrix} 1 & 1 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix},$$

$$\begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix} \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix},$$

$$\left. \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 1 & 0 & 0 & 0 & 0 \end{pmatrix} \right\}$$

Using the indices of the new Tulsa/Hamburg example Allowable Fare Matrix K in a manner similar to that described above for the original Tulsa/Hamburg example Allowable Fare Matrix K, the constructed fares are determined as follows:

$$\left\{ \begin{pmatrix} 6*F6* & 6*FT* & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}, \right.$$

$$\begin{pmatrix} F*F6* & F*FT* & 0 & 0 & 0 & 0 \\ 0 & 0 & 0 & 0 & 0 & 0 \\ 0 & 0 & 0 & 0 & 0 & 0 \\ 0 & F*YT* & 0 & 0 & 0 & 0 \end{pmatrix},$$

$$\begin{pmatrix} H*F6* & H*FT* & 0 & 0 & 0 & 0 \\ 0 & 0 & 0 & 0 & 0 & 0 \\ 0 & 0 & 0 & 0 & 0 & 0 \\ 0 & H*YT* & 0 & 0 & 0 & 0 \end{pmatrix},$$

$$\begin{pmatrix} FF6* & FFT* & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix},$$

$$\begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix} \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix},$$

$$\left. \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & YYT* & 0 & 0 & 0 & 0 \end{pmatrix} \right\}$$

The new constructed fare list is the same as the original constructed Fare list for the Tulsa/Hamburg example.

V. The Direct Association Method of Fare Construction

In the Matrix Multiplication Method of Fare Combinability the fare construction computer system is programmed to build multiple matrices: the F matrix to contain Origin Arbitrary Fares, the P matrix to contain Published Fares, and the B matrix to contain Destination Arbitrary Fares. The computer was then programmed to manipulate and multiply these matrices in the manner described above to construct allowable fares. As opposed to the multiple matrix approach used in the Matrix Multiplication Method of Fare Combinability, according to one embodiment of the Direct Association Method, the fare construction computer system is programmed to build a single multi-dimensional matrix that contains addresses to what will be referred to herein as Combo Structures. According to one embodiment of the Direct Association Method, the computer is further programmed to further build the Combo Structures in such a way so that the appropriate arbitrary fare components are directly associated with the appropriate published fare using what will be referred to herein as Linked Lists. The approach used by the Direct Association Method eliminates the need to build multiple matrices populated largely with zeroes and further reduces the amount of zero multiplications. The net effect of the Direct Association Method is substantial savings in terms of both storage and computation time.

A. Defining Market Lists and Performing Connectivity Analysis

The computer is programmed in the same way for the Direct Association Method as it was for the Matrix Multiplication Method of Fare Combinability Method regarding the online User Interface, acceptance of user market requests, the definition of market lists, and the performance of connectivity analysis. The difference between the Direct Association Method of Fare Construction as opposed to the Fare Categorization and Matrix Multiplication Method of Combinability is that the Direct Association Method provides for directly associating arbitrary components with the appropriate published fare components, rather than requiring a multiplication step to create the association. The Direct Association Method of Fare Construction is described in further detail below.

As previously noted, embodiments of the present invention are described in terms of three piece fare construction (arbitrary with published and with arbitrary). However, it should be understood that other embodiments provide for the construction of two-piece constructed fares (arbitrary with published, and published with arbitrary). According to one embodiment, connectivity analysis is directed by the user to be restricted to three piece construction, two piece construction, or to include all types of construction. According to one embodiment, the fare construction computer system is programmed to perform each type of multi-component construction in parallel and simultaneously to the other types of multi-component construction. As an alternative embodiment to parallel processing, the computer is programmed to perform subsequent multi-component constructions in a serial, head-to-toe fashion.

As was also previously noted, the embodiments described are described in terms of carrier-specific processing. However, as was also previously noted, multiple carriers can be processed in parallel, or in serial, head-to-toe fashion.

With regard to the Direct Association Method, it should be understood that an additional dimension of the Multi-dimensional P Matrix can be defined for carriers, and that other embodiments provide for the construction of fares for the multiple carrier model using the techniques described herein. A multiple carrier model is used, for instance, to construct fares for code share arrangements between different carriers.

B. Fare Categorization According to the Direct Association Method of Constructing Fares According to one embodiment of the Direct Association Method, the fare construction computer system is programmed to perform Fare Categorization by building a single multi-dimensional matrix that contains pointers to, or the addresses of, what will be referred to herein as Combo Structures. This single multi-dimensional matrix is referred to herein as the Multi-dimensional P Matrix. In an alternative embodiment, instead of the Multi-dimensional P Matrix containing the addresses of the relevant Combo Structures, the cells of the Multi-dimensional P Matrix are themselves Combo Structures.

Combo Structures are data structures that directly associate multiple fare components together. A Combo Structure contains, identifies, or otherwise points to: 1) a published fare; 2) all of the origin arbitrary fares which can be combined with the specified published fare for travel between a particular origin city and the origin gateway city for which the published fare exists; and 3) all of the destination arbitrary fares which can be combined with the specified published fare for travel between a particular destination city and the destination gateway city for which the published fare exists.

As was previously described, the computer is programmed to maintain certain statistics as it builds the hash tables described above. These statistics include the following factors: 1.) the number of non-duplicated fare class codes represented by Qualifying Published Fares; 2.) the number of Origin Cities; 3.) the number of Destination Cities; 4.) the number of types of fare continuity (maximum 2: round-trip, one-way); 5.) the number of types of directionality (maximum 2: to, from); and 6.) the number of tariffs that apply to Published Fares for travel between the Origin and Destination Cities. Other statistics can be similarly maintained.

Figure 18:
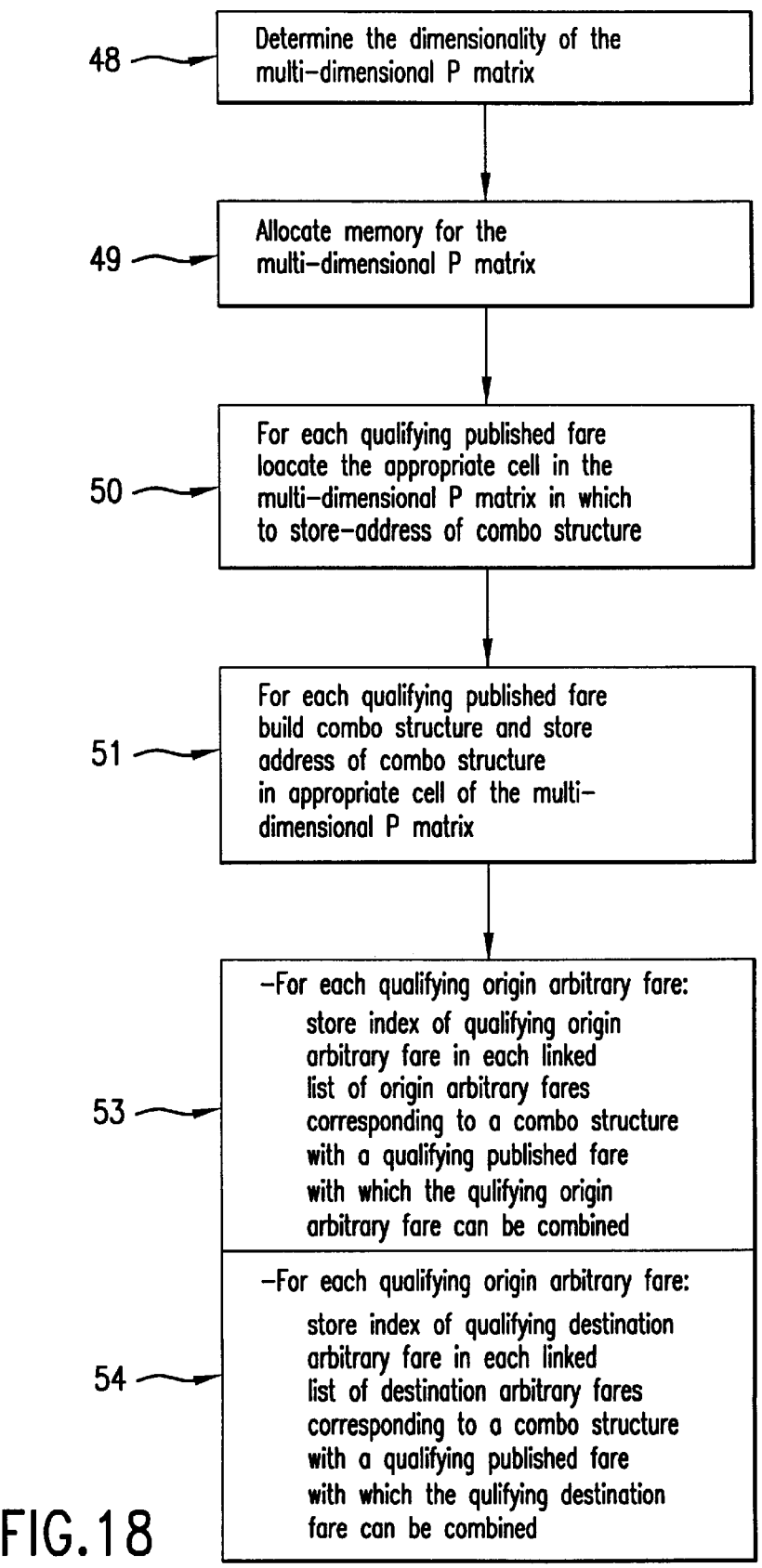
FIG. 18 is a flow diagram representing an overview of the functions involved in building the data structures in one embodiment of the Direct Association Method to be used in constructing fares.

As depicted in FIG. 18, the computer is programmed to determine the dimensionality of the Multi-dimensional P Matrix of the Direct Association Method by multiplying the above-described factors (48). It should be understood that alternative embodiments of the Direct Association Method provide for a Multi-dimensional P Matrix that has more or less dimensions as compared to the dimensions described above. For instance, carrier is an additional dimension of one embodiment.

The computer is further programmed to allocate memory sufficient t-o store an address of a Combo Structure in each element of the Multi-dimensional P Matrix of the Direct Association Method (49). In one embodiment, the computer is programmed to allocate the memory for the Multi-dimensional P Matrix as if it were a single dimensional array. That is, the computer is programmed to multiply the total number of possible values for each dimension of the matrix times the address storage allocation unit (that is, the amount of storage for each cell of the matrix) to determine the total storage requirement for the Multi-dimensional P Matrix. By way of explaining the previous sentence, consider an example in which the P Matrix has only three dimensions: one for directionality, one for one-way/round-trip, and one for fare class code. If there are two possible values for directionality (to, and from), and two possible values for one-way/round-trip (one-way, and round-trip) and thirty-seven fare classes, then in order to calculate the space allocation requirement of a single dimensional array to represent the P Matrix, the computer multiplies 2 times 2 times 37 times the amount of storage for each cell of the P Matrix (148 times the address storage allocation unit).

In order to access individual element locations, also referred to as "cells", within the Multi-dimensional P Matrix, the computer is further programmed to perform a hashing function that calculates the address location for a particular element within the Multi-dimensional P Matrix. The way that the hashing function works is that the dimensionality factors for the particular element are provided to the hashing function. The dimensionality factors include the integers that represent: 1.) the fare class code; 2.) the Origin City; 3.) the Destination City; 4.) the Published Fare's Fare continuity type (round-trip, one-way); 5. the Published Fare's Directionality type(to, from); and 6.) the Published Fare's tariff. The Multi-dimensional P Matrix hashing function then uses the dimensionality factors provided to it to calculate the offset from the beginning of the Multi-dimensional P Matrix of the beginning address to the desired element in the Multi-dimensional P Matrix.

In order to construct fares, the computer is programmed to populate the Multi-dimensional P Matrix with addresses of Combo Structures. According to the Direct Association Method, the computer is programmed to build the Combo Structures in such a way so that the appropriate arbitrary fare components are directly associated with the appropriate published fare using what will be referred to herein as Linked Lists.

As was described above, the computer is programmed to identify each Published Fare relevant to the particular user request and to build a hash table of Qualifying Published Fares and an array of Qualifying Published Fare integer identifiers. As was also described above, the computer is further programmed to create a non-duplicating list of fare class codes represented by the Qualifying Published Fares.

For each unique Qualifying Published Fare, the computer is further programmed to supply certain information about the Qualifying Published Fare to the hashing function for the Multi-dimensional P Matrix to calculate the offset into the P Matrix for the appropriate cell in that matrix in which to store the location of the Combo Structure (50). The computer is further programmed to build the Combo Structure for the particular Qualifying Published Fare, to determine the address of the Combo Structure, and to store the address of, or pointer to, the Combo Structure for the particular Published Fare in the appropriate cell of the Multi-dimensional P Matrix (51).

In order to designate a particular Qualifying Published Fare in a Combo Structure, the computer is programmed to store a Fare Link for the particular Qualifying Published Fare in the Published Fare Fare Link element of the Combo Structure (51). The computer is programmed to determine whether multiple published fares with identical characteristics exist, e.g., as with the same published fare for different effective dates. In the rare cases where there are multiple identical published fares, the computer is programmed to store both the Fare Link for the particular Qualifying Published Fare and a Fare Link to another Qualifying Published Fare in the Published Fare Fare Link element of the Combo Structure. The Published Fare Fare Link is an integer that corresponds to the identifying integer for the particular Qualifying Published Fare in the Qualifying Published Fare Array.

Once a Combo Structure has been initialized for a particular fare class code for a particular set of the Combo Structure Criteria described above, the computer is programmed to populate each Combo Structure with information about the arbitrary fare components combinable with the Published Fare Component for which the particular Combo Structure pertains.

The computer is programmed to examine each Qualifying Arbitrary Fare in the Arbitrary Fare array and hash tables, first the Qualifying Origin Arbitrary Fares (53), and then the Qualifying Destination Arbitrary Fares (54), and to apply the rules of combinability described above. For instance, if a generic fare is encountered, then according to the rules of combinability, the generic fare can be combined with a broad range of fare component codes.

In order to perform the rules of combinability, the computer is programmed to use the attributes of the particular Qualifying Arbitrary Fare to locate the appropriate cell or cells within the Multi-dimensional P Matrix for which the particular arbitrary fare could apply. The computer is then programmed to go to the address contained in the Multi-dimensional P Matrix which is the address of a Combo Structure for a particular Qualifying Published Fare. The computer is programmed to use the Fare Link in the particular Combo Structure to access the array, hash table record, and/or the Fare Data Database, or in a preloading embodiment, the Qualifying Published Fare Array for information about the particular Qualifying Published Fare. The computer compares the information relating to a particular Qualifying Arbitrary Fare with the information contained in the Published Fare Array record for that particular Qualifying Published Fare. If the computer determines that the particular Qualifying Arbitrary Fare can be combined with a particular Qualifying Published Fare, then the computer is programmed to add the index of the particular Qualifying Arbitrary Fare in the appropriate Arbitrary Fare array to the Linked List in the Combo Structure for the particular Qualifying Published Fare.

In one embodiment, the way in which the computer is programmed to determine the combinability of a particular Qualifying Arbitrary Fare and a particular Qualifying Published Fare is through the use of one or more hash functions. That is, for a particular Qualifying Arbitrary Fare, the characteristics of the Qualifying Arbitrary Fare are provided to one or more hash functions. The hash function(s) is/are programmed in such a way as to use the characteristics of the Qualifying Arbitrary Fare to locate within the Multi-Dimensional P Matrix the address of one or more Combo Structures that contain a published fare with which the Qualifying Arbitrary Fare can be combined. The address in the element in the Multi-Dimensional P Matrix of the located published fare is used to locate the appropriate Combo Structure. The index of the subject Qualifying Arbitrary Fare is added to the Linked List for the Combo Structure.

In a preloading embodiment, if the Qualifying Arbitrary Fare is a Qualifying Origin Arbitrary Fare, then the index of the Qualifying Origin Arbitrary Fare in the Qualifying Origin Arbitrary Fare Array is added to the Qualifying Origin Arbitrary Fare Linked List for the relevant Combo Structure and the address of that Linked List is stored in the Combo Structure (53). On the other hand, if the Qualifying Arbitrary Fare is a Qualifying Destination Arbitrary Fare, then the index of the Qualifying Destination Arbitrary Fare in the Qualifying Destination Arbitrary rare Array is added to the Qualifying Destination Arbitrary Fare Linked List for the relevant Combo Structure and the address of that Linked List is stored in the Combo Structure (54).

Figure 19:
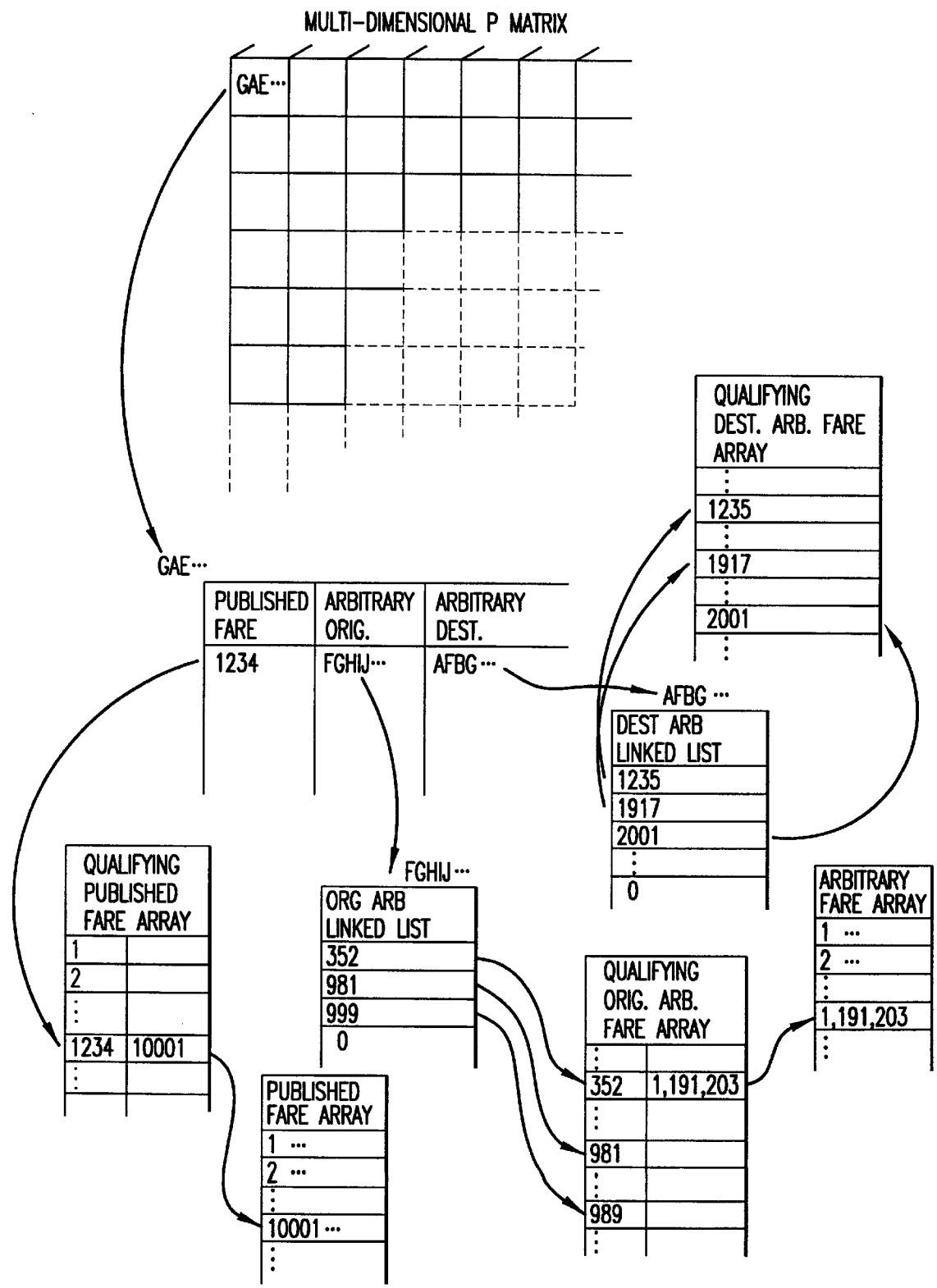
FIG. 19 is a diagram representing the relationships of certain major data structures involved in constructing fares in one embodiment of the Direct Association Method.
Figure 20:
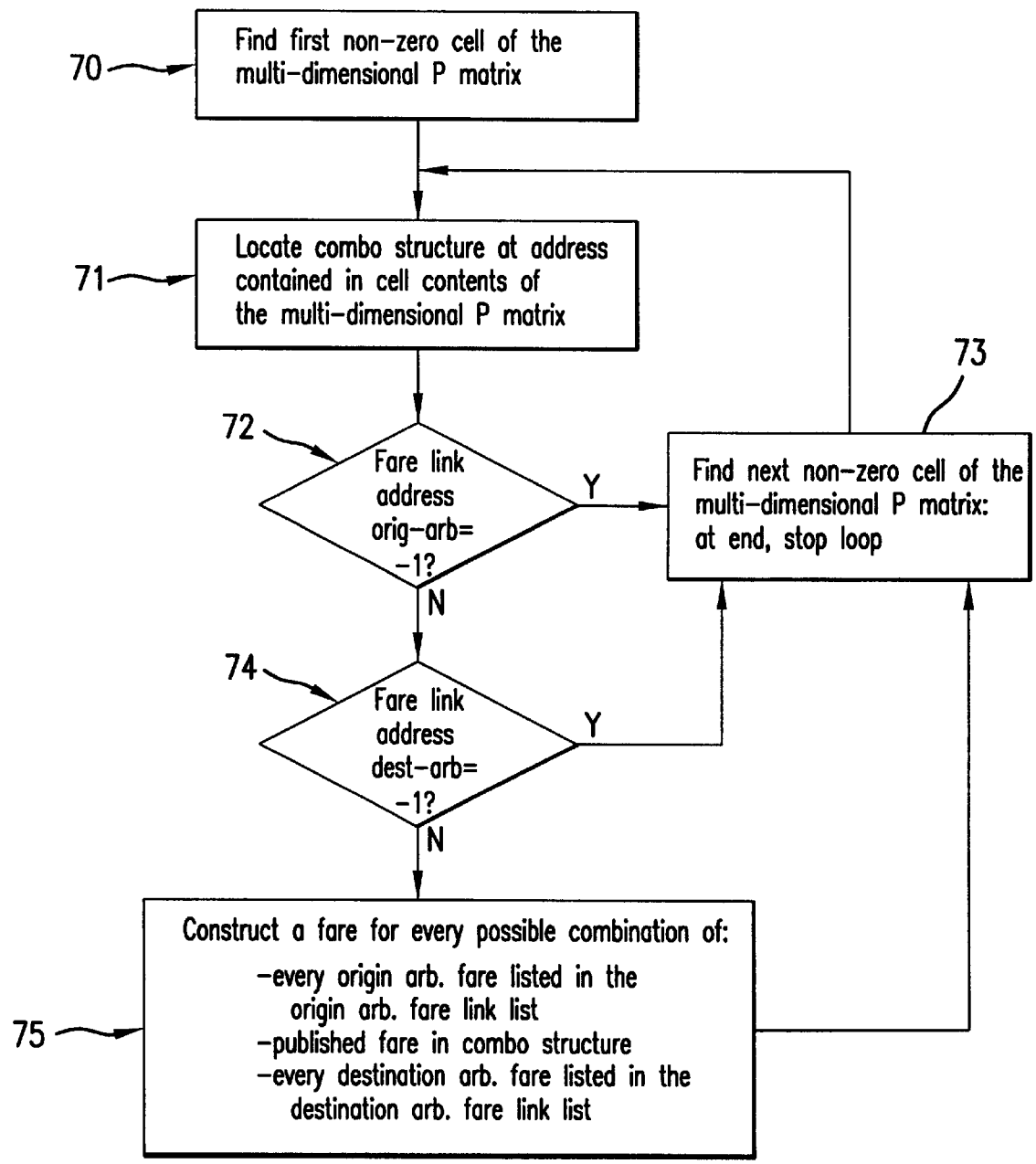
FIG. 20 is a flow diagram representing an overview of the functions involved in constructing fares using the data structures in one embodiment of the Direct Association Method of constructing fares.

C. Fare Construction According to the Direct Association Method of Constructing Fares Once the Combo Structures have been built, the last major step is to complete the construction of the fares. FIG. 19 depicts in overview the relationship of the various elements of Direct Association Method of constructing fares. FIG. 20 depicts in overview of the functions involved in constructing fares using the data structures according to one embodiment of the Direct Association Method.

According to one embodiment of the Direct Association Method, the computer is programmed to systematically go through the Multi-dimensional P Matrix, and use the information in the Multi-dimensional P Matrix to construct all permissible fares. For each non-zero cell in the Multi-dimensional P Matrix (70, 73), the computer locates the Combo Structure at the address contained in the non-zero cell (71). The computer ensures that there is at least one Qualifying Origin Arbitrary Fare (72) and at least one Qualifying Destination Arbitrary Fare (74) in the Combo Structure. In the event that there is at least one Qualifying Origin Arbitrary Fare (72) and at least one Qualifying Destination Arbitrary Fare (74) the computer then uses the contents of the Combo Structure to construct a fare (75) for each Qualifying Origin Arbitrary Fare/ Qualifying Published Fare/ Qualifying Destination Arbitrary Fare combination in the Combo Structure (71). In the event that there is not at least one Qualifying Origin Arbitrary Fare (72) and at least one Qualifying Destination Arbitrary Fare (74) the computer program will return to step (73) of the program. Once again, three-piece construction is described herein and is not a limiting feature of the invention. Other embodiments provide for two-piece fare construction. In the case of a two-piece construction embodiment, there is not a requirement that there be both at least one Qualifying Origin Arbitrary Fare and at least one Qualifying Destination Arbitrary Fare.

As an example of the construction step, consider a case where a Combo Structure for a particular Qualifying Published Fare has been built in which there is one Published Fare Fare Link, an address to a Linked List containing four Qualifying Origin Arbitrary Fare Links, and an address to a Linked List containing three Qualifying Destination Arbitrary Fare Links. From this example, 12 fares can be constructed: 4×1×3.

Once the fares have been constructed (Validated Candidate Constructed Fares), the computer is programmed to apply the processing, validation, consolidation and filtering rules as were previously described above.

VI. Reporting of Constructed Fares

Once the fares have been constructed, the computer is further programmed to provide the user with interactive inquiry and reporting capabilities either through online displays or through hardcopy reports. There are a multitude of applications of this invention. In one embodiment, pricing analysts with a major airline are given particular market areas of responsibility. Each pricing analyst will then be interested in examining fares for that analysts airline, and possibly for other airlines with respect to that analysts assigned areas of market responsibility. Once fares have been constructed, the analyst will need to be able to request reports/online displays of the constructed fares according to various criteria, including but not limited to any and all of the categorization codes associated with each fare component, and also including date and time of travel, carrier, and a multitude of other possible criteria.

Another embodiment involves an Internet application whereby the user is an individual or a travel agent seeking the lowest fares between two particular cities. In this type of application, the computer is programmed to allow the user to cast a broad net initially around constructed and published fares that meet certain user-specified criteria. After the fares meeting the user's criteria have been constructed, the computer is programmed to accept further limiting criteria from the user to examine various levels of the user's more focused search.

Although this invention has been described in certain specific embodiments, many additional modifications and variations would be apparent to those skilled in the art. It is, therefore, to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

APPENDIX A

| TERM | DEFINITION |
| --- | --- |
| Arbitrary component | A fare that is published only for use in combination with a published component to derive the fare to travel between two cities. Arbitrary Components are not meant to be used as a standalone fare. An arbitrary component consists of an interior point, a gateway city, and the additional fare cost for that segment of the fare. The value of an Arbitrary Component may be positive, negative, or zero. Arbitrary Components are carrier specific. Synonyms: An Unpublished Component; an Arbitrary Fare Component. |
| Bucket Fare Class | A fare class designation that is used to indicate a number of acceptable fare classes. A Bucket Fare Class is designated by a capital letter followed by five asterisks (e.g., "A*****"). |
| Candidate Constructed Fare | A fare that has been constructed but which has not been completely validated for legal combination of arbitrary and published components, or consistency with other candidate constructed fares. |
| Combination Point | A city at which an Arbitrary Fare Component and a Published Fare Component are combined. Fare Matching Criteria are analyzed to determine whether certain Arbitrary and Published Fare Components can be legally combined. |
| Constructed Fare | A fare for travel between two cities that is created by combining published and unpublished fare components to obtain an allowable fare that appropriately describes the cost of travel between the two cities. Antonyms: Specified Fare. |
| Construction Point | One of the end points of a city pair for which a constructed fare is created. Synonyms: An Interior Fare. Note that this definition is consistent with ATPCO's definition, but is not in agreement with the definition used by some carriers. |
| Effectivity Period | Designation of the effective dates, or the effective period, such as by designating the start effective date and duration, of a fare, a fare component, or other related fare data. |
| Gateway City pair | A Gateway City pair is a pair of cities for which a Published Fare exists that describes the cost of travel between those two cities. |
| Generic Fare Class | A fare class designation that is used to indicate default acceptable fare classes and which is designated with 6 asterisks (******). |
| Interior Point | One of the end points of a city pair for which a constructed fare is created. Synonyms: Construction Point. |
| Published Component | A published fare that may be used to price travel between two cities or may be used in combination with an unpublished component (arbitrary fare) to obtain the cost (constructed fare) of travel from one city to another. Synonyms: A Published Fare. |

-continued

APPENDIX A

| TERM | DEFINITION |
|---|---|
| Published Fare | A fare that may be used to price travel between two cities or may be used in combination with an unpublished component (arbitrary fare) to obtain the cost (constructed fare) of travel from one city to another. Synonyms: A Published Component. |
| Specified Fare Class | A specific fare class designation that may only combine with itself (e.g., "F", "Y", "C", "H") |
| Specified Fare | A published fare that may be used to price travel between two cities. A published fare. Antonyms: A Constructed Fare. |
| Unpublished Component | A fare that is published only for use in combination with a published component to derive the fare to travel between two cities. An arbitrary component consists of an interior point, a gateway city; and the additional fare cost for that segment of the fare. The value of an Unpublished Component may be positive, negative, or zero. Arbitrary Components are carrier specific. Synonyms: An Unpublished Component; an Arbitrary Fare Component. |
| Validated/Valid Candidate Constructed Fare | A candidate constructed fare that has passed all validation tests for internal correctness of individual constructed fares, but which has not been compared for consistency with other candidate constructed fares for possible elimination. |

What is claimed is:

1. A method of constructing travel fares using a computer, the method comprising the steps of:
   constructing a list of origin cities;
   constructing a list of destination cities;
   determining a set of travel fare components that describe the price for travel between said origin cities and said destination cities;
   using said data structures to construct fare component combinations between said origin cities and said destination cities,
   constructing one or more data structures, and
wherein said data structures are matrices and wherein the step of constructing one or more said data structures is the step of constructing one or more matrices.

2. The method of claim 1 wherein each of said matrices has one or more dimensions, each dimension having an index.

3. The method of claim 2 wherein each of said matrices has one or more cells, each cell containing as contents data.

4. The method of claim 3 wherein the indices of said matrices in combination with the contents of said matrices represent characteristics of said travel fare components.

5. The method of claim 4 wherein the step of determining a set of travel fare components that describe the price for travel between said origin cities and said destination cities further comprises the steps of:
   identifying a specific carrier;
   determining all arbitrary fares for travel between the origin cities and the destination cities;
   determining all published fares for travel between the origin cities and the destination cities.

6. The method of claim 5 wherein the step of determining all published fares for travel between the origin cities and the destination cities further comprises the steps of:
   constructing a list of qualifying origin gateway cities wherein each origin gateway city in said list is a city through which the specified carrier provides travel for one or more of the listed origin cities;
   constructing a list of qualifying destination gateway cities wherein each destination gateway city in said list is a city through which the specified carrier provides travel for one or more of the listed origin cities;
   selecting as qualifying published fares all published fares for travel by the specified carrier between any qualifying origin gateway city and any qualifying destination gateway city.

7. The method of claim 6 wherein the step of determining all arbitrary fares for travel between the origin cities and the destination cities further comprises the steps of:
   selecting as qualifying origin arbitrary fares all arbitrary fares for travel by the specified carrier from any origin city to any qualifying origin gateway city;
   selecting as qualifying destination arbitrary fares all arbitrary fares for travel by the specified carrier from any qualifying destination gateway city to any destination city.

8. The method of claim 7 wherein the step of constructing one or more matrices further comprises the steps of:
   constructing as a directory to combinable fare components a multi-dimensional matrix wherein the dimensions of which represent the characteristics of validated candidate constructed fares;
   for each qualifying published fare, building a fare combination data structure;
   for each of said fare combination data structures, saving a memory address for said fare combination data structure in a cell of said multi-dimensional matrix of validated candidate constructed fares;
   savings in each fare combination data structure an indicator for the qualifying published fare for which said fare combination data structure applies, an indicator for each qualifying origin arbitrary fare that can be combined with said qualifying published fare, and an indicator for each qualifying destination arbitrary fare that can be combined with said qualifying published fare.

9. The method of claim 8 wherein: a first dimension of each of said multi-dimensional matrix represents the fare class code of a qualifying published fare; a second dimension of said multi-dimensional matrix represents the origin city for which said qualifying published fare applies; a third dimension of said multi-dimensional matrix represents the destination city for which said qualifying published fare applies; a fourth dimension of said multi-dimensional matrix represents the tariff for which said qualifying published fare applies; a fifth dimension of said multi-dimensional matrix represents the directionality type for which said qualifying published fare applies; and a fifth dimension of said multi-dimensional matrix represents the travel continuity type for which said qualifying published fare applies.

10. The method of claim 9 wherein the first dimension, the second dimension, the third dimension, the fourth dimension and the fifth dimension are in any order.

11. The method of claim 10 wherein the cell of said multi-dimension matrix in which the memory address of a particular fare combination data structure is stored is located by determining: the fare class code of the qualifying published fare for which the fare combination data structure was built, the origin city for which said qualifying published fare applies, the destination city for which said qualifying published fare applies, the tariff for which said qualifying published fare applies, the directionality type for which said qualifying published fare applies, and the travel continuity type for which said qualifying published fare applies.

12. The method of claim 11 wherein the step of using said matrices to construct fare component combinations between said origin cities and said destination cities further comprises the steps of:

using the contents of each cell of the multi-dimensional matrix of validated candidate constructed fares to access each fare combination data structure;

accessing each fare combination data structure to generate all possible combinations of said qualifying published fare for which said fare combination data structure applies, each qualifying origin arbitrary fare that can be combined with said qualifying published fare, and each qualifying destination arbitrary fare that can be combined with said qualifying published fare;

for each fare combination data structure, generating all possible combinations of said qualifying published fare for which said fare combination data structure applies, each qualifying origin arbitrary fare that can be combined with said qualifying published fare, and each qualifying destination arbitrary fare that can be combined with said qualifying published fare.

13. The method of claim 7 wherein the step of constructing one or more matrices further comprises the steps of:

allocating memory sufficient to store a matrix of memory addresses;

initializing said matrix of memory addresses with null values.

14. The method of claim 13 wherein the step of constructing one or more matrices further comprises the steps of:

for each qualifying published fare, locating the cell of said matrix of memory addresses that corresponds to a particular qualifying published fare;

for each qualifying published fare, building a fare combination data structure;

for each of said fare combination data structures, storing the memory address of said fare combination data structure in a cell of said matrix of memory addresses;

storing in each of said fare combination data structures, the qualifying published fare for which the fare combination data structure applies, an address of a list of all qualifying origin arbitrary fares for travel between the origin gateway city for which the qualifying published fare applies and the origin city for which the fare combination data structure applies, and an address of a list of qualifying destination arbitrary fares for travel between the destination gateway city for which the qualifying published fare applies and the destination city for which the fare combination data structure applies.

15. The method of claim 14 wherein the cell of said matrix of memory addresses that corresponds to a particular qualifying published fare further corresponds to the fare class code of a particular qualifying published fare, the origin city for which said qualifying published fare applies, the destination city for which said qualifying published fare applies, the tariff for which said qualifying published fare applies, the directionality type for which said qualifying published fare applies, and the travel continuity type for which said qualifying published fare applies.

16. The method of claim 15 wherein each fare combination data structure is built with memory sufficient to hold the qualifying published fare, an address of a list of all qualifying origin arbitrary fares for travel between an origin gateway city for which the qualifying published fare applies and an origin city for which the fare combination data structure applies, and an address of a list of all qualifying destination arbitrary fares for travel between a destination gateway city for which the qualifying published fare applies and a destination city for which for which the fare combination data structure applies.

17. The method of claim 16 wherein said cell of said matrix of memory addresses corresponds to the fare class code of the qualifying published fare for which the fare combination data structure applies, the origin city for which said qualifying published fare applies, the destination city for which said qualifying published fare applies, the tariff for which said qualifying published fare applies, the directionality type for which said qualifying published fare applies, and the travel continuity type for which said qualifying published fare applies.

18. The method of claim 17 wherein the step of using said matrices to construct fare component combinations between said origin cities and said destination cities further comprises the step of:

for each non-null cell in said matrix of memory addresses, using the fare combination data structure located at the memory address specified in said matrix cell, generating as constructed fares all possible combinations of all origin arbitrary fares identified in the list of origin arbitrary fares to which the fare combination data structure points, the published fare identified in the fare combination data structure, and all destination arbitrary fares identified in the list of destination arbitrary fares to which the fare combination data structure points.

19. The method of claim 7 wherein the step of constructing one or more matrices further comprises the step of:

generating as one or more origin city/destination city pairs all possible combinations of one of said origin cities and one of said destination cities.

20. The method of claim 19 wherein for each origin city/destination city pair, the step of constructing one or more matrices further comprises the steps of:

constructing as a qualifying origin arbitrary fare matrix a matrix to represent certain characteristics of the qualifying origin arbitrary fares;

constructing as a qualifying published fare matrix a matrix to represent certain characteristics of the qualifying published fares;

constructing as a qualifying destination arbitrary fare matrix a matrix to represent certain characteristics of the qualifying destination arbitrary fares.

21. The method of claim 20 wherein for each origin city/destination city pair, the step of constructing one or more matrices further comprises the steps of:

categorizing each qualifying origin arbitrary fare by storing information about each qualifying origin arbitrary fare in the qualifying origin arbitrary fare matrix;

categorizing each qualifying published fare by storing information about each qualifying published fare in the qualifying published fare matrix;

categorizing each qualifying destination arbitrary fare by storing information about each qualifying destination arbitrary fare in the qualifying destination arbitrary fare matrix.

22. The method of claim 21 wherein for each origin city/destination city pair, the step of using said matrices to construct fare component combinations further comprises the steps of:

using matrix multiplication to combine said qualifying origin arbitrary fare matrix with said qualifying published fare matrix to create a composition matrix;

generating the transpose of the qualifying destination arbitrary fare matrix;

using matrix multiplication to combine said composition matrix with said transpose of said qualifying destination arbitrary fare matrix to create an allowable fare matrix;

using each index and each cell content of said allowable fare matrix to construct each respective validated candidate constructed fare.

23. The method of claim 19 wherein the step of constructing one or more matrices further comprises the step of:

building a two dimensional origin city-origin gateway combinability matrix for each combination of an origin city from the list of origin cities and a qualifying origin gateway city from the list of qualifying origin gateway cities wherein said origin city-origin gateway combinability matrix comprises a row for each arbitrary fare class for travel between said particular origin city and said particular qualifying origin gateway city and further comprises a column for each specific fare class for each qualifying published fare from a list of qualifying published fares that applies to travel.

24. The method of claim 23 wherein the step of constructing one or more matrices further comprises the steps of:

initializing to null values the contents of each cell of each such origin city-origin gateway combinability matrix;

setting to a non-zero value the contents of each cell of each such origin city-origin gateway combinability matrix where the index for the row of the cell is an arbitrary fare class for travel between said particular origin city that is combinable with the specific fare class for qualifying published fares that is the index for the column of that cell.

25. The method of claim 24 wherein the step of constructing one or more matrices further comprises the steps of:

building a two dimensional destination city-destination gateway combinability matrix for each combination of a destination city and a qualifying destination gateway city where said destination city-destination gateway combinability matrix comprises a row for each arbitrary fare class for travel between said particular destination city and said particular qualifying destination gateway city and further comprises a column for each specific fare class for qualifying published fares.

26. The method of claim 25 wherein the step of constructing one or more matrices further comprises the steps of:

initializing to null values the contents of each cell of each such destination city-destination gateway combinability matrix;

setting to a non-zero value the contents of each cell of each such destination city-destination gateway combinability matrix where the index for the row of the cell is an arbitrary fare class for travel between said particular destination city that is combinable with the specific fare class for qualifying published fares that is the index for the column of that cell.

27. The method of claim 26 wherein the step of constructing one or more matrices further comprises the steps of:

building a set of two dimensional published fare submatrices for each origin city-origin gateway combinability matrix/destination city-destination gateway combinability matrix pair, each set of submatrices comprising a two dimensional submatrix for each fare class for which a qualifying published fare exists for travel between the qualifying origin gateway and the qualifying destination gateway wherein the indices for the rows of each two dimensional submatrix are the qualifying published fare fare class codes that exist for travel between the qualifying origin gateway and the qualifying destination gateway and wherein the indices for the columns of each two dimensional submatrix are the qualifying published fare fare class codes that exist for travel between the qualifying origin gateway and the qualifying destination gateway and wherein the contents of each cell of each two dimensional submatrix is initialized to null values except that the contents of the nth row and nth column of the nth submatrix is set to a non-zero value if a qualifying published fare exists for travel for the fare class code that is the index of both the nth row and the nth column of the nth submatrix.

28. The method of claim 27 wherein the step of using said matrices to construct fare component combinations between said origin cities and said destination cities further comprises the step of:

multiplying each origin city-origin gateway combinability matrix times the corresponding set of two dimensional published fare submatrices to build an interim matrix.

29. The method of claim 28 wherein the step of using said matrices to construct fare component combinations between said origin cities and said destination cities further comprises the step of:

transposing each destination city-destination gateway combinability matrix.

30. The method of claim 29 wherein the step of using said matrices to construct fare component combinations between said origin cities and said destination cities further comprises the step of:

multiplying each interim matrix times the corresponding transposed destination city-destination gateway combinability matrix to build an allowable fare matrix.

31. The method of claim 30 wherein the step of using said matrices to construct fare component combinations between said origin cities and said destination cities further comprises the step of:

replacing the contents of any cell in an allowable fare matrix with the multiplicand of the combination of the index of the contributing row of the origin city-origin gateway combinability matrix times the index of the contributing row of the contributing submatrix of the corresponding set of two dimensional published fare submatrices times the index of the contributing column of the corresponding transposed destination city-destination gateway combinability matrix.

32. The method of claim 31 wherein said computer is further programmed to provide an online interactive user interface and wherein the method further comprises the steps of:

inputting by one or more users a carrier identifier;

inputting by one or more users a list of origin cities; and inputting by one or more users a list of destination cities.

33. A method of constructing travel fares for a user specified travel carrier between a user-specified origin area and a user-specified destination area using a computer with a memory, the method comprising the steps of:

selecting all travel fare components for the user-specified travel carrier that can be combined to construct a fare that describes a price for travel between the user-specified origin area and the user-specified destination area;

constructing one or more data structures in said memory; and using said data structures to construct fare component combinations between each of said origin cities and each of said destination cities;

wherein one or more of said data structures are matrices.

34. The method of claim 33 wherein said computer is further programmed to provide an online interactive user interface and wherein the method further comprises the steps of:

inputting by one or more users one or more carrier identifiers;

inputting by one or more users one or more lists of origin cities; and inputting by one or more users one or more destination cities.

35. The method of claim 33 wherein each of said matrices has one or more dimensions, each dimension having a dimensional descriptor.

36. The method of claim 35 wherein each of said matrix has one or more cells, each cell containing as contents data.

37. The method of claim 36 wherein certain of the dimensional descriptors of said matrices in combination with certain of the contents of said matrices represent characteristics of said travel fare components.

38. The method of claim 37 wherein the step of selecting all travel fare components for the user-specified travel carrier that can be combined to construct a fare that describes a price for travel between the user-specified origin area and the user-specified destination area further comprises the steps of:

reading a database of travel points;

selecting as origin cities from a database of travel points all cities within the user-specified origin area served by the travel carrier;

saving in memory a list of said origin cities.

39. The method of claim 38 wherein the step of selecting all travel fare components for the user-specified travel carrier that can be combined to construct a fare that describes a price for travel between the user-specified origin area and the user-specified destination area further comprises the steps of:

selecting as destination cities from said database of travel points all cities within the user-specified destination area served by the travel carrier;

saving in memory a list of said destination cities.

40. The method of claim 39 wherein the step of selecting all travel fare components for the user-specified travel carrier that can be combined to construct a fare that describes a price for travel between the user-specified origin area and the user-specified destination area further comprises the steps of:

selecting as origin-serving gateway cities from said database of travel points all gateway cities through which the specified carrier provides travel for one or more of the origin cities;

saving in memory a list of all origin-serving gateway cities.

41. The method of claim 40 wherein the step of selecting all travel fare components for the user-specified travel carrier that can be combined to construct a fare that describes a price for travel between the user-specified origin area and the user-specified destination area further comprises the steps of:

selecting as destination-serving gateway cities from said database of travel points all gateway cities through which the specified carrier provides travel for one or more of the destination cities;

saving in memory a list of all destination-serving gateway cities.

42. The method of claim 41 wherein the step of selecting all travel fare components for the user-specified travel carrier that can be combined to construct a fare that describes a price for travel between the user-specified origin area and the user-specified destination area further comprises the steps of:

selecting as qualifying origin gateway cities all origin-serving gateway cities through which the specified carrier provides travel for one or more of the destination-serving gateway cities;

saving in memory a list of all qualifying origin gateway cities.

43. The method of claim 42 wherein the step of selecting all travel fare components for the user-specified travel carrier that can be combined to construct a fare that describes a price for travel between the user-specified origin area and the user-specified destination area further comprises the steps of:

selecting as qualifying destination gateway cities all destination-serving gateway cities through which the specified carrier provides travel for one or more of the origin-serving gateway cities;

saving in memory a list of all qualifying destination gateway cities.

44. The method of claim 43 wherein the step of selecting all travel fare components for the user-specified travel carrier that can be combined to construct a fare that describes a price for travel between the user-specified origin area and the user-specified destination area further comprises the steps of:

reading a database of fare date;

selecting as qualifying published fares from said database of fare data all published fares for the specified carrier for travel between any one of the qualifying origin gateway cities and any one of the qualifying destination gateway cities;

saving in memory all said qualifying published fares.

45. The method of claim 44 wherein the step of selecting all travel fare components for the user-specified travel carrier that can be combined to construct a fare that describes a price for travel between the user-specified origin area and the user-specified destination area further comprises the steps of:

selecting as qualifying origin arbitrary fares from said fare data database all arbitrary fares for the specified carrier for travel between any one of the origin cities and any one of the qualifying origin gateway cities;

saving in memory all said qualifying origin arbitrary fares.

46. The method of claim 45 wherein the step of selecting all travel fare components for the user-specified travel carrier that can be combined to construct a fare that describes a price for travel between the user-specified origin area and the user-specified destination area further comprises the steps of:

selecting as qualifying destination arbitrary fares from said fare data database all arbitrary fares for the specified carrier for travel between any one of the destination cities and any one of the qualifying destination gateway cities;

saving in memory all said qualifying destination arbitrary fares.

47. The method of claim 46 wherein the step of selecting all travel fare components for the user-specified travel carrier that can be combined to construct a fare that describes a price for travel between the user-specified origin area and the user-specified destination area further comprises the steps of:
- determining the number of qualifying published fare fare class codes;
- determining the number of origin cities;
- determining the number of destination cities;
- determining the number of tariffs that apply to travel between the listed origin cities and the listed destination cities;
- determining the number of directionality possibilities;
- determining the number of travel continuity possibilities.

48. The method of claim 47 wherein one of said matrices is a matrix of memory addresses.

49. The method of claim 48 wherein the step of constructing one or more data structures in said memory further comprises the steps of:
- allocating memory sufficient to store said matrix of memory addresses;
- initializing said matrix of memory addresses with null values.

50. The method of claim 49 wherein the step of allocating memory sufficient to store said matrix of memory addresses further comprises the step of:
- calculating the amount of memory needed to store a matrix of memory addresses by multiplying a predetermined amount of memory for each cell of the matrix the number of qualifying published fare fare class code times the number of origin cities times the number of destination cities times the number of tariffs times the number of directionality possibilities times the number of travel continuity possibilities.

51. The method of claim 50 wherein the step of constructing one or more data structures in said memory further comprises the step of:
- for each qualifying published fare, locating a cell of said matrix of memory addresses that corresponds to the fare class code of the qualifying published fare for which the fare combination data structure applies, the origin city for which said qualifying published fare applies, the destination city for which said qualifying published fare applies, the tariff for which said qualifying published fare applies, the directionality type for which said qualifying published fare applies, and the travel continuity type for which said qualifying published fare applies.

52. The method of claim 51 wherein the step of constructing one or more data structures in said memory further comprises the step of:
- for each qualifying published fare, building a fare combination data structure with memory sufficient to hold the qualifying published fare, an address of a list of all qualifying origin arbitrary fares for travel between the origin gateway city for which the qualifying published fare applies and the origin city for which the fare combination data structure applies, and an address of a list of all qualifying destination arbitrary fares for travel between the destination gateway city for which the qualifying published fare applies and the destination city for which for which the fare combination data structure applies.

53. The method of claim 52 wherein the step of constructing one or more data structures in said memory further comprises the step of:
- for each of said fare combination data structures, storing the memory address of said fare combination data structure in the cell of said matrix of memory addresses that corresponds to the fare class code of the qualifying published fare for which the fare combination data structure applies, the origin city for which said qualifying published fare applies, the destination city for which said qualifying published fare applies, the tariff for which said qualifying published fare applies, the directionality type for which said qualifying published fare applies, and the travel continuity type for which said qualifying published fare applies.

54. The method of claim 53 wherein the step of constructing one or more data structures in said memory further comprises the step of:
- storing in each of said fare combination data structures, the qualifying published fare for which the fare combination data structure applies, the address of a list of all qualifying origin arbitrary fares for travel between the origin gateway city for which the qualifying published fare applies and the origin city for which the fare combination data structure applies, and the address of a list of qualifying destination arbitrary fares for travel between the destination gateway city for which the qualifying published fare applies and the destination city for which the fare combination data structure applies.

55. The method of claim 54 wherein the step of using said data structures to construct fare component combinations between said origin cities and said destination cities further comprises the step of:
- for each non-null cell in said matrix of memory addresses:
  - locating the fare combination data structure located at the memory address specified in said matrix cell;
  - generating as constructed fares all possible combinations of: all origin arbitrary fares identified in the list of origin arbitrary fares to which the fare combination data structure points, the published fare identified in the fare combination data structure, and all destination arbitrary fares identified in the list of destination arbitrary fares to which the fare combination data structure points.

56. The method of claim 55 further comprising the steps of:
- saving in memory all constructed fares; and
- eliminating from memory any constructed fares that do not meet fare construction criteria.

57. A system for constructing travel fares using a computer, the system comprising:
- a microprocessor configured to receive input from one or more users and further configured to access one or more databases contained on storage devices;
- a memory in which multiple types of travel fare data can be stored;
- means for constructing a list of origin cities;
- means for constructing a list of destination cities;
- means for determining a set of travel fare components that describe the price for travel between said origin cities and said destination cities
- means for constructing one or more data structures; and
- means for using said data structures to construct fare component combinations between said origin cities and said destination cities, wherein said data structures are matrices and wherein the means for constructing one or more data structures is a means for constructing one or more matrices.

58. The system of claim 57 wherein each of said matrices has one or more dimensions, each dimension having an index.

59. The system of claim 58 wherein each of said matrices has one or more cells, each cell containing as contents data.

60. The system of claim 59 wherein the indices of said matrices in combination with the contents of said matrices represent characteristics of said travel fare components.

61. The system of claim 60 wherein the means for determining a set of travel fare components that describe the price for travel between said origin cities and said destination cities further comprises:
   means for identifying a specific carrier;
   means for determining all arbitrary fares for travel between the origin cities and the destination cities;
   means for determining all published fares for travel between the origin cities and the destination cities.

62. The system of claim 61 wherein the means for determining all published fares for travel between the origin cities and the destination cities further comprises:
   means for constructing a list of qualifying origin gateway cities wherein each origin gateway city in said list is a city through which the specified carrier provides travel for one or more of the listed origin cities;
   means for constructing a list of qualifying destination gateway cities wherein each destination gateway city in said list is a city through which the specified carrier provides travel for one or more of the listed origin cities;
   means for selecting as qualifying published fares all published fares for travel by the specified carrier between any qualifying origin gateway city and any qualifying destination gateway city.

63. The system of claim 62 wherein the means for determining all arbitrary fares for travel between the origin cities and the destination cities further comprises:
   means for selecting as qualifying origin arbitrary fares all arbitrary fares for travel by the specified carrier from any origin city to any qualifying origin gateway city;
   means for selecting as qualifying destination arbitrary fares all arbitrary fares for travel by the specified carrier from any qualifying destination gateway city to any destination city.

64. The system of claim 63 wherein the means for constructing one or more matrices further comprises:
   means for generating as one or more origin city/destination city pairs all possible combinations of one of said origin cities and one of said destination cities.

65. The system of claim 64 wherein for each origin city/destination city pair, the means for constructing one or more matrices further comprises:
   means for constructing as a qualifying origin arbitrary fare matrix a matrix to represent certain characteristics of the qualifying origin arbitrary fares;
   means for constructing as a qualifying published fare matrix a matrix to represent certain characteristics of the qualifying published fares;
   means for constructing as a qualifying destination arbitrary fare matrix a matrix to represent certain characteristics of the qualifying destination arbitrary fares.

66. The system of claim 65 wherein for each origin city/destination city pair, the means for constructing one or more matrices further comprises:
   means for categorizing each qualifying origin arbitrary fare by storing information about each qualifying origin arbitrary fare in the qualifying origin arbitrary fare matrix;
   means for categorizing each qualifying published fare by storing information about each qualifying published fare in the qualifying published fare matrix;
   means for categorizing each qualifying destination arbitrary fare by storing information about each qualifying destination arbitrary fare in the qualifying destination arbitrary fare matrix.

67. The system of claim 66 wherein for each origin city/destination city pair, the means for using said matrices to construct fare component combinations further comprises:
   means for using matrix multiplication to combine said qualifying origin arbitrary fare matrix with said qualifying published fare matrix to create a composition matrix;
   means for generating the transpose of the qualifying destination arbitrary fare matrix;
   means for using matrix multiplication to combine said composition matrix with said transpose of said qualifying destination arbitrary fare matrix to create an allowable fare matrix;
   means for using each index and each cell content of said allowable fare matrix to construct each respective validated candidate constructed fare.

68. The system of claim 64 wherein the means for constructing one or more matrices further comprises:
   means for constructing as a directory to combinable fare components a multi-dimensional matrix wherein the dimensions of which represent the characteristics of validated candidate constructed fares;
   for each qualifying published fare, means for building a fare combination data structure;
   for each of said fare combination data structures, means for saving a memory address for said fare combination data structure in a cell of said multi-dimensional matrix of validated candidate constructed fares;
   means for saving in each fare combination data structure an indicator for the qualifying published fare for which said fare combination data structure applies, an indicator for each qualifying origin arbitrary fare that can be combined with said qualifying published fare, and an indicator for each qualifying destination arbitrary fare that can be combined with said qualifying published fare.

69. The system of claim 68 wherein: a first dimension of each of said multi-dimensional matrix represents the fare class code of a qualifying published fare; a second dimension of said multi-dimensional matrix represents the origin city for which said qualifying published fare applies; a third dimension of said multi-dimensional matrix represents the destination city for which said qualifying published fare applies; a fourth dimension of said multi-dimensional matrix represents the tariff for which said qualifying published fare applies; a fifth dimension of said multi-dimensional matrix represents the directionality type for which said qualifying published fare applies; and a fifth dimension of said multi-dimensional matrix represents the travel continuity type for which said qualifying published fare applies.

70. The system of claim 69 wherein the first dimension, the second dimension, the third dimension, the fourth dimension and the fifth dimension are in any order.

71. The system of claim 70 wherein the means for saving a memory address for said fare combination data structure in a cell of said multi-dimensional matrix of validated candidate constructed fares further comprises a means for determining:

the fare class code of the qualifying published fare for which the fare combination data structure was built;

the origin city for which said qualifying published fare applies;

the destination city for which said qualifying published fare applies;

the tariff for which said qualifying published fare applies;

the directionality type for which said qualifying published fare applies; and the travel continuity type for which said qualifying published fare applies.

72. The system of claim 71 wherein the means for using said matrices to construct fare component combinations between said origin cities and said destination cities further comprises the steps of:

means for using the contents of each cell of the multi-dimensional matrix of validated candidate constructed fares to access each fare combination data structure;

means for accessing each fare combination data structure to generate all possible combinations of said qualifying published fare for which said fare combination data structure applies, each qualifying origin arbitrary fare that can be combined with said qualifying published fare, and each qualifying destination arbitrary fare that can be combined with said qualifying published fare;

for each fare combination data structure, means for generating all possible combinations of said qualifying published fare for which said fare combination data structure applies, each qualifying origin arbitrary fare that can be combined with said qualifying published fare, and each qualifying destination arbitrary fare that can be combined with said qualifying published fare.

73. The system of claim 64 wherein the means for constructing one or more matrices further comprises:

means for building a two dimensional origin city-origin gateway combinability matrix for each combination of an origin city from the list of origin cities and a qualifying origin gateway city from the list of qualifying origin gateway cities wherein said origin city-origin gateway combinability matrix comprises a row for each arbitrary fare class for travel between said particular origin city and said particular qualifying origin gateway city and further comprises a column for each specific fare class for each qualifying published fare from a list of qualifying published fares that applies to travel.

74. The system of claim 73 wherein the means for constructing one or more matrices further comprises:

means for initializing to null values the contents of each cell of each such origin city-origin gateway combinability matrix;

means for setting to a non-zero value the contents of each cell of each such origin city-origin gateway combinability matrix where the index for the row of the cell is an arbitrary fare class for travel between said particular origin city that is combinable with the specific fare class for qualifying published fares that is the index for the column of that cell.

75. The system of claim 74 wherein the means for constructing one or more matrices further comprises:

means for building a two dimensional destination city-destination gateway combinability matrix for each combination of a destination city and a qualifying destination gateway city where said destination city-destination gateway combinability matrix comprises a row for each arbitrary fare class for travel between said particular destination city and said particular qualifying destination gateway city and further comprises a column for each specific fare class for qualifying published fares.

76. The system of claim 75 wherein the means for constructing one or more matrices further comprises:

means for initializing to null values the contents of each cell of each such destination city-destination gateway combinability matrix;

means for setting to a non-zero value the contents of each cell of each such destination city-destination gateway combinability matrix where the index for the row of the cell is an arbitrary fare class for travel between said particular destination city that is combinable with the specific fare class for qualifying published fares that is the index for the column of that cell.

77. The system of claim 76 wherein the means for constructing one or more matrices further comprises:

means for building a set of two dimensional published fare submatrices for each origin city-origin gateway combinability matrix/destination city-destination gateway combinability matrix pair, each set of submatrices comprising a two dimensional submatrix for each fare class for which a qualifying published fare exists for travel between the qualifying origin gateway and the qualifying destination gateway wherein the indices for the rows of each two dimensional submatrix are the qualifying published fare fare class codes that exist for travel between the qualifying origin gateway and the qualifying destination gateway and wherein the indices for the columns of each two dimensional submatrix are the qualifying published fare fare class codes that exist for travel between the qualifying origin gateway and the qualifying destination gateway and wherein the contents of each cell of each two dimensional submatrix is initialized to null values except that the contents of the nth row and nth column of the nth submatrix is set to a non-zero value if a qualifying published fare exists for travel for the fare class code that is the index of both the nth row and the nth column of the nth submatrix.

78. The system of claim 77 wherein the means for using said matrices to construct fare component combinations between said origin cities and said destination cities further comprises:

means for multiplying each origin city-origin gateway combinability matrix times the corresponding set of two dimensional published fare submatrices to build an interim matrix.

79. The system of claim 78 wherein the means for using said matrices to construct fare component combinations between said origin cities and said destination cities further comprises:

means for transposing each destination city-destination gateway combinability matrix.

80. The system of claim 79 wherein the means for using said matrices to construct fare component combinations between said origin cities and said destination cities further comprises:

means for multiplying each interim matrix times the corresponding transposed destination city-destination gateway combinability matrix to build an allowable fare matrix.

81. The system of claim 80 wherein the means for using said matrices to construct fare component combinations between said origin cites and said destination cities further comprises:

means for replacing the contents of any cell in an allowable fare matrix with the multiplicand of the combination of the index of the contributing row of the origin city-origin gateway combinability matrix times the index of the contributing row of the contributing submatrix of the corresponding set of two dimensional published fare submatrices times the index of the contributing column of the corresponding transposed destination city-destination gateway combinability matrix.

82. A microprocessor programmed to receive input from one or more users and to access one or more databases contained on storage devices and further programmed to:

construct a list of origin cities;

construct a list of destination cities;

determine a set of travel fare components that describe the price for travel between said origin cities and said destination cities;

construct one or more data structures; and use said data structures to construct fare component combinations between said origin cities and said destination cities, wherein said data structures are matrices and wherein the microprocessor is programmed to construct one or more matrices.

83. The microprocessor of claim 82 wherein each of said matrices has one or more dimensions, each dimension having an index.

84. The microprocessor of claim 83 wherein each of said matrices has one or more cells, each cell containing as contents data.

85. The microprocessor of claim 84 wherein the indices of said matrices in combination with the contents of said matrices represent characteristics of said travel fare components.

86. The microprocessor of claim 85 additionally programmed to:

identify a specific carrier;

determine all arbitrary fares for travel between the origin cities and the destination cities;

determine all published fares for travel between the origin cities and the destination cities.

87. The microprocessor of claim 86 additionally programmed to:

construct a list of qualifying origin gateway cities wherein each origin gateway city in said list is a city through which the specified carrier provides travel for one or more of the listed origin cities;

construct a list of qualifying destination gateway cities wherein each destination gateway city in said list is a city through which the specified carrier provides travel for one or more of the listed origin cities;

select as qualifying published fares all published fares for travel by the specified carrier between any qualifying origin gateway city and any qualifying destination gateway city.

88. The microprocessor of claim 87 additionally programmed to:

select as qualifying origin arbitrary fares all arbitrary fares for travel by the specified carrier from any origin city to any qualifying origin gateway city;

select as qualifying destination arbitrary fares all arbitrary fares for travel by the specified carrier from any qualifying destination gateway city to any destination city.

89. The microprocessor of claim 88 additionally programmed to:

generate as one or more origin city/destination city pairs all possible combinations of one of said origin cities and one of said destination cities.

90. The microprocessor of claim 89 wherein for each origin city/destination city pair, the microprocessor is additionally programmed to:

construct as a qualifying origin arbitrary fare matrix a matrix to represent certain characteristics of the qualifying origin arbitrary fares;

construct as a qualifying published fare matrix a matrix to represent certain characteristics of the qualifying published fares;

construct as a qualifying destination arbitrary fare matrix a matrix to represent certain characteristics of the qualifying destination arbitrary fares.

91. The microprocessor of claim 90 additionally programmed to:

categorize each qualifying origin arbitrary fare by storing information about each qualifying origin arbitrary fare in the qualifying origin arbitrary fare matrix;

categorize each qualifying published fare by storing information about each qualifying published fare in the qualifying published fare matrix;

categorize each qualifying destination arbitrary fare by storing information about each qualifying destination arbitrary fare in the qualifying destination arbitrary fare matrix.

92. The microprocessor of claim 91 additionally programmed to:

use matrix multiplication to combine said qualifying origin arbitrary fare matrix with said qualifying published fare matrix to create a composition matrix;

generate the transpose of the qualifying destination arbitrary fare matrix;

use matrix multiplication to combine said composition matrix with said transpose of said qualifying destination arbitrary fare matrix to create an allowable fare matrix;

use each index and each cell content of said allowable fare matrix to construct each respective validated candidate constructed fare.

93. The microprocessor of claim 92 additionally programmed to:

build a two dimensional origin city-origin gateway combinability matrix for each combination of an origin city from the list of origin cities and a qualifying origin gateway city from the list of qualifying origin gateway cities wherein said origin city-origin gateway combinability matrix comprises a row for each arbitrary fare class for travel between said particular origin city and said particular qualifying origin gateway city and further comprises a column for each specific fare class for each qualifying published fare from a list of qualifying published fares that applies to travel.

94. The microprocessor of claim 93 additionally programmed to:

initialize to null values the contents of each cell of each such origin city-origin gateway combinability matrix;

set to a non-zero value the contents of each cell of each such origin city-origin gateway combinability matrix where the index for the row of the cell is an arbitrary fare class for travel between said particular origin city that is combinable with the specific fare class for qualifying published fares that is the index for the column of that cell.

95. The microprocessor of claim 94 further programmed to:

build a two dimensional destination city-destination gateway combinability matrix for each combination of a destination city and a qualifying destination gateway city where said destination city-destination gateway combinability matrix comprises a row for each arbitrary fare class for travel between said particular destination city and said particular qualifying destination gateway city and further comprises a column for each specific fare class for qualifying published fares.

96. The microprocessor of claim 95 additionally programmed to:

initialize to null values the contents of each cell of each such destination city-destination gateway combinability matrix;

set to a non-zero value the contents of each cell of each such destination city-destination gateway combinability matrix where the index for the row of the cell is an arbitrary fare class for travel between said particular destination city that is combinable with the specific fare class for qualifying published fares that is the index for the column of that cell.

97. The microprocessor of claim 96 additionally programmed to:

build a set of two dimensional published fare submatrices for each origin city-origin gateway combinability matrix/destination city-destination gateway combinability matrix pair, each set of submatrices comprising a two dimensional submatrix for each fare class for which a qualifying published fare exists for travel between the qualifying origin gateway and the qualifying destination gateway wherein the indices for the rows of each two dimensional submatrix are the qualifying published fare fare class codes that exist for travel between the qualifying origin gateway and the qualifying destination gateway and wherein the indices for the columns of each two dimensional submatrix are the qualifying published fare fare class codes that exist for travel between the qualifying origin gateway and the qualifying destination gateway and wherein the contents of each cell of each two dimensional submatrix is initialized to null values except that the contents of the nth row and nth column of the nth submatrix is set to a non-zero value if a qualifying published fare exists for travel for the fare class code that is the index of both the nth row and the nth column of the nth submatrix.

98. The microprocessor of claim 97 additionally programmed to:

multiply each origin city-origin gateway combinability matrix times the corresponding set of two dimensional published fare submatrices to build an interim matrix.

99. The microprocessor of claim 98 additionally programmed to:

transpose each destination city-destination gateway combinability matrix.

100. The microprocessor of claim 94 additionally programmed to:

multiply each interim matrix times the corresponding transposed destination city-destination gateway combinability matrix to build an allowable fare matrix.

101. The microprocessor of claim 100 additionally programmed to:

replace the contents of any cell in an allowable fare matrix with the multiplicand of the combination of the index of the contributing row of the origin city-origin gateway combinability matrix times the index of the contributing row of the contributing submatrix of the corresponding set of two dimensional published fare submatrices times the index of the contributing column of the corresponding transposed destination city-destination gateway combinability matrix.

102. A method of constructing travel fares for travel between a set of origin cities and a set of destination cities using a computer with a memory, the method comprising the steps of:

selecting from a database of travel fare components all travel fare components that describe one or more aspects of the price of travel between one of the origin cities and one of the destination cities;

storing in the memory information about the selected travel fare components in one or more data structures wherein said data structures are matrices; and combining the stored selected travel fare component information to construct one or more travel fares.

103. The method of claim 102 further comprising the step of:

applying one or more rules from a set of rules to the constructed fares.

104. The method of claim 103 further comprising the step of:

selecting as permissible constructed fare all of the constructed fares that pass all of the applied rules.

105. A method of constructing travel fares for travel between a set of origin cities and a set of destination cities using a computer with a memory, the method comprising the steps of:

selecting from a database of travel fare components all travel fare components that describe one or more aspects of the price of travel between one of the origin cities and one of the destination cities;

building in memory one or more data structures, each data structure to contain one or more bins, each bin to represent a particular category of information about the price of travel between the particular origin city and the particular destination city;

categorizing each of the selected travel fare components according to one or more aspects of the price of travel described by the particular selected travel fare component;

storing information about each categorized travel fare component in one or more of the bins;

combining the information stored in the bins to construct one or more travel fares.

106. The method of claim 105 further comprising the step of:

applying one or more rules from a set of rules to the constructed fares.

107. The method of claim 106 further comprising the step of:

selecting as permissible constructed fare all of the constructed fares that pass all of the applied rules.

* * * * *